United States Patent
Faro

(10) Patent No.: US 11,953,868 B2
(45) Date of Patent: Apr. 9, 2024

(54) AUTOMATED SYSTEM FOR PROJECTIVE ANALYSIS

(71) Applicant: Inkblot Holdings, LLC, Windham, NH (US)

(72) Inventor: Kenneth R. Faro, Windham, NH (US)

(73) Assignee: INKBLOT HOLDINGS, LLC, Windham, NH (US)

( * ) Notice: Subject to any disclaimer, the term of this patent is extended or adjusted under 35 U.S.C. 154(b) by 0 days.

(21) Appl. No.: 18/096,710

(22) Filed: Jan. 13, 2023

(65) Prior Publication Data

US 2023/0185259 A1 Jun. 15, 2023

Related U.S. Application Data

(63) Continuation of application No. 17/377,481, filed on Jul. 16, 2021, now Pat. No. 11,556,099.

(51) Int. Cl.
*G05B 13/04* (2006.01)
*G05B 13/02* (2006.01)

(52) U.S. Cl.
CPC ....... *G05B 13/048* (2013.01); *G05B 13/0265* (2013.01); *G05B 13/042* (2013.01)

(58) Field of Classification Search
CPC .... G05B 13/048; G05B 13/0265; A61B 5/16; A61B 5/167; A61B 1/00
(Continued)

(56) References Cited

U.S. PATENT DOCUMENTS

| | | | |
|---|---|---|---|
| 10,395,548 B1 * | 8/2019 | Levis | G09B 7/00 |
| 2004/0148210 A1 * | 7/2004 | Barrett | G09B 7/00 |
| | | | 705/2 |

(Continued)

FOREIGN PATENT DOCUMENTS

| | | | | |
|---|---|---|---|---|
| CA | 2312931 A1 * | 6/1999 | | A61B 3/00 |
| CN | 1300577 A * | 6/2001 | | A61B 5/16 |
| WO | WO-2016140589 A1 * | 9/2016 | | A61B 5/0022 |

*Primary Examiner* — Ronald D Hartman, Jr.
(74) *Attorney, Agent, or Firm* — Tollefson IP

(57) ABSTRACT

A system for performing projective tests includes a web server, a database server, and an artificial intelligence (AI) server. The web server is coupled with an electronic data network and configured to provide a man-machine interface via the electronic data network to a remote client. The database server manages test and training data and is coupled with the web server. The AI server is coupled with the web server and the database server, and configured to execute one or more AI algorithms. The man-machine interface provides administrative tools to control a content of at least one projective test where the content may include at least one projective stimulus comprising at least one of an image, a video, an audio file, and a text file. The man-machine interface provides administrative tools that control a display associated with the projective test. The man-machine interface includes a plurality of web pages for providing interactive displays that allow a remote client to view and execute the projective test. The projective test includes an interactive display component for selecting a portion of projective stimuli and an interactive prompt configured to allow entry of additional data related to the selected portion. The system executes an AI algorithm to generate a score based on the selected portion and the response to the prompt. The system executes a second AI algorithm to associate characteristics to a user based on the selected portion of the projective stimuli, the response to the prompt, and scores from the past AI algorithm. The man-machine interface includes a plurality of web pages for providing interactive displays that allow a remote client to view and engage with their predicted scores and characteristics.

14 Claims, 37 Drawing Sheets

(58) Field of Classification Search
USPC .......................................................... 700/44
See application file for complete search history.

(56) References Cited

U.S. PATENT DOCUMENTS

| | | | | |
|---|---|---|---|---|
| 2004/0199923 | A1* | 10/2004 | Russek | G06F 16/285 |
| | | | | 707/E17.026 |
| 2011/0020778 | A1* | 1/2011 | Forbes | A61B 5/167 |
| | | | | 434/236 |
| 2011/0118555 | A1* | 5/2011 | Dhumne | A61M 21/02 |
| | | | | 600/300 |
| 2012/0221251 | A1* | 8/2012 | Rosenberg | G16H 10/20 |
| | | | | 702/19 |
| 2014/0006042 | A1* | 1/2014 | Keefe | G16H 10/20 |
| | | | | 705/2 |
| 2014/0359439 | A1* | 12/2014 | Lyren | G06F 16/951 |
| | | | | 707/706 |

* cited by examiner

SIGN UP TODAY

By signing up for our Basic Insights plan, you'll get:

* The ability to take Monthly Projective Tests
* Access to find out how you score on different psychological traits, based on your test answers.
* Access to Dr. InkBot, our AI-powered chatbot, to understand what your scores mean about who you are.

First name

Last Name

Email

Password

Card number        MM/YY CVC

Promotion Code

☐ Accept Terms and Conditions

AUTOMATED SYSTEM FOR PROJECTIVE ANALYSIS

CROSS-REFERENCE TO RELATED APPLICATIONS

This application claims the benefit of priority to U.S. Provisional Patent Application No. 63/052,579, titled "Automated System for Projective Analysis," filed on Jul. 16, 2020, and to U.S. Provisional Patent Application No. 63/131,651, titled "Automated System for Projective Analysis," filed on Dec. 29, 2020, the entire contents of each of which is hereby incorporated by reference herein.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND FIELD OF THE INVENTION

Field of the Invention

The present invention relates generally to the field of adaptive systems, and more particularly systems and methods which are adaptive to a human user input and/or a data environment, as well as applications for such systems and methods. More particularly, the invention relates automated systems and methods for performing projective analysis, including new and improved systems and methods utilizing artificial intelligence to administer, score, and interpret automated projective tests via a novel man-machine interface.

Description of the Related Art

Systems and methods for the administration, scoring, and interpreting of psychological testing exist for only some popular assessments in psychology. Projective tests, a specific kind of assessment in psychology, fails to have automated systems and methods for their administration, scoring, and interpretation.

Projective tests also exist in many other fields of endeavor. Once such endeavor is market research, which uses these tests, for example, to survey a market and its consumers. Market research systems fail to implement projective testing in an intelligent manner. Another such endeavor is in dream analysis and interpretation. No system to date automates dream analysis and interpretation by using responses to projective tests.

Learning algorithms also exist, but rarely are learning algorithms general enough to be applied without limitation to other fields.

Thus, there is a need for new and improved tools that can automatically administer, score, and interpret projective tests using a man-machine interface without the need for human interpretation of input data.

SUMMARY OF THE INVENTION

According to embodiments of the present invention, systems and methods are provided for performing all types of projective tests across all stages of testing—administration, scoring, and interpreting—utilizing a novel man-machine interface in combination with machine learning algorithms.

In some embodiments, administrative tools are provided to control the presentation of the projective test stimulus. This includes the number of stimuli, the color of stimuli, the type of stimuli and the levels of ambiguity of the stimuli. In regards to the type of stimuli, the survey administrator can choose from one of four media types—image-based, video-based, audio-based, and text-based. In regards to the ambiguity of the stimuli, the survey administrator can choose between "very ambiguous" "somewhat ambiguous, somewhat clear", and "very clear". For example, if an inkblot is displayed within the man-machine interface, an administrator can change its display shape to be more or less definitive shape. The ability of a test administrator to use different media types and select different levels of ambiguity has not been previously available or implemented on any projective testing system or method. Thus, the man-machine interface is essential element to the implementation of the present invention.

In some embodiments, administrative tools are provided to control the goal of the test taker. This allows an administrator to control what the goal of the projective task is based on their own research goals. Example options can be associate with something, complete something, build something, among other options. The ability of a test administrator to select different goals of the projective task has not been previously available or implemented on any projective testing system or method.

In some embodiments, tools are provided to aid in the test scoring process. The platform will display test-taker's responses to each projective stimuli. The scoring algorithm will then take into consideration key elements of a test to generate a recommendation on how it should be "coded" or "tagged". For example, in one version where a test taker is responding to an image-based projective stimuli, the scoring algorithm takes into consideration (1) the image that was shown, (2) the area selected on that image, and (3) the text inputs associated with the area. Based on that information, the scoring algorithm then predicts the likelihood of how that response should be tagged/coded.

In some embodiments, there is a way to continually improve the scoring algorithm. For example, the man-machine interface could provide an interactive display element, like a "checkmark" and an "X" next to each recommended "coding" or "tag". Selecting the "checkmark" saves the predicted code as correct. Selecting the "X" tells the algorithm that this is incorrect, and the user can input a proper code. This allows the "scoring algorithm" to continually improve on its "coding" or "tagging" of projective test responses. The ability of a test administrator to have the testing platform recommend how a respondent should be scored has not been previously available or implemented on any projective testing system or method.

According to embodiments of the present invention, input into the man-machine interface is encoded and analyzed using machine learning and predictive analytics to take the projective test responses and create a multi-dimensional psychographic profile. By selecting part of a projective stimuli (whether it be text, image, video, audio, etc.) and answering some text-based questions, this tool is able to use learning algorithms to predict values on other topics of interest. For example, in some embodiments, it can predict values on psychographic variables (relevant to psychologists) and consumption outcomes (relevant to market researchers). This means by producing a little information on the survey taker, so much more information is learned about the survey taker and put it immediately into practice from a psychological or marketing perspective, than using prior art methods.

According to embodiments of the present invention, access to a specific part of the platform may be provided to consumers with a conventional user name and password. In this aspect of the invention, through the inventive man-machine interface, consumers can take different projective tests, and see how the system predicts they'll score on other psychological variables. The man-machine interface may be configured to visualize the predicted scores for the consumer in an interactive fashion. No previous art allows consumers to use projective analysis to see how they might score in other areas of psychology.

According to embodiments of the present invention, information about consumers' predicted scores can be retrieved by talking with a chatbot. Consumers can get definition of psychological concepts, interpretations of their scores, and tips to improve their scores. No previous art allows consumers to use a chatbot to interpret their projective analysis.

According to embodiments of the present invention, the predicted scores on psychological variables are used in an addition algorithm to help recommend relevant content to the individual. This content includes content that should interest the user based on their predicted score, as well as psychological literature that can help them improve their scores on certain psychological variables. This allows consumers to take advantage of the platform's automated administering, scoring, and interpreting capabilities, as well as the platforms machine learning algorithms to learn more about their personal psychology. No previous art allows consumers to use projective analysis as a basis to recommending content of interest and content that can help them improve themselves.

According to embodiments of the present invention, access to a specific part of the platform may be provided to other applications via an application programmable interface (API). This API allows applications to either (1) embed the projective tests in their apps for users to take when signing up, or (2) post data they've already collected on the user to the API. Based on either of those scenarios the API can return either (1) a data visualization of the users predicted scores on a given psychological trait, or (2) the predicted score on a given psychological trait(s) for the application to visualize however it wants. The benefit for applications is that they can change the user experience based on the user's scores on psychological variables. For example, in an investment application, users with a high score on risky behaviors can be given articles on high growth stocks, while a user with a low score on risky behaviors can be given articles on bonds. No previous art uses projective analysis and predicted psychological data to allow other applications to customize the user experience.

The present invention is a practical application with mentioned uses for businesses (to better understand their customer from market research), for consumers (to better understand their scores on other psychological profiles), and for other applications (to change the user experience for their customers based on how their customers score on specific traits). The invention is more flexible than prior art methods in who can benefit by using it in a variety of its practical applications. All of these differences therefore add to the scope of the referenced patent's use.

The present invention is both theory-agnostic and method-agnostic. By being theory-agnostic, it differs from other prior art in that there are no predetermined categories for scoring and producing in its psychological profiles. By being method agnostic, it differs from other prior art in that it can be used in surveys, interviews, focus groups, and other research methods. The invention is more flexible than prior art methods in how it can be used (i.e., in what types of research it can help automate and reduce research time) and more flexible in the variability of formats it provides. All of these differences therefore adds to the scope of the referenced patent's use.

Given that psychological topics, theories, and methods change over time, according to embodiments of the present invention, a custom code window can be provided to allow an administrator to change or modify the algorithms implemented in the platform, as well as produce other analytics and reporting features as they become necessary. This too provides flexibility not seen in prior art and therefore adds to the scope of the referenced patent's use.

The present invention is a practical application of projective testing and machine learning, with novel tests and techniques not previously used in projective testing. The present invention includes technical improvements that reduces latency in test administration and scoring, improves accuracy of projective analysis results, and is limitlessly customizable.

Further applications and advantages of various embodiments of the present invention are discussed below with reference to the drawing figures.

BRIEF DESCRIPTION OF THE DRAWINGS

FIG. 26 illustrates an exemplary screen for registering with the invented system that is a part of a man-machine interface according to embodiments of the present invention.

DETAILED DESCRIPTION OF THE PREFERRED EMBODIMENTS

Figure 1:
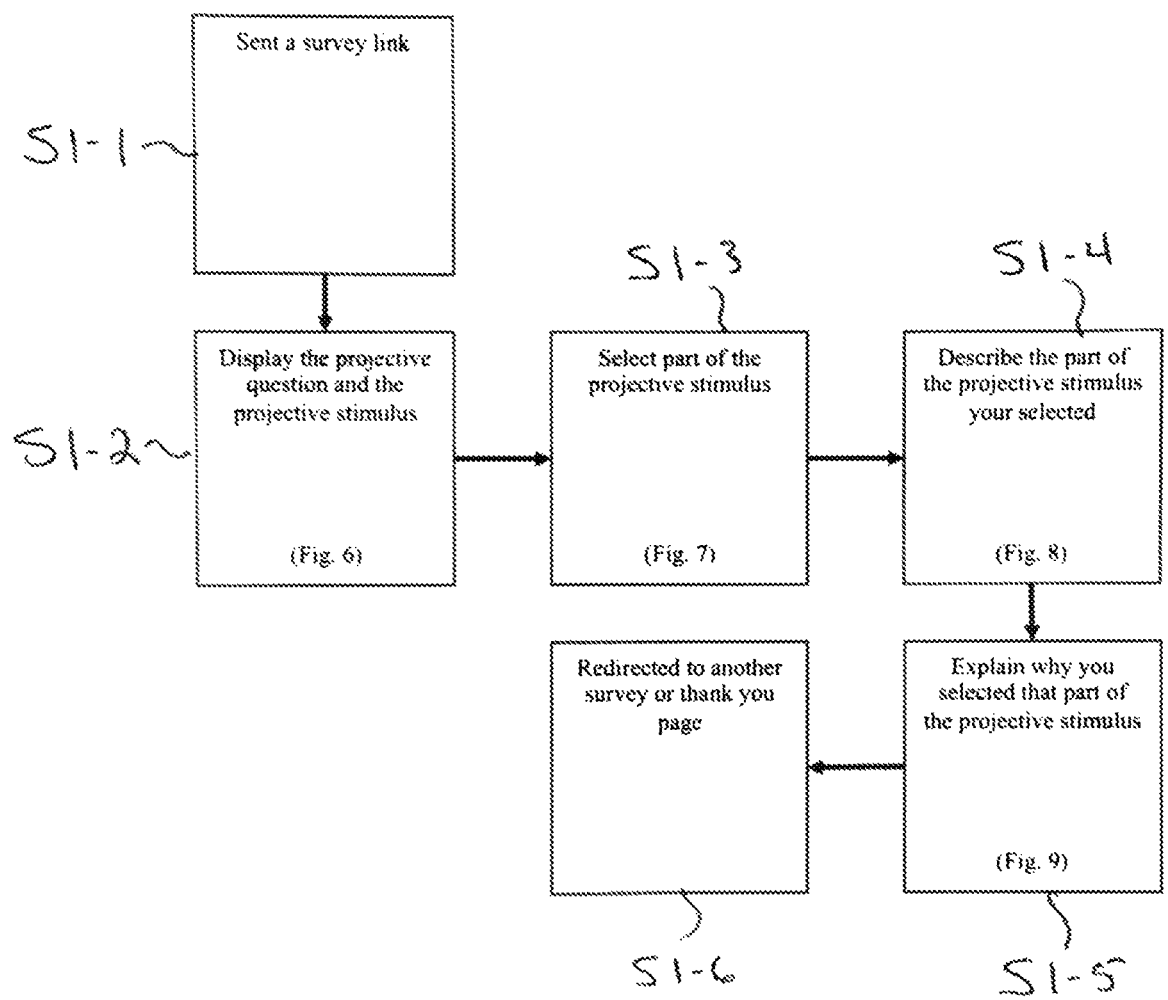
FIG. 1 is a flow chart of the steps for taking a projective test according to embodiments of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

According to embodiments of the present invention, a novel method is provided. Exemplary steps are described below.

First, will be a description of the steps and functions of the platform from the perspective of the survey-taker.

The survey respondent may be invited to take a digital survey, for example, provided online via a web browser. The survey respondent may be prompted via a man-machine interface rendered within the browser, with one or many survey questions, possibly of different types. The types of survey questions administered are improved projective techniques or newly invented projective techniques.

Preferably, many exemplary types of projective techniques on the platform, which include, but are not limited to:

Image-based questions (e.g., tests like the Rorschach inkblot test or Thematic Apperception test; etc.) take one of three forms: Associating type, completing type, and building type.

Image-Based Association Type: For this question type, there are generally four steps (with endlessly customizable variations):

Step 1 of Image-Based Association Type: The survey respondent is exposed to the question/prompt and the projective stimulus (i.e., an image or images) within a man-machine interface. The system collects data input, such as the following:

Goal of Test—the goal of the test (associate, complete, build) specified by the survey administrator in the "Stimuli" tab.

Type of Media—the type of media (video, audio, text, image) specified by the survey administrator in the "Stimuli" tab.

Ambiguity of Stimulus—the ambiguity of the stimulus (low, medium, high) specified by the survey administrator in the "Stimuli" tab.

Image Set Name—the name for the image set specified by the survey administrator in the stimulus library.

Image 1 Name—the name for the image specified by the survey administrator in the stimulus library.

Image 1 Instructions Text—the instructions text displayed for the survey taker and set by the survey administrator in the stimulus library or the "Questions" project tab.

Image 1 Question 1 Text—the question text for follow-up question 1 displayed for the survey taker and set by the survey administrator in the question library or the "Questions" project tab.

Image 1 Question 2 Text—the question text for follow-up question 2 displayed for the survey taker and set by the survey administrator in the "Questions" project tab.

Step 2 of Image-Based Association Type: The survey respondent then, via an input device such as a mouse or touchpad, selects an area on the display of the image (e.g., an inkblot) and associates that area to the question/prompt in step 1. The system collects data input, such as the following:

Selection Top Left—The pixel coordinates of the top left corner of area selected Selection Top Right—The pixel coordinates of the top right corner of area selected Selection Bottom Left—The pixel coordinates of the bottom left corner Selection Bottom Right—The pixel coordinates of the bottom right corner of area selected Size of Selection Area—The system may calculate the distance between the pixels in Selection Bottom Left and Selection Top Left and multiplies it times the distance between the pixels in Selection Bottom Left and Selection Bottom Right.

Percent White Area—The computer may add data representing "percentage of white area". The system may scan each pixel for its grayscale pixel values. As an example, for 256 greyscale pixel values, closer to 0 represents closer to black, and closer to 255 means closer to white. The total number of pixels with GPV of greater than, e.g., 230 divided by the total number of pixels in the selection is the value stored.

Color Value—The system may sum the values representing each pixel color code in the RGB value ("R" or "Red", "G" or "Green", "B" for "Blue")

Extracted Edges—The system may store "extracted edges list" or indices of sharp changes in greyscale or color. To do this, the system can subtract each greyscale pixel value from the pixels next to it. If the resulting value is over a threshold (set by the survey administrator), it is deemed an edge. This variable stores a list of pixel coordinates that have been flagged as an edge.

Other image-features or variables can be extracted and added to the database by implementing additional algorithms in the in-app analytics console.

Step 3 of Image-Based Association Type: The man machine interface may prompt a survey respondent to input free-form text, via voice recognition software or keyboard, for example, to associate with the selected area of the image (e.g., an image of an inkblot). For example, a free-form description of the area in human readable form may be entered. In this step, additional data is collected and/or generated, for example:

Text Input 1—At this point, the system may store the raw text data entered for follow-up question 1.

Sentiment for Text Input 1—The system can process the text data by first creating a dictionary. Upon adding the new respondent, the system preferably reruns all the answers to this question in the database to recreate a dictionary so that all unique words are included. The system then removes all "stop words" or words like "a", "and" or "the". The list of stop words has been previously identified by the survey administrator. Each word in the resulting dictionary is added in a sub-table on the database. Each data element is assigned a value that represents the number of times the word in that subtable appears in the text. This is called a "word count". Each word from the dictionary above is also assigned a sentiment value. For example, the closer to −1, the more negative. The closer to 1, the more positive. The closer to 0, the more neutral. The sentiment scores for each word are then multiplied by the word counts for each word. Then the resulting products of all words are summed up. The resulting score is stored.

Other text-features or variables can be extracted and added to the database by using the in-app analytics console.

Step 4 of Image-Based Association Type: The man-machine interface may prompt the survey respondent to input an additional response to the question/prompt in step 1. Additional data is stored or generated, for example:

Text Input 2—At this point, the system may store the raw text data entered for follow-up question 2.

Sentiment for Text Input 2—The system can process the text data by first creating a dictionary. Upon adding the new respondent, the system preferably reruns all the answers to this question in the database to recreate a dictionary so that all unique words are included. The system then removes all "stop words" or words like "a", "and" or "the". The list of stop words has been previously identified by the survey administrator. Each word in the resulting dictionary is added in a sub-table on the database. Each data element is assigned a value that represents the number of times the word in that subtable appears in the text. This is called a "word count". Each word from the dictionary above is also assigned a sentiment value. For example, the closer to −1, the more negative. The closer to 1, the more positive. The closer to 0, the more neutral. The sentiment scores for each word are then multiplied by the word counts for each word. Then the resulting products of all words are summed up. The resulting score is stored.

Other text-features or variables can be extracted and added to the database by using the in-app analytics console.

There are variations to the way an Image-Based Association Type question can be implemented. One example of these variations is written below.

Step 1 of Image-Based Association Type Variation: The survey respondent is exposed to the question/prompt and can select one of many images to choose from (instead of just one image to react to).

Step 2 of Image-Based Association Type Variation: The survey respondent selects an area on the image they chose.

Step 3 of Image-Based Association Type Variation: The survey respondent inputs what they see in that area of the image they selected.

Step 4 of Image-Based Association Type Variation: The survey respondent inputs their response to the question/prompt in step 1.

Image-Based Completion Type: For this question type, there are generally four steps (with endlessly customizable variations):

Step 1 of Image-Based Completion Type: The survey respondent is exposed to the question prompt and image. However, the image is missing a part.

Step 2 of Image-Based Completion Type: The survey respondent is displayed a set of other images that can be used to complete the image in step 1. Through the man-machine interface, an image is selected.

Step 3 of Image-Based Completion Type: The survey respondent then inputs a description of what the selected image is to be associated with the image.

Step 4 of Image-Based Completion Type: The survey respondent then inputs free text describing why they selected that image to complete the partial image.

There are variations to the way an Image-Based Completion Type question can be implemented. One example of these variations is written below.

Step 1 of Image-Based Completion Type Variation: The survey respondent may be exposed to a certain number of images in a specific order.

Step 2 of Image-Based Completion Type Variation: The man-machine interface allows, through prompts or other display elements, a survey respondent to create a story with the images and select one or more images to include in the story. Preferably, selected images can be inserted anywhere into a mix of images (i.e., anywhere in the visual story).

Step 3 of Image-Based Completion Type Variation: The survey respondent creates, through the man-machine interface, a story referencing the images.

Step 4 of Image-Based Completion Type Variation: the survey respondent inputs an indicator, which can be free form text, or other element, of why selected image(s) was added to the story.

Image-Based Building Type: For this question type, there are generally four steps (with endlessly customizable variations):

Step 1 of Image-Based Building Type: Via the man-machine interface, a survey respondent is exposed to a question prompt and a set of image parts.

Step 2 of Image-Based Building Type: The survey respondent is provided interface elements that allows the image parts to be moved on the display to build, for example, a collage by moving any of the images into a digital "canvass". They select done when complete.

Step 3 of Image-Based Building Type: The survey respondent then describes, via input into the man-machine interface, the resultant display.

Step 4 of Image-Based Building Type: The survey respondent then may input an indication of why they created that image.

There are variations to the way an Image-Based Building Type question can be implemented. One example of these variations is written below.

Step 1 of Image-Based Building Type Variation: Via the man-machine interface, a survey respondent is exposed to the question prompt and a set of image parts.

Step 2 of Image-Based Building Type Variation: Via the man-machine interface, the survey respondent then takes the image parts and builds a collage by moving any of the images into a digital "canvass".

Step 3 of Image-Based Building Type Variation: Via the man-machine interface, the survey respondent then selects an area on the image created that they are focusing on.

Step 4 of Image-Based Building Type Variation: Via the man-machine interface, survey respondent then inputs an indications as to what they see in that area of the image.

Step 5 of Image-Based Building Type Variation: Via the man-machine interface, survey respondent then inputs an indication as why they selected that area in the image. This could be text, selection from data elements provided in the display, etc.

Video-based questions (a novel addition to projective testing not used in practice nor seen in prior art), three exemplary forms: Associating type, completing type, and building type.

Video-Based Association Type: For this question type, there are generally four steps (with endlessly customizable variations):

Step 1 of Video-Based Association Type: Via the man-machine interface, survey respondent is exposed to the question/prompt and video (e.g., a video of an animated inkblot).

Step 2 of Video-Based Association Type: Via the man-machine interface, survey respondent selects a section of the video that they are focusing on.

Step 3 of Video-Based Association Type: Via the man-machine interface, the survey respondent inputs what they see in that area of the video. This could be free text, or selection from a group of data elements to be associated with the selected video area, etc.

Step 4 of Video-Based Association Type: Via the man-machine interface, the survey respondent inputs their response to the question/prompt in step 1.

There are variations to the way a Video-Based Association Type question can be implemented. One example of these variations is written below.

Step 1 of Video-Based Association Type Variation: Via the man-machine interface, the survey respondent is exposed to the question prompt and many videos to choose from (instead of just one video to react to).

Step 2 of Video-Based Association Type Variation: Via the man-machine interface, the survey respondent then selects a clip on the selected video.

Step 3 of Video-Based Association Type Variation: Via the man-machine interface, the survey respondent inputs an indication as to what they see in that area of the video clip.

Step 4 of Video-Based Association Type Variation: Via the man-machine interface, the survey respondent inputs their response to the question/prompt in step 1.

Video-Based Completion Type: For this question type, there are generally four steps (with endlessly customizable variations):

Step 1 of Video-Based Completion Type: Via the man-machine interface, the survey respondent is exposed to the question/prompt and video. However, the video has some parts missing.

Step 2 of Video-Based Completion Type: Via the man-machine interface, the survey respondent then is displayed a set of other video clips that can be selected to complete the video. They select one.

Step 3 of Video-Based Completion Type: Via the man-machine interface, survey respondent then inputs an indication of what the video clip is.

Step 4 of Video-Based Completion Type: Via the man-machine interface, the survey respondent then inputs an indication as why they selected that to complete the original video.

There are variations to the way a Video-Based Completion Type question can be implemented. One example of these variations is written below.

Step 1 of Video-Based Completion Type Variation: Via the man-machine interface, the survey respondent is exposed to a certain number of videos in a pre-specified order.

Step 2 of Video-Based Completion Type Variation: Via the man-machine interface, the survey respondent is prompted to create a story with the videos and pick another video to insert or append to the story.

Step 3 of Video-Based Completion Type Variation: Via the man-machine interface, survey respondent creates a story referencing the videos Step 4 of Video-Based Completion Type Variation: the survey respondent inputs an indicator as to why they picked that video to add to the story.

Video-Based Building Type: For this question type, there are generally four steps (with endlessly customizable variations):

Step 1 of Video-Based Building Type: The exposure to the question/prompt and a set of video clips. (See FIG. 1*f*)

Step 2 of Video-Based Building Type: Via the man-machine interface, the survey respondent then takes the video parts and builds a video collage by moving any of the video clips into a digital "movie reel".

Step 3 of Video-Based Building Type: Via the man-machine interface, the survey respondent is provided input means for describing the creation.

Step 4 of Video-Based Building Type: Via the man-machine interface, the survey respondent may input an indication as to why they created that "movie reel".

There are variations to the way a Video-Based Building Type question can be implemented. One example of these variations is written below.

Audio-based questions (e.g., Skinner's Auditory Inkblots) take one of three forms: Associating type, completing type, and building type.

Audio-Based Association Type: For this question type, there are generally four steps (with endlessly customizable variations):

Step 1 of Audio-Based Association Type: Via the man-machine interface, the survey respondent is exposed to the question/prompt and audio clip (e.g., of ambiguous sounds of something moving in water).

Step 2 of Audio-Based Association Type: Via the man-machine interface, the survey respondent is provided means for selecting a section of the audio clip that they are focusing on. Display means may provide for a display of the time of the audio along with playback to allow input of a selection of the audio.

Step 3 of Audio-Based Association Type: Via the man-machine interface, the survey respondent is provided input means for describing the selected piece of the audio clip.

Step 4 of Audio-Based Association Type: Via the man-machine interface, the survey respondent may input responses to the question/prompt in step 1.

There are variations to the way an Audio-Based Association Type question can be implemented. One example of these variations is written below.

Step 1 of Audio-Based Association Type Variation: Via the man-machine interface, the survey respondent may be exposed to the question/prompt and many audio clips to choose from (instead of just one audio clip to react to).

Step 2 of Audio-Based Association Type Variation: Via the man-machine interface, the survey respondent then selects a part of the audio clip they chose.

Step 3 of Audio-Based Association Type Variation: Via the man-machine interface, survey respondent inputs what they hear in that part of the audio clip.

Step 4 of Audio-Based Association Type Variation: Via the man-machine interface, survey respondent inputs their response to the question/prompt in step 1.

Audio-Based Completion Type: For this question type, there are generally four steps (with endlessly customizable variations):

Step 1 of Audio-Based Completion Type: Via the man-machine interface, the survey respondent is exposed to the question/prompt and audio clip. However, the audio has some parts missing.

Step 2 of Audio-Based Completion Type: Via the man-machine interface, survey respondent then can play a set of other audio clips that can be used to complete the original audio clip. Means are provided to select one.

Step 3 of Audio-Based Completion Type: Via the man-machine interface, survey respondent is provided input means for associating or creating a description selected audio.

Step 4 of Audio-Based Completion Type: Via the man-machine interface, the survey respondent is allowed to input or create an indication as to why the selected audio completes the original audio clip.

There are variations to the way an Audio-Based Completion Type question can be implemented. One example of these variations is written below.

Step 1 of Audio-Based Completion Type Variation: Via the man-machine interface, a survey respondent is exposed to a certain number of audio clips in a specific order.

Step 2 of Audio-Based Completion Type Variation: Via the man-machine interface, survey respondent is prompted to create a story with the audio clips and pick another clip to insert or append to the story. It can be inserted anywhere into the mix of audio clips (i.e., anywhere in the auditory story).

Step 3 of Audio-Based Completion Type Variation: Via the man-machine interface, a survey respondent creates the story referencing the audio clips.

Step 4 of Audio-Based Completion Type Variation: Via the man-machine interface, the survey respondent inputs an indicated at to why they picked that audio clip to add to the story.

Audio-Based Building Type: For this question type, there are generally four steps (with endlessly customizable variations):

Step 1 of Audio-Based Building Type: Via the man-machine interface, a survey respondent is exposed to the question/prompt and a set of audio clips.

Step 2 of Audio-Based Building Type: Via the man-machine interface, survey respondent then takes the audio clips and builds an audio collage by moving any of the audio clips into a digital "mixing tape".

Step 3 of Audio-Based Building Type: Via the man-machine interface, the survey respondent inputs a description of the collage.

Step 4 of Audio-Based Building Type: Via the man-machine interface, the survey respondent provides an indication as to why they created that "mixed tape".

There are variations to the way an Audio-Based Building Type question can be implemented. One example of these variations is written below.

Text-based questions (e.g., word association test; sentence completion test) take one of three forms: Associating type, completing type, and building type.

Text-Based Association Type: For this question type, there are generally four steps (with endlessly customizable variations):

Step 1 of Text-Based Association Type: Via the man-machine interface, a survey respondent is exposed to the question/prompt and multiple words that can be selected.

Step 2 of Text-Based Association Type: Via the man-machine interface, survey respondent selects a word.

Step 3 of Text-Based Association Type: Via the man-machine interface, survey respondent inputs a description of the selected word.

Step 4 of Text-Based Association Type: Via the man-machine interface, the survey respondent inputs text responses to the prompt in step 1.

There are variations to the way a Text-Based Association Type question can be implemented. One example of these variations is written below.

Text-Based Completion Type: For this question type, there are generally four steps (with endlessly customizable variations):

Step 1 of Text-Based Completion Type: Via the man-machine interface, the survey respondent is exposed to sentences missing a word or multiple words.

Step 2 of Text-Based Completion Type: Via the man-machine interface, survey respondent then has to select one (or more) displayed word(s) to complete the sentences.

Step 3 of Text-Based Completion Type: Via the man-machine interface, survey respondent then inputs what the definitions are of the words they chose.

Step 4 of Text-Based Completion Type: Via the man-machine interface, the survey respondent inputs an indicator associated with why they selected those words to complete the sentence.

There are variations to the way a Text-Based Completion Type question can be implemented. One example of these variations is written below.

Text-Based Building Type: For this question type, there are generally four steps (with endlessly customizable variations):

Step 1 of Text-Based Building Type: Via the man-machine interface, survey respondent is exposed to the question prompt and a display of a set of words.

Step 2 of Text-Based Building Type: Via the man-machine interface, survey respondent then selects words from the set of displayed words to generate a sentence or multiple sentences by moving any of the words into a digital "book".

Step 3 of Text-Based Building Type: Via the man-machine interface, a survey respondent inputs a description of what was generated.

Step 4 of Text-Based Building Type: Via the man-machine interface, the survey respondent inputs an indicator why they created that "book".

The above question types (and their variations) can each present one kind of (or a mix of) the following three types of stimuli: (1) Stimuli which are completely ambiguous (e.g., and inkblot), (2) Stimuli which are partially ambiguous, and (3) Stimuli that are definitive and clear as to what they are. As will be understood, numerous display elements can be used to implement the man-machine according to the method steps.

In addition to question types, the survey taker might come across variations of the question types that either (1) allows the user to rotate the image between 0 and 360 degrees before making a selection, and/or (2) allows the user to do the exercise multiple times if they see more than one thing in the image.

When the survey respondent is done completing the administered survey questions, the input data is automatically processed according to the techniques described herein, using preferably, machine learning techniques as described herein.

Now, aspects of the invention will be explained from the point-of-view of the survey administrator (the person who created the survey and executing the research project). The survey administrator can log into the online platform.

Once logged in, the survey administrator can see the project page which lists out all current and past projects. Some information is displayed for each project, including, but not limited to, how long (in minutes) the survey takes, how many people have completed the survey, and what category or topic (e.g., for market research this could be product categories such as beer, automotive, clothing, etc.) the project is based on.

The survey administrator can either: (1) Enter an existing project by clicking on it, or (2) Start a new project by clicking on the "+New Project" button.

When creating a new project or clicking in to an existing project, the survey administrator can see the following project tabs: (1) Details, (2) Stimuli, (3) Questions, (4) Test, (5) Administer, (6) Score, (7) Data, (8) Interpret.

On the "Details" tab, the survey administrator may enter specific information, such as: (1) The project name, (2) how many people one wants to take the survey, (3) what category or topic this study is about, among other questions.

On the "Stimuli" tab, the survey administrator can select the appropriate projective test. There are a minimum of 36 projective tests included on the platform. To select the correct one, the survey administrator can answer these four questions: (1) What do one want to use as a stimulus? (Answers include: "Image", "Video", "Sound", "Text"), (2) How ambiguous do one want the stimulus to be? (Answers include: "Very Ambiguous", "Some parts ambiguous, some parts clear" and "Very Clear"), (3) What do one want the survey taker to do? (Answers include: "Associate With Something", "Complete Something", and "Build Something") and (4) How many stimuli do you want? (Answers include: 1-10). When these four questions are answered, the platform picks a default "stimuli set" for the survey administrator.

Once the projective test is selected, the survey administrator will move to the "Questions" tab to fill out question-specific information. For each stimuli included in the stimuli set, the survey administer will use a drop down to select the proper question text. This text applies for: (1) The question instruction, (2) follow-up question 1, and (3) follow-up question 2. To write in custom instructions/questions, the survey administer will need to select "Custom" in the drop down next to the stimulus.

Additionally, the "Questions" tab has two place where the administrator can click to enable different functions: (1) enable image rotation in the survey (i.e., physically turning the image in different ways) and (2) enable multiple answer options, which allows the user to take the same exercise over to record their multiple answers.

Once the question-specific information is filled out, the survey administer goes to the "Test" tab. This tab shows the stimuli and associated questions.

In some embodiments, when setting up a project, the administrator can have a place to host fielding information. This "Administer" tab includes two core things: a link to send survey takers to the web address where they can take the survey, and a link to send survey respondents somewhere after they finish the survey. These are called (1) the fielding link—a link to send survey respondents to the web address where they can take the survey, and (2) the redirect link—a link to send survey respondents somewhere after they finish the survey.

In some embodiments, a JavaScript client running in the user's web browser draws the view shown in Figures below. If the user clicks the "Save" button, the client sends the data entered into the inputs to the system. The system accepts this data and stores it appropriately in a database, such as a MySQL.

The fielding link as four option: (1) a test link for the administrator to test the survey, (2) a link that automatically generates a user ID for each respondent, (3) a link used specifically in the consumer portion of the application, and (4) a link that can be used with a panel or some other partner where that partner is passing through a user ID or other information from their platform.

The redirect link has at least two options to choose from: (1) One option allows one to send respondents to another site, or (2) the second option is to send respondents to a custom "Thank You" page generated by the platform. The "Thank You" page can be customized on the "Administer" tab if selected.

Once data is collected for a project, the survey administrator can click into the project. Once the survey administrator is in to the project, they can click on the "Score" page to analyze the data.

This page shows the different stimuli one administered from your stimuli set (i.e., the different projective tests).

The survey administrator then can click on a stimuli, one at a time, and the platform will display the following information for each respondent: (1) the portion of the image that the respondent selected on the stimuli, (2) the answer to the follow-up questions, (3) recommended tags/codes for each follow-up question.

The system will display the selection made for each respondent by imposing a rectangle on the stimuli. This rectangle is drawn by connecting each of the previously recorded pixel coordinates.

There are fields in the man-machine interface that allow one to "tag" or "categorize" each response to the follow-up questions according to one or multiple themes.

These "tagging fields" are pre-filled based on the platforms scoring algorithm. This algorithm takes into consideration a number of factors of how responses produce recommended "tags". For example, with an image-based projective stimuli, the scoring algorithm may take into consideration: (1) the projective stimuli that was shown, (2) the area that was selected, (3) and the text that was used in the follow-up questions about that area.

As the survey administer reviews the "tags" suggested by the scoring algorithm, the system is configured to provide means for improving the scoring algorithm. For example, a "checkmark" and an "X" next to each pre-filled "tagging field". Selecting the "checkmark" saves the predicted code as correct. Selecting the "X" tells the algorithm that this is incorrect. The survey administrator can then write in the proper code. This allows the "scoring algorithm" to continually improve on its "coding" or "tagging" of projective test responses.

One novel aspect of the invention involves a novel scoring algorithm including an ensemble of machine learning algorithms.

One part of this ensemble is a recommender system uses image processing. For example, the image processing breaks the image down into pixels. Each pixel is then stored in a large matrix, e.g., as a row. The algorithm is configured to take all the tags/codes that have ever been assigned to this image. Each unique tag/code then can be stored in the matrix, e.g., as a column. For each pixel in the image (and therefore row in the matrix), the algorithm is configured to generate and store a value in each column that represents: (1) if any survey takers in the database had a selection that included that pixel, and (2) the number of times the tag in each column was assigned to that selection. This recommender system uses a matrix of "n" rows of pixels and "m" columns of tags to generate the recommended tags/codes based on an images tags/codes.

A second part of this ensemble is a recommender system using natural language processing on follow-up question 1. For example, the natural language processing breaks the text from follow-up question 1 into words and phrases. Each word/phrase is then stored as a row in a large matrix. The algorithm is then configured to take all the tags/codes that have ever been used with this image. Each unique tag/code then becomes a column in the matrix. For each unique word/phrase (and therefore row in the matrix), the algorithm is configured to add a value in each column that represents: (1) if any survey takers in the database had a response to follow-up question 1 that includes the word/phrase, and (2) the number of times the tag in each column was assigned to a response that uses that word/phrase. This recommender system uses a matrix of "n" rows of words/n-grams and "m" columns of tags/codes to generate the recommended tags/codes based on the textual responses to follow-up question 1.

A third part of this ensemble is a recommender system using natural language processing on follow-up question 2. For example, the natural language processing breaks the text from follow-up question 2 into words and phrases. Each word/phrase is then stored as a row in a large matrix. The algorithm then configured to take all the tags/codes that have ever been used with this image. Each unique tag/code then is stored as a column in the matrix. For each unique word/phrase (and therefore row in the matrix), the algorithm is configured to add a value in each column that represents: (1) if any survey takers in the database had a response to follow-up question 2 that includes the word/phrase, and (2) the number of times the tag in each column was assigned to a response that uses that word/phrase. This recommender system uses a matrix of "n" rows of words/n-grams and "m" columns of tags/codes to generate the recommended tags/codes based on the textual responses to follow-up question 2.

A fourth part of this ensemble is a neural network using image features as predictors and the tags as the outcome variable. The neural network first takes all image selections and performs a number of feature modifications and extractions. For example, the algorithm may be configured to flatten the image selections to one dimension and then normalize the image pixel values. The algorithm is configured to build a stack of layers using a sequential model, followed by convolutional layers and hidden layers. Various layer retraining and parameter tuning will be performed as the algorithm is continually applied to the expanding information in the database. In sum this algorithm is configured to use image features in a neural network to generate the recommended tags/codes based on the image selections.

A fifth part of this ensemble is a neural network using text-based features as predictors and the tags as the outcome variable. The neural network first takes all text from follow-up question 1 and performs a number of feature modifications and extractions. For example, the natural language processing breaks the text from follow-up question 1 into a list of unique words and phrases. Each response for follow-up question 1 may be reduced to binary array against the array of unique words (where e.g., 1 indicates the word is present in the response, and 0 represents that the word is not present). The algorithm is configured to use these extracted features as inputs used to build a stack of layers using a sequential model, followed by convolutional layers and hidden layers. Various layer retraining and parameter tuning will be performed as the algorithm is continually applied to the expanding information in the database. In sum this algorithm uses text-based features in a neural network to generate the recommended tags/codes based on the image selections.

A sixth part of this ensemble is a neural network using text-based features from follow-up question 2 as predictors and the tags as the outcome variable. The neural network first takes all text from follow-up question 2 and performs a number of feature modifications and extractions. For example, natural language processing breaks the text from follow-up question 2 into a list of unique words and phrases. Each response for follow-up question 2 is reduced to a binary array of against the array of unique words (where 1 indicates the word is present in the response, and 0 represents that the word is not present). The algorithm is configured to build a stack of layers using a sequential model, followed by convolutional layers and hidden layers. Various layer retraining and parameter tuning will be performed as the algorithm is continually applied to the expanding information in the database. In sum this algorithm uses image features in a neural network to generate the recommended tags/codes based on the image selections.

Other algorithms are expected to be added to the ensemble.

Each of the algorithms preferably will output a suggested tag/code. This will result in a recommended tag/code array of tags/code. The tags/codes may be counted and the tag/code with the greatest number of recommendations in the recommended tag/code array can be the one output on the man-made interface.

The platform has a setting where one can choose: (1) for machine learning model updates to be run automatically, or (2) for machine learning model updates to be run manually.

If the machine learning model updates to be run automatically, then it will do so based on user inputs on the "score" page. Each time the survey administrator revises a suggested code (i.e., hits the "x" button next to the tag and writes in their own tag), the machine learning reruns to update the algorithm based on the user input.

When the algorithm is done rerunning, the unsaved codes or tags on your "score" page will also update based on the new information When the survey administrator selects the "checkmark" next to a suggested tag, or enters in their own tag, it will be added into the respective database columns.

Additionally, the "Score" tab has clickable "checkbox" fields. These represent specific codes that are universally important across all fields and applications of the inkblot test.

The Administrator has the ability to set different user permissions on the platform. One role the administrator can set is the "coding" role. This allows another user to sign-in but only see the Score page for every project. The Coder can then score tests by tagging/coding the text responses. This data is saved separately for the Administrator to use.

The Administrator can use the Coder's tags/codes in two ways: (1) the Administrator can run statistics, such as Inter-Rater Reliability, to determine the accuracy of multiple coders, and/or (2) the Administrator can adopt the Coder's tags/codes instead of the "tag recommender" algorithm's suggestions.

When the survey administrator is done scoring the data, the head of the data set collected is preferably displayed in a "Data" Tab.

Additionally, if the survey respondents have taken other surveys, or if there is pre-existing data on these individual (e.g., such as data in a CRM database), one can upload this data on the "Data" page as well.

Once the data is scored, the survey administrator can navigate to the "Interpret" page that displays the results of the system's analysis.

This page displays the different stimuli in the stimulus set administered to the respondents (i.e., the different projective tests). For example, for inkblot images in an image-based question type, each inkblot image from the stimulus set is displayed on the page.

The survey administrator then selects a projective stimuli, one at a time, and the platform will display the results of the analysis by showing: (1) a heatmap of aggregated areas on the projective stimuli that were selected by all survey respondents, (2) the codes/tags that were assigned to responses in the "score" tab.

To see what survey respondents saw in the inkblot, the following exemplary process may be executed. When the survey administrator selects a point on the heatmap image (e.g., on the inkblot) the system translates that into pixel coordinates. The system then filters the database for all image selections that contain those pixel coordinates. The system then takes all the tags for follow-up question 1 in the filtered data and performs an operation to identify all unique tags. Once unique tags are found, the system then performs a sort of "countif" function, identifying how many times each unique tag is used. The system is configured to sort the new two-column-list of unique tags and their counts in descending order. The four tags with the highest counts are then displayed on the screen. This shows what most people saw in this area of the Inkblot To see why survey respondents saw certain things in the inkblot, the following process may be employed. A survey administrator can select a tag used in follow-up question 1. Once the tag is provided for selection, the data is then filtered to show the top codes from follow-up question 2.

To help produce additional insights, the system is configured to allow for comparisons of answers on the same projective stimuli with different datasets using the benchmark function built into the "interpret" tab. For example, what data is displayed on the projective stimuli selected can be changed to: (1) Just the data from the sample collected in this one survey, (2) Data from all projects that are assigned to the same topic/category (e.g., product category like beer), and (3) Data from all projects in the entire database. The platform allows for other filtering to allow for comparisons by stimulus set, question types, among others.

Additionally, other insights can also be gleaned from the profiling function built into the "interpret" tab. This function allows the survey administrator to start creating and comparing psychological profiles. This basic profiling function allows survey administrators to create profiles using profiling characteristics selected from data the survey administrator has in the same survey (or with the same sample). For example, if the survey administrator asked a question around "gender", the basic profiling function can help determine whether the profile identified is more likely to be male or female.

To create and compare profiles made using the basic profiling function, the survey administrator may do two things: (1) the survey administrator can select the different codes/tags that they want to use as the basis for the profile, and (2) the survey administrator can select the variables they're looking to add as profile characteristics. Once the codes/tags and the profile characteristics are selected, the survey administrator can select a "Generate Profile" button. When this button is hit, the system performs a few analytical steps:

Generate Profile Analytical Step 1: An additional data element is added to the paired dataset.

Generate Profile Analytical Step 2: Any individual respondent who was assigned one of the codes/categories/ themes selected is assigned a 1 in the new data element. All others are assigned a 0 in the new data element.

Generate Profile Analytical Step 3: The system is configured to execute a binary logistic regression where the independent variables are variables that are checked off (i.e., profile characteristics) and the dependent variable is the binary (i.e., "1" or "0") variable created by the presence/absence of the codes/tags identified.

Generate Profile Analytical Step 4: The system is configured to take the coefficients that result from the binary logistic regression for each independent variable and exponentiates them to turn them into odd ratios.

Generate Profile Analytical Step 5: For each variable, the system is configured to transforms the odds ratio into a percentage through the following equation: (OR-1)*100.

Generate Profile Analytical Step 6: The system is configured to display the percentages on the webpage.

Generate Profile Analytical Step 7: If there are too many predictors selected the binary logistic regression will use lasso, ridge, or other regularization means to help prevent overfitting.

While the basic profiling function allows users to create profiles using profiling characteristics selected from data the survey administrator has in the same survey (or with the same sample), predictive profiling allows the survey administrator to see profiling characteristics based off of the platforms profiling algorithms.

When using the platform's profiling algorithms, the following analytical steps may be performed:

Predictive Profile Analytical Step 1: The platform preferably includes a setting for: (1) machine learning model updates to be run automatically, or (2) machine learning model updates to be run manually. If the machine learning model updates to be run automatically, then it will do so based on when new data is added to the database. When this happens, the profiling algorithms are rerun.

Predictive Profile Analytical Step 2: When the algorithm is rerun, the system can be configured to run a series of models. If the outcome variable is a continuous variable, the system can run a series of models, for example: (1) a linear regression, (2) a ridge regression, (3) a lasso regression, (4) an elastic net, (5) a neural net, and possibly others not mention here. If the outcome variable is dichotomous, the system can run a series of models, for example: (1) a logistic regression, (2) a support vector machine, (3) a naive Bayes classifier, and possibly others not mention here. When these models are run, the algorithm can be trained, for example, on 70% of the data and tested on 30% of the data. Model fit statistics are then saved on the "Model History" page. Preferably, the models with the best fit statistics (including accuracy and precision) are "deployed". When the model is deployed, the computer saves the coefficients that are paired with each independent variable.

Predictive Profile Analytical Step 3: For each variable of interest in the predictive profile, plus any additional variables created by using the in-app analytics console, the system multiplies the scores times coefficients from the saved model and then sums the products. The summed score is the predicted value for each survey respondent on the variable of interest.

A "Category Library" may be provided as a page that allows the survey administrator to both create and manage the way projects are tagged (which is different than the tagging function for survey respondents). This indicates the topics the surveys are about (e.g., a beer product or a cereal product). Projects can then be assigned to these categories. This is the "engine" behind the benchmark function on the "interpret" page that allows one to see the data by "all studies in the same category".

A "Stimulus Library" may be provided that allows the survey administrator to upload various media files (video, image, audio, etc.) and create "stimulus sets" with them. Each stimulus set requires media files, as well as pre-filled criteria for when the stimulus set is recommended as a default to the survey administrator. These pre-filled criteria include: the type of stimuli, ambiguity of stimuli, and goal of projective task. The administrator can also identify the "Default stimulus set" if more than one stimulus sets meets the same requirements.

A "Question Library" may be provided that allows the survey administrator to write in text for: (1) question instructions, (2) follow-up question 1, and (3) follow-up question 2. These are then saved and can be selected when setting up projects in the future via the "Questions" tab.

A "View Database" page may be provided that allows the survey administrator to see the underlying platform database. It also allows the survey administrator to select any variable and have it displayed as a histogram (if numerical) and as a bar chart if categorical. Descriptive statistics such as mean, median, and standard deviation are displayed for each variable selected. The survey administrator can also filter any variable by any other categorical variable.

A "Modeling History" page may be provided that allows the survey administrator to train and test machine learning models in R and python on the platforms database. If the model performs well enough, the model can be deployed to the platform.

There are at least three core sets of algorithms that a machine learning model can be deployed to: (1) the scoring algorithm, (2) the basic profiling algorithm, and (3) the predictive profiling algorithm.

The "Modeling History" page also may include a space on the page that shows the records of "active models" and "inactive models", as well as associated model information. For example, the model information displayed includes: (1) The date the model was deployed, (2) Name of the model input by user, (3) Description of the model input by user, (4) Model type, input by user, (5) List of independent variables, (6) Dependent variable, (7) List of fit metrics.

An "Analytics Console" page may be provided that allows the user to run additional analytics on the database by using R or python. It preferably has four parts of the screen: (1) A place to input and save script, (2) A place that displays output when script is run, (3) A place that displays the objects created in this session (e.g., table, dataframe, matrix, etc.), and (4) A place that displays plots or visual outputs.

The analytics console also should include a button or specific command in console to save the script from a given session. The name of saved scripts will appear in table at bottom of page. Selecting a row in the table will open up the script from that saved session.

It will be understood that the invented system may be applied to analyze any business problem or marketing challenge. For example, one may want to know more about their customer, their brand, the other brands in the category, their product, or other products in the category. An appropriate stimulus set and accompanying questions can be selected based on the business or marketing challenge. The system is used to run a study, create the projective tests, score them, and interpret them with the help of the software.

A report can be generated that has information such as: (1) who is the client's customer, (2) the average psychological profiles of the client's customers, (3) what kind of consumer behaviors as associated with these customers, and (4) the value of this segments based on spending power and other consumption outcomes.

The results are useful for a number of reasons. (1) it can help retain current customers, (2) it can help identify a new target audience to market or advertise to, (3) it can help forecast sales if new targets were acquired based on the profiles anticipated spending, and (4) it can help learn more about their current target audience to better convert them to making purchases from the company/brand.

Now, aspects of the invention will be explained from the point-of-view of the consumer (who has signed up to take part in the consumer-facing portion of the web application). The consumer can register for a customer account.

According to the consumer embodiment, consumer view functionality may be provided. If a user is interested in the platform, they will visit the website. On the website, the consumer can select from one of three (or more) plans. Once they select a plan, they are redirected to the payment page. On the payment page, they'll enter their information, such as first name, last name, emails, password, credit card information, and accept the platform license agreement. Once this information is entered, they'll be redirected to the user console home page. Once on the user console home page, the user will be automatically shown an onboarding module. The onboarding module will provide an overview of how to use the platform. Once done with onboarding, the module will disappear, but can always be accessed again through a button on the user home page.

The user has access to two core pages on the consumer portion of the platform, "Take Your Test" page and "See Your Results" page. On the "Take Your Test" page, the user will see a list of tests and test information. For example, the user might see test information such as the date the tests become available to take, whether or not they've taken the test, what test is "upcoming" next, a description of the test, and other information relevant to the user.

On the "Take Your Test" page, if the user has a test available to take, they can click on the "Launch Quiz" button to start the test. Test description and test functionalities may be the same as described earlier.

After each test has been taken, the user can navigate to the "See Your Results" page. On this page the user may be presented with a drop-down menu to select one of the tests they've taken. Once a test is selected, their results from the test will be displayed. This includes data visualizations of predicted user characteristics. In one example of this, the data visualization can show histograms of scores from our entire database. The histogram will have the user's individual score highlight so they see how they perform against the population. This score can also be turned into a percentile so the user knows what percent of the population they scored higher than.

On each data visualization, a user can be presented with interactions, such as survey questions, such as, "Do you think these results accurately describe you?" (Answers: Yes/No) and "Which of the following best describes where you think you are?" (Answers: I think I would be higher/I think I would be lower). The answers to these questions are then used to fine-tune the machine learning algorithms and the predicted results for that user.

At any time and on any page, a chatbot may be provided to users on the screen. The user can use the chatbot for initial directions, guidance on how to use parts of the platform, how to interpret their scores, and what the scores means about them. Standard programming can be employed.

Users may be given access to an "online diary" to record insights that they learn after each test.

Users are given access to "mind maps" which are statistics-based visuals of how their psychological traits are related to one another. Each user characteristics/psychological trait is correlated with all other user characteristics in the database. These correlations are then used to populate a network graph showing how close and far some traits are from each other.

Users may also be given access to "developmental tracking" modules, which show progress against developmental stage benchmarks. For example, the man-machine interface will allow the user to go to a page where they can select different demographic characteristics (e.g., a 40-year old Male, married, with two kids). The platform will show the average score of user characteristics for this particular group of individuals. This way, the user can see if they are higher or lower compared to the typical demographic profile.

According to further embodiments, the algorithm for predicting user characteristics based on answers to a projective test may be the same as described earlier in this document. A user's answer may be broken down into a number of categories. Their selection on an image may be broken down into image-based predictors. Their text response—both describing their image selection and explaining it—is broken down into text-based predictors. The coding of the image and text by an administrator and/or the coding/tagging algorithm is broken down into tag-based predictors. The image-based predictors may include a number of different types of predictors:

Some of the image-based predictors are location based. This includes features like the size of the image selection (in pixels), and the location of the selection (i.e., pixel coordinates of corners).

The image-based predictors also include color-based predictors like average grayscale value or average R, G, and B values (for colored pixels).

Image-based predictors also include engineered features like the percent of whitespace in an image.

The algorithm also computes similarities measures for predictors. If the user says their image selection looks like a pair of lungs, the algorithm pulls an image of lungs from the platform's image database. The algorithm then runs similarity measures between the user's image selection and the image the platform selected. Similarity measures include calculations such as mean-squared error or structural similarity index.

Similarity measures can also include looking at features such as edges, key points, or key point descriptors, among other image-based features not included in this write up.

The text-based predictors include a number of different types of predictors:

The user's responses to both follow-up question 1 and follow-up question 2 are broken down into words and phrases. The frequency of these words and phrases can be used as predictors, indicating the type of content there is in the response.

Text-based predictors can also use the words/phrases to derive the topics of responses. This can be done by focusing on unique keywords with TF-IDF transformation, or using algorithms like latent dirichlet allocation (LDA).

Additionally, the responses from users are scored by an algorithm for sentiment and emotionality, extracting more than just the content of the response.

The algorithm can include other text-based features not included in this write up.

The coding-based predictors include a number of different predictors:

These include codes/tags assigned by a coder (a person reading the response and assigning a specific "code" or "tag") or assigned by a tagging algorithm (also discussed above). These codes usually focus on the themes or topics of the response.

The algorithm can include other coding-based features not included in this document.

Image-based, text-based, and coding-based predictors may be used in determining the user's predicted characteristics. However, there is one slight modification that differs from the algorithm as described above.

For the consumer-facing version of this product, the user can answer a few survey questions, such as, "Do you think these results accurately describe you?" (Answers: Yes/No) and "Which of the following best describes where you think you are?" (Answers: I think I would be higher/I think I would be lower). These two questions can be combined into three categories: the estimate is too high, two low, or just right. We then use an ordinal logistic likelihood function to fit two classifiers—(1) "too high" vs. "just right" and (2) "too low" vs "just right". We can then use predicted user characteristics and the actual user characteristic to predict the predicted performance. When the predicted user score is smaller than their actual score, the negative value indicates that a response of "too low" is most likely. When the predicted user score is bigger than their actual score, the positive value indicates that a response of "too high" is most likely. If the algorithm generates a response to "too high", the resulting predicted score is decreased by 5%. If the algorithm generates a response of "too low", the resulting score is increased by 5%. This allows user feedback to help "penalize" or "correct" for inaccurate predictions.

Now, aspects of the invention will be explained from the point-of-view of other applications that can integrate this platform into their application via an API (application programming interface). The application can register for an account to get a registration key.

Once a registration key has been obtained, to use our embeddable widget the application will have to import a custom script, and add a new HTML custom component: "brand-blots-results" which have some mandatory attributes to fill out in order to tell the script what to visualize/show.

Next, with reference to the drawing figures, exemplary embodiments of the man-machine interface are further explained.

FIG. 1 is a flow chart illustrating steps a survey-taker experiences using the invented system according to one or more embodiments of the present invention. At step S1-1, an electronic communication is generated by the system to the survey taker. For example, a link (e.g., hyperlink) could be sent via an email, SMS message, direct message, HTML or other electronic means.

The survey taker, through his or her device, selects the link and to an interface providing the survey or test. At step S1-2, an interactive display is generated (for example, see FIG. 6) in the survey-taker's device display that allows the survey-take to interact with projective stimulus and to take the survey/test. A screen that is a part of a man-machine interface is provided according to an embodiment of the present invention. This screen is displayed to a survey-taker upon entry into an electronic, automated survey. A projective question/prompt and projective stimuli requiring some kind of interaction are displayed, which can be any type of media—image, video, audio, or text. In this step, the example used is a projective question using an image-based projective stimuli, which can be an inkblot that is predefined or randomly generated. However, the platform is not limited to image based projective stimuli, and could use text-based, video-based, and/or audio-based projective stimuli in addition to the current image-based stimuli one see here. At this stage, the system [server, cloud based, web based] retrieves or generates the image-based projective stimuli included in a chosen or recommended stimuli set. The system also retrieves the question text written or selected by the Survey Administrator to display for each image in the stimuli set. The system then generates the survey page to display the question text and image-based projective stimuli to the respondent.

At step S1-3, interaction is provided to allow the survey-taker to select part of the displayed projective stimulus and at step S1-4, to select or enter data describing the selected part of the stimulus. See, for example, FIGS. 7 and 8 and the accompanying description below. At step S1-5, the interface is configured to provide means for entering further explanation as to why the selected part of the stimulus was selected by the survey-taker. At step S1-6, the survey is concluded and the interface may redirect the user to other content, such as a thank you page, another projective test or survey. The data input into the system by the user is stored and analyzed as described further herein.

Figure 2:
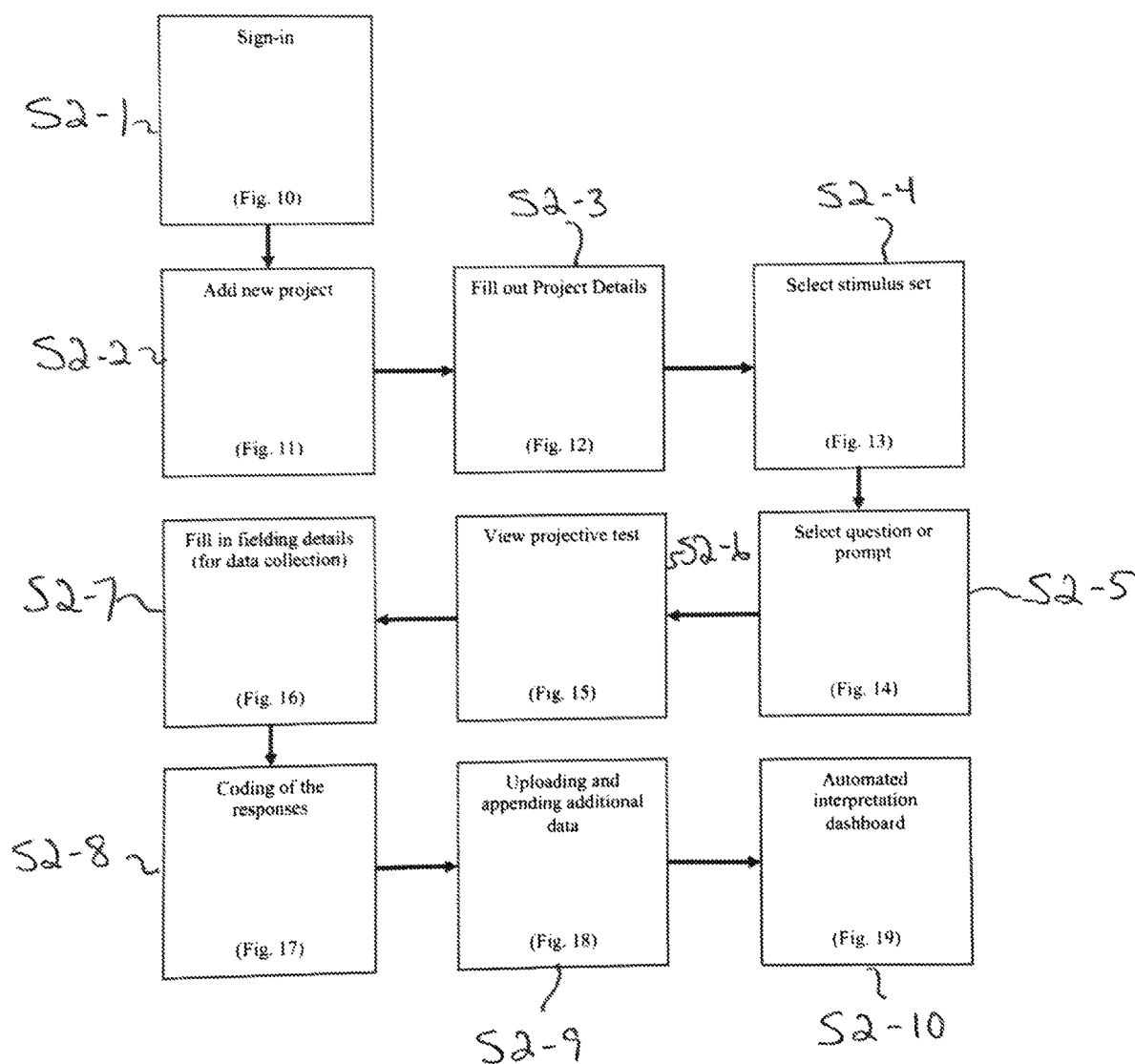
FIG. 2 is a flow chart of the steps for setting up project-level settings according to embodiments of the present invention.

FIG. 2 is a flow chart illustrating steps an administrator experiences using the invented system to set up project-level settings according to one or more embodiments of the present invention. At step S2-1, the administrator must sign into the system and the system will be configured to grant the administrator appropriate security rights according to a stored profile associated with his or her account. Administrator privileges can be applied through conventional means. For example, the system compares the login credential submitted by the survey administrator and attempts to find those credentials in the platforms security database. If the login credentials are a match, the system redirects the user to the home page of the platform. If the login credentials are not a match, the system prompts the user with a login error. There are options to reset your password for those who do not remember, or for those whose login credentials have expired.

A hyperlink or other means for accessing the project is created. At step S2-2, an interface is provided (see, e.g., FIG. 11) that allows the administrator to create a new project. At step S2-3, an interface is provided that allows an administrator to select or enter data relating to setting up the project. See, e.g., FIG. 12 and its accompanying description below. At step S2-4, an interface is provided that allows an administrator to select a stimulus set. For example, the system may be configured to allow a user to view and select pre-stored images, or be provided an interactive display mechanism to modify pre-stored images or to create new images to be stored in association with the present project. Stimulus sets preferably include a plurality of images. Images within a set may be related or unrelated to one another. See, for example, FIG. 13 and its accompanying description below. The project is associated with the selected or created images by the system so that, when a project test is viewed, the images may be displayed to a survey-taker within a man-machine interface according to embodiments of the present invention. For example, project level information can be stored in a relational database such as SQL. The skilled person will understand that other means for electronically storing project level information for later retrieval and interaction can be use. At step S2-5, pre-stored interactions (e.g., text questions, interactive display components, etc.) may be selected to be includes in the project. The system is configured to generate an interactive display including a projective test based on the selected stimulus set and the selected interactions. For example, see FIGS. 14 and 15 below and their accompanying descriptions. Further, step may be provided to allow an administrator to create new interactions through a system interface. For example, an interactive component may be provide to the administrator for entry of text question to be displayed in the projective test. Other interactions can be created as well. The project test is generated and viewed at step S2-6. An algorithm may be provided to order the images in the stimulus set according to criteria. The order may be random or specific. For example, some stimulus sets may be pre-ordered while others may be randomized. The interactions are preferable associated with every image although different interactions may be associated with different images from the stimulus set. The system may be configured to allow the administrator to selective associate images with interactions for a selected project. The projective test is generated and displayed. For example, a combination of HTML, JavaScript and PHP may be used. Other mechanisms for creating a display can be used as well.

At step S2-7, an interface is provide that allows the administrator access to the link that provides electronic access to the generated projective test. Further, the system allows the administrator to set up the automated steps for concluding a projective test, including providing redirect information and information for a custom thank you page that can be generated and displayed according to aspects of the present invention. See, e.g., FIG. 16 and its accompanying description below.

At step S2-8, responses to the projective test may be tagged/coded. The system is configured to analyze each survey takers selections and interactions and to generate a tag/code for each response. Preferably, an AI model is employed to qualify or quantify each response into a tag. A tag is a data representation of the response based on comparisons of the response to test sets or other learning mechanism. For example, as described herein, a scoring algorithm may be used. For example, a screen such may be provided that allows an administrator to accept, decline or modify the tags. See, e.g., FIG. 17 and its accompanying description below.

Next, at step S2-9, additional data may be uploaded and appended to the projective test data. For example, if a survey taker had performed multiple surveys, the system can be configured to automatically aggregate response data (also sometimes called "field" data) based on a unique ID associated with the survey taker, or can be configured to allow an administrator to manually combine data from different projects. See, for example, FIG. 18 below and the accompanying description.

At step S2-10, an automated interpretation dashboard. The dashboard is preferably an interactive display that aggregates generated tag data and includes a novel display mechanism. For example, a JavaScript widget can be provided to aggregate pixel coordinates for all data responses to a particular test and generate a modified image from the associated stimulus sets wherein each pixel is modified (by color, contrast and/or brightness) to visually indicate aggregate scores from data input by survey takers. See, for example, FIGS. 19 and 36.

Figure 3:
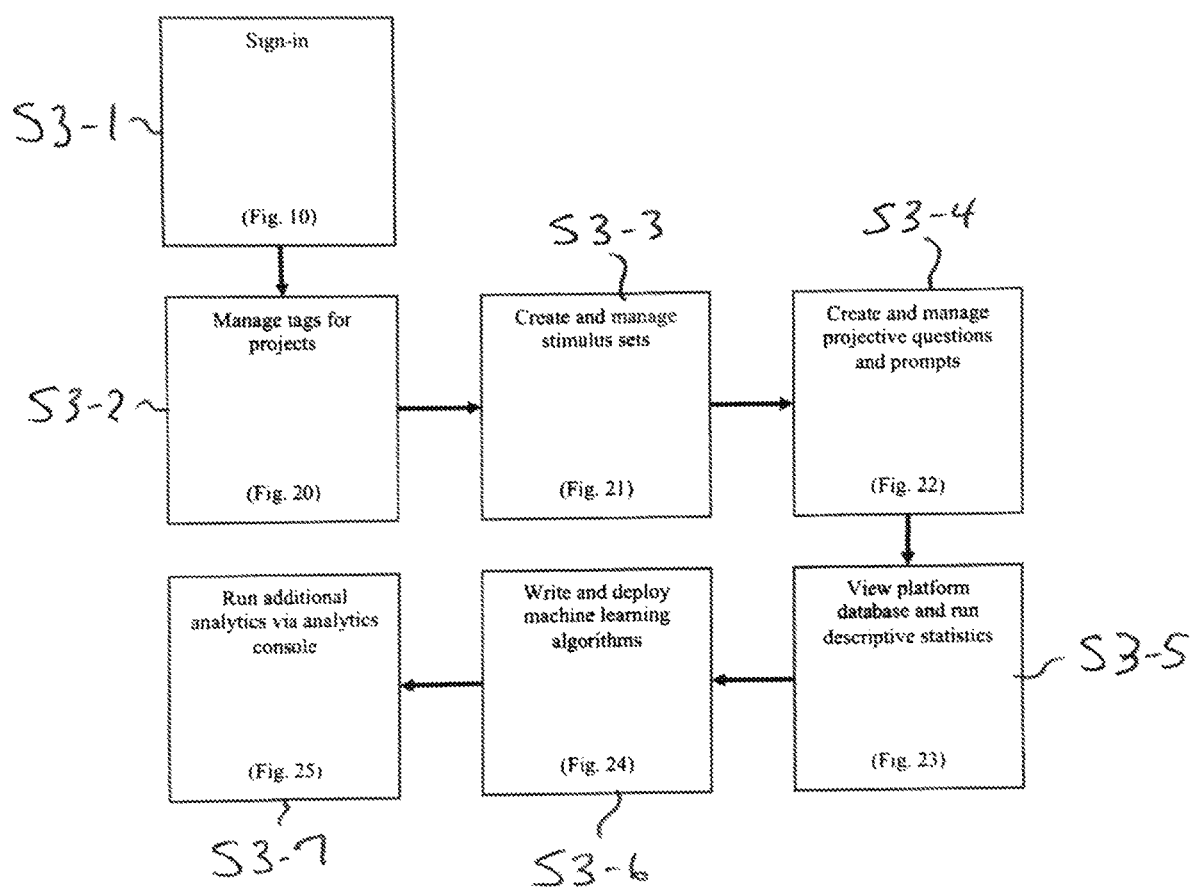
FIG. 3 is a flow chart of the steps for setting up platform-level settings according to embodiments of the present invention.

FIG. 3 is a flow chart illustrating steps an administrator experiences when setting up platform-level setting according to embodiments of the present invention. At step S3-1, the administrator signs into the system using conventional security. See, e.g., FIG. 10. At step S3-2, an administrator is provided means for managing project tag data. Projects can be tagged to indicate what their topic or audience includes. For example, all projects about "beer brands" can have a "beer" tag. According to embodiments of the present invention, the system can generate benchmarks (norms) for all projects with a given tag or tags. An administrator can create different tags to be used and assigned to projects system wide. See, e.g., FIG. 20 and its accompanying description below.

At step S3-3, an administrator can create and manage stimulus sets. For example, an interactive screen may be provide that allows an administrator upload new stimulus sets to be available for use across all projects for a particular administrator or for all administrators. See, e.g., FIG. 21 below and its accompanying description.

At step S3-4, an administrator can create and manage projective interactions, such as questions and prompts that can be associated with stimulus sets for a projective test. For example, see FIG. 22 and its accompanying description below. The interactions are preferably stored and made available for use across all projects for a particular administrator or for all administrators when creating new projects.

At step S3-5, an administrator may view data and execute programs to generate descriptive statistics. For example, a screen may be provided that is configured to allow an administrator to query data and to generator displays that represent statistical analysis for interactions, such as bar charts or histograms. See, e.g., FIG. 23 and its accompanying description below.

At step S3-6, an administrator can create, update and deploy machine learning algorithms. For example, an interactive screen may be provided configured to allow an administrator to access and view an AI model to add or modify features of the model, to retrain or train the model with new or modified data, to train or retrain specific features of a model and then deploy the model back into the system. For example, Python and R may be used for modelling. See, e.g., FIG. 24 and its accompanying description below.

At step S3-7, an administrator may execute additional analytics via an analytics console. For example, an interactive screen can be provide that allows an administrator to enter custom code for analyzing data within the system. See, e.g., FIG. 25 and its accompanying description below.

Figure 4:
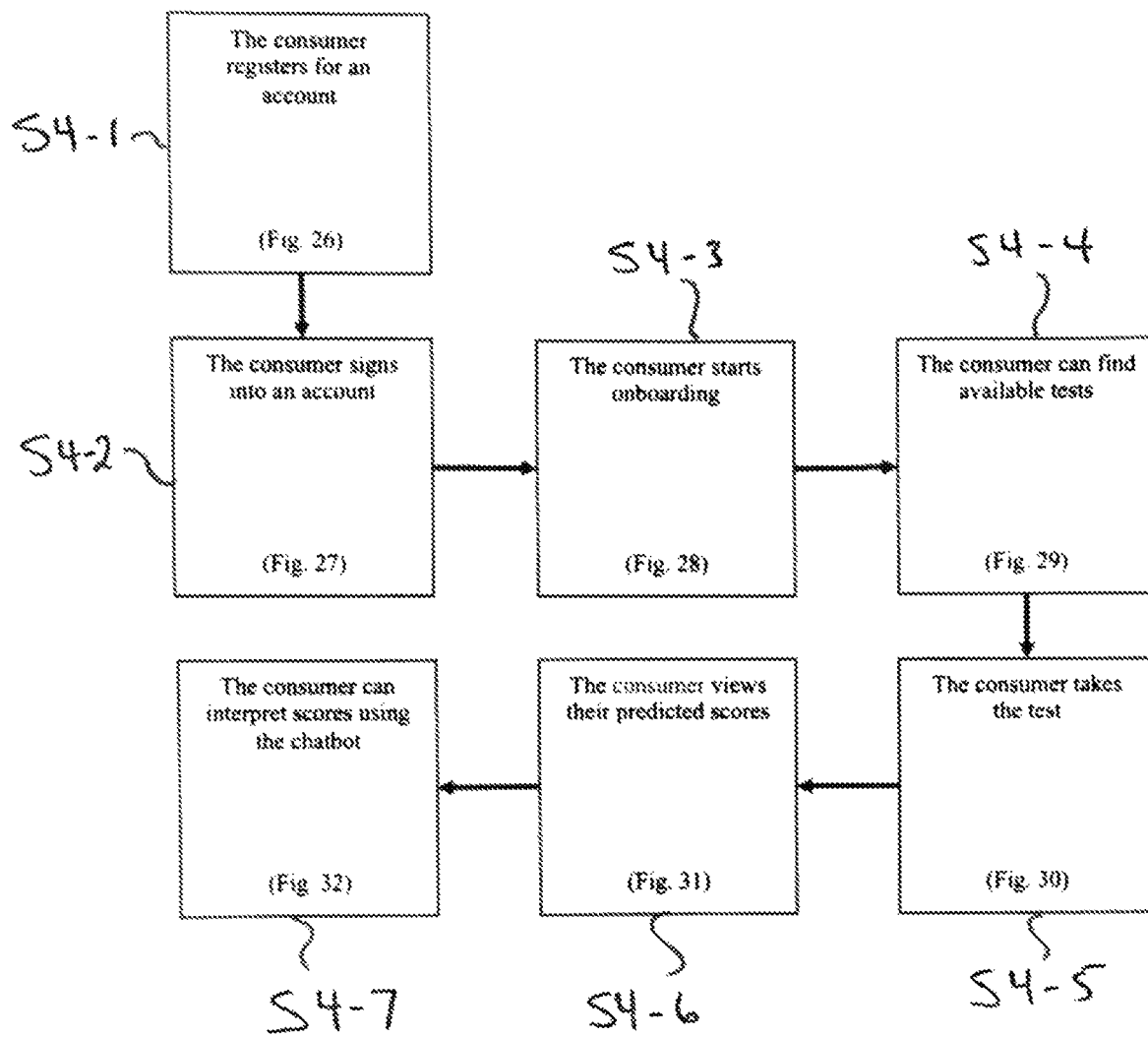
FIG. 4. is a flow chart of the steps a consumer user takes when using the present invention according to embodiments of the present invention.

FIG. 4 is a flow chart illustrating steps a subscribing consumer may experience when using aspects of the present invention, according to embodiments of the present invention. In this case, consumer refers to a person that subscribes to take plurality projective tests via the present invention. At steps S4-1 and 4-2, a consumer registers and accesses the system. See, e.g., FIGS. 26 and 27 and their accompanying description below.

At step S4-3, a consumer is on-boarded. For example, an interactive display is provided to collect data about the consumer to be used by the system and to instruct the consumer how to use the platform. See, e.g., FIG. 28 and its accompanying description below.

At step S4-4, an interactive display may be provided to allow consumers to view and select interactive projective tests available to be taken through the invented system. See, e.g., FIG. 29 and its accompanying description below.

At step S4-5, the consumer takes the test as described herein. See, e.g., FIG. 30 and its accompanying description below. At step S4-6, the consumer is provide means for viewing their predicted characteristics. For example, as described herein a predictive algorithm is provided that takes tags/codes from the scoring algorithm, response data, selected stimulus data, and consumer data (e.g., demographic and other data collected during on-boarding), using artificial intelligence, predicts characteristics associated with the consumer. For example, psychological characteristics to be predicted can include measures of personality, perceptual style, measures of motivation, biases in heuristics, identify measures, persuasion, emotion, working style and workplace traits. Selected stimulus data may be broken down into image based features, such as white area, average gray amount, or average pixel color in a selection. The predicted characteristics are displayed to the consumer. See, e.g., FIG. 31 and its accompanying description below.

At step S4-7, a "chatbot" may be provided to allow consumers to learn about what their test results mean. See, e.g., FIG. 32 and its accompanying description below. The chatbot is preferably an interaction with an AI model that is configured to identify a correct response to free form text input into the chatbot. The chatbot may use an electronic dictionary to define user characteristics (e.g., psychological variables), define score ranges (e.g., high, low, average), to identify implications of consumer's scores. For example, a chatbot may be deployed using AMAZON LEX or other commercially available tools.

Figure 5:
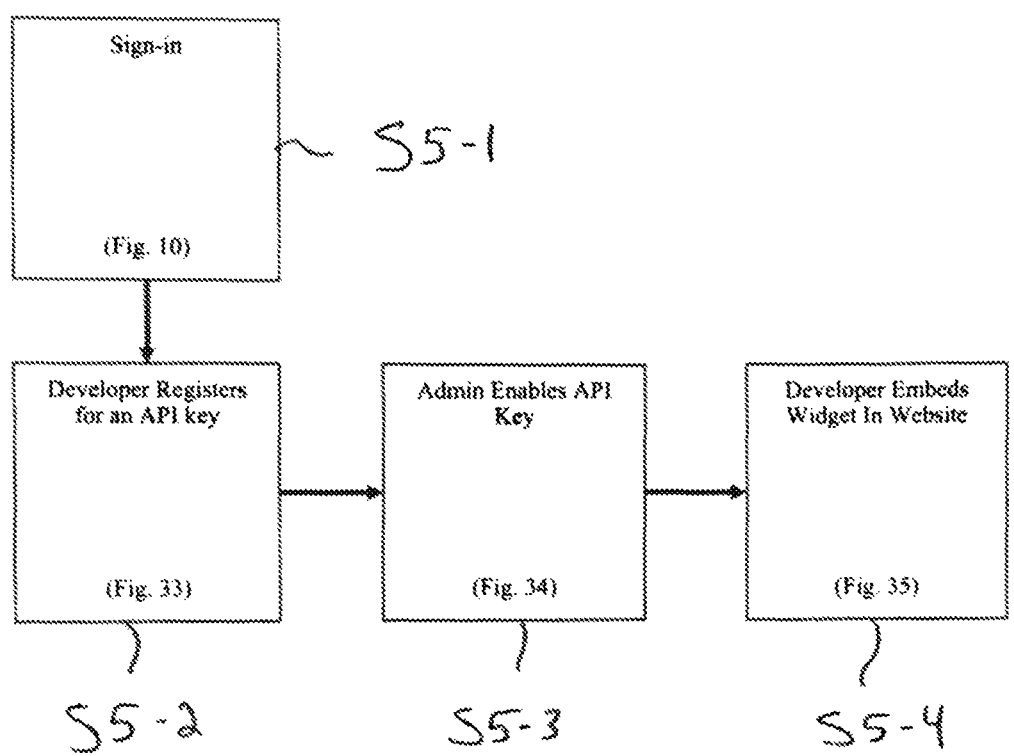
FIG. 5 is a flow chart of the steps used to integrate the present invention into another application via an API according to embodiments of the present invention.

FIG. 5 is a flow chart illustrating steps to implement an API to integrate with the invented system according to embodiments of the present invention. At step S5-1, a user signs into the system and is provide appropriate access. At step S5-2, a user registers for an API key. An interactive screen may be provided that generates a unique key for accessing an API. See, e.g., FIG. 33 and its accompanying description below. At step S5-3, the system may automatically, or an administrator may manually, approve or disable the key based on criterion, such as payment received. See, e.g., FIG. 34 and its accompanying description below. At step S5-4, a projective test or visualization of a test, is integrated into the users website via, for example, an HTML element, JavaScript library, etc. See FIG. 35 below and its accompanying description.

The above flow charts are providing with an exemplary order of steps only for convenience of describing the invention. It should be understood that many of the step can be performed in different orders or omitted. For example, if screens are configured with tabs for interaction, one a project is created, an administrator can perform many steps in an order of his or her preference. Of course, the skilled person will understand that certain steps must be perform first, such as creating a project or uploading stimulus images, before other steps can be performed. Nevertheless, the invention is not limited to the ordering of steps illustrated in the Figures.

Next, the figures showing exemplary screens of the inventive system will be described according to embodiments of the present invention. The descriptions of each of the screens that follow should be read in context of this entire patent document and especially in light of the above-described processes. Each screen include components that the skilled person will readily understand from their labels and shape and moreover, much of the content of the figures are self-evident. Therefore, the details of these figures will only be described as necessary to explain the features of the present invention. The skilled person will readily understand how to configure such screens using a combination of HTML, JavaScript, PHP and other known programming and mark-up languages.

Figure 6:
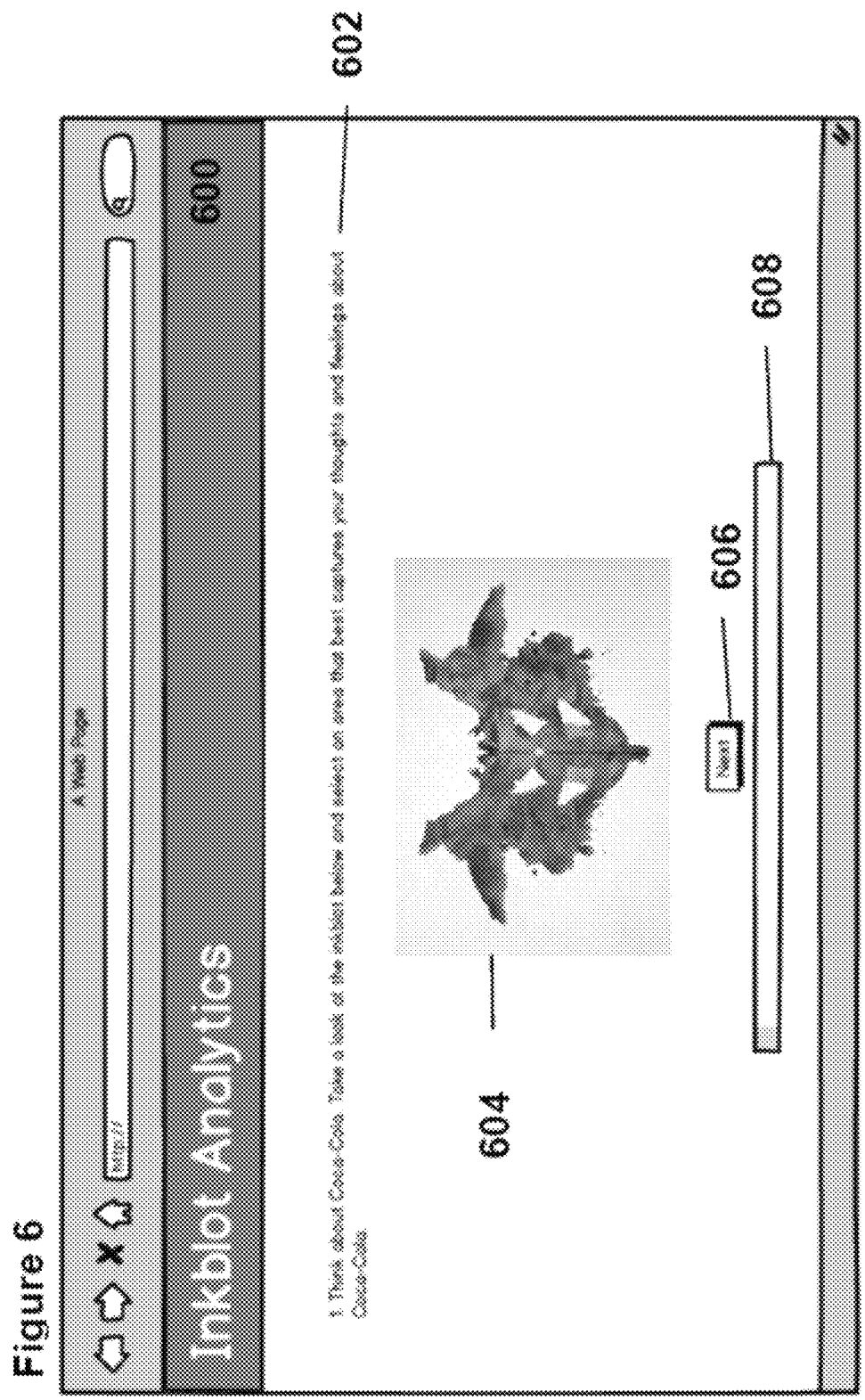
FIG. 6 illustrates an exemplary screen for a projective test that is a part of a man-machine interface according to embodiments of the present invention.

FIG. 6 illustrates an exemplary screen shot 600 of a web page which may be provided as part of the inventive system and provided to a survey-taker in accordance with embodiments of the present invention. Web page 600 includes an interaction 602 and a display component configured to display a selected stimulus image 604 for the associated project or projective test as set up above. As shown, the interaction 602 is a text question, but could include other interactive display components such as drop downs, radio groups, etc. The web page also include a component 606 (e.g., next button) for navigating to another web page and a display component 608 for displaying progress. According to embodiments of the invention, the next button 606 is configured to navigate to the screen shown in FIG. 7.

Figure 7:
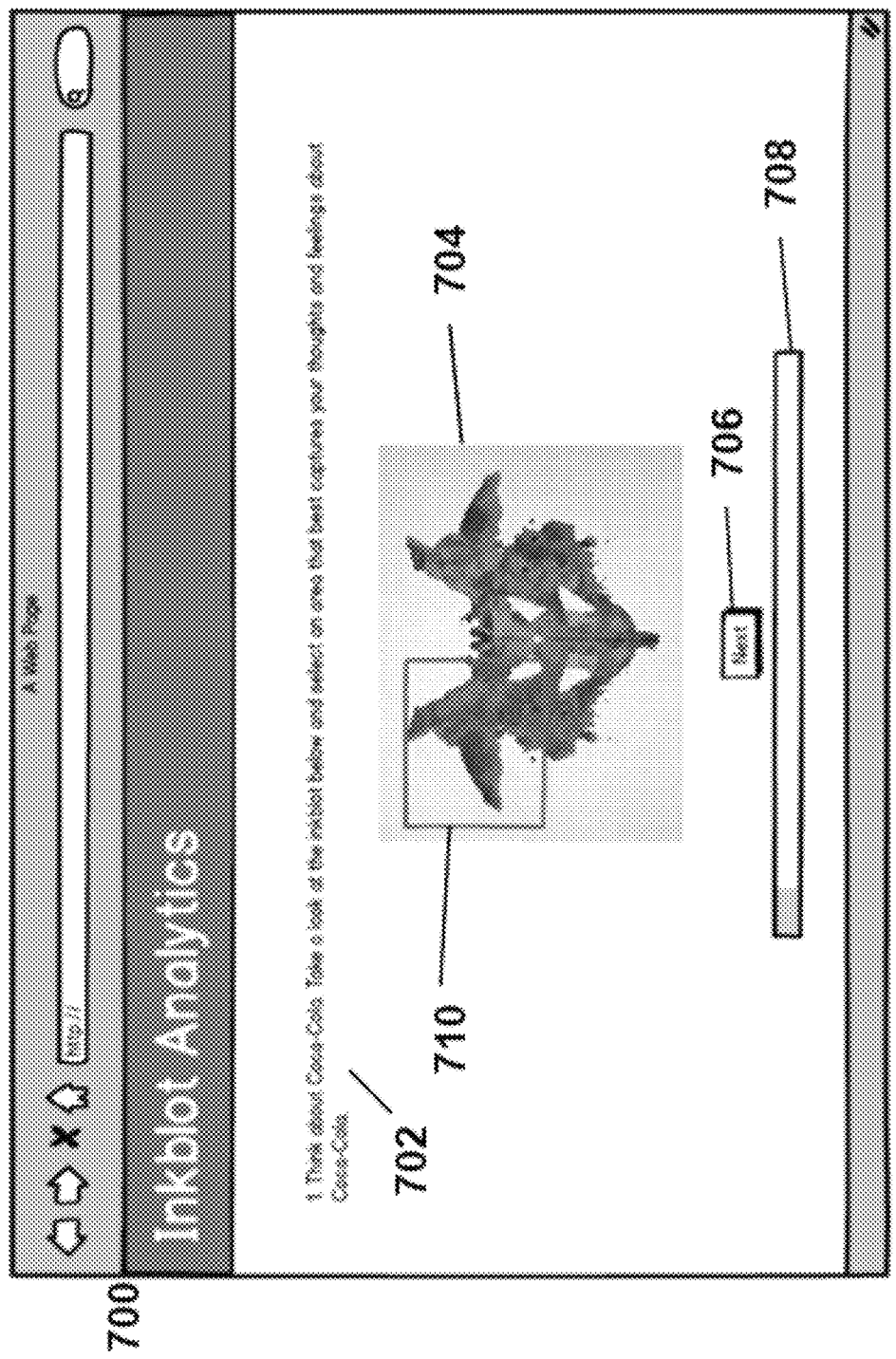
FIG. 7 illustrates an exemplary screen for a projective test that is a part of a man-machine interface according to embodiments of the present invention.

FIG. 7 illustrates an exemplary screen shot 700 of a web page which may be provided as part of the inventive system and provided to a survey-taker in accordance with embodiments of the present invention. In web page 700, the interaction 702 is provided as the same as interaction 602. Display component 704 is configured to display a selected stimulus image 604 and to allow a user to select an area of the stimulus image. For example, web page could be configured to receive input from an I/O device, such as a mouse, to select an area 710 of the display component 704. The system is configured to record data relating to the area selected, including the pixel data (location, color, contrast, brightness) for the pixels within the selected area 710. The web page also include a component 706 (e.g., next button) for navigating to another web page and a display component 708 for displaying progress. According to embodiments of the invention, the next button 706 is configured to navigate to the screen shown in FIG. 8.

Figure 8:
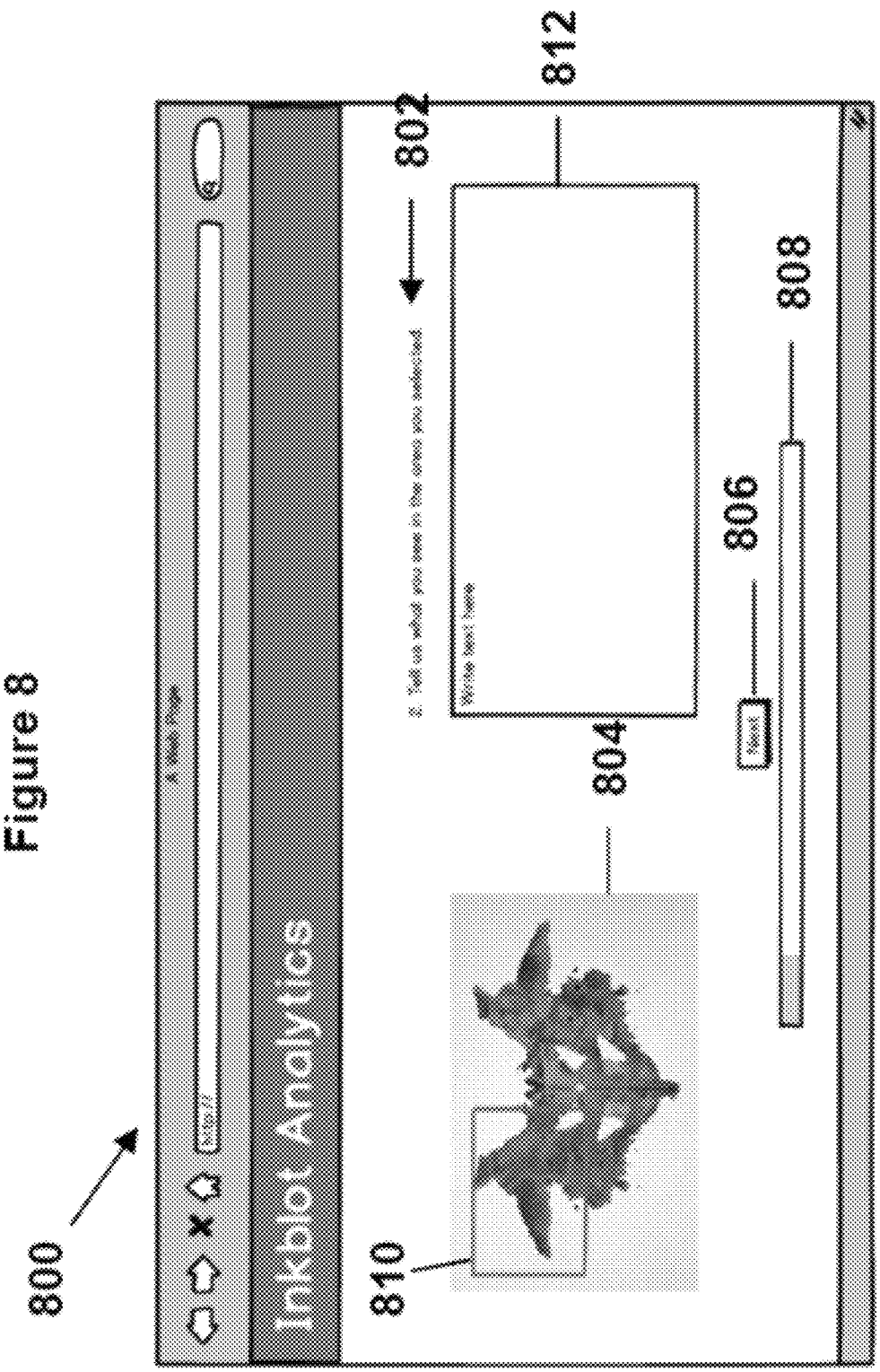
FIG. 8 illustrates an exemplary screen for a projective test that is a part of a man-machine interface according to embodiments of the present invention.

FIG. 8 illustrates an exemplary screen shot 800 of a web page which may be provided as part of the inventive system and provided to a survey-taker during a projective test where the survey-taker is asked to provide further data relating to the selected area 710, in accordance with embodiments of the present invention. In web page 800, a display component 804 is displayed as the same as interaction 704 including an area 810 that is the same as the selected area 710. Web page 800 also include an interactive component 812 configured to receive additional data relating to area 810. In this case, a text question 802 and a text input field 812 are provided. The web page also include a component 806 (e.g., next button) for navigating to another web page and a display component 808 for displaying progress. According to embodiments of the invention, the next button 806 is configured to navigate to the screen shown in FIG. 9.

Figure 9:
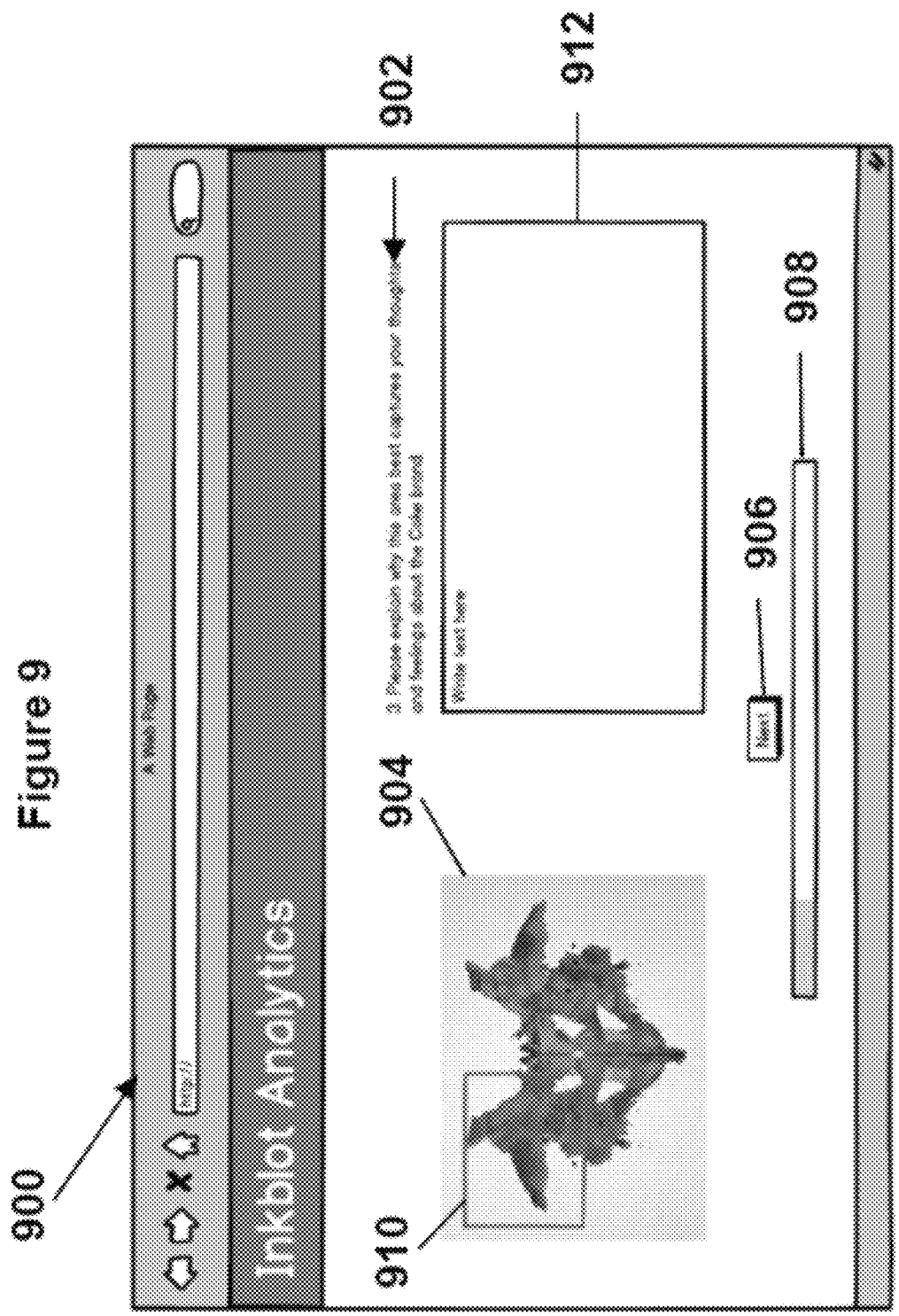
FIG. 9 illustrates an exemplary screen for a projective test that is a part of a man-machine interface according to embodiments of the present invention.

FIG. 9 illustrates an exemplary screen shot 900 of a web page which may be provided as part of the inventive system and provided to a survey-taker during a projective test where the survey-taker is asked to provide further data relating to the selected area 710, in accordance with embodiments of the present invention. In web page 900, a display component 904 is displayed as the same as interaction 704 including an area 910 that is the same as the selected area 710. Web page 900 also include an interactive component 912 configured to receive additional data relating to area 910. In this case, a text question 902 and a text input field 912 are provided. The web page also include a component 906 (e.g., next button) for navigating to another web page and a display component 908 for displaying progress. According to embodiments of the invention, the next button 906 is configured to navigate to a redirect set up by the administrator as described herein.

Figure 10:
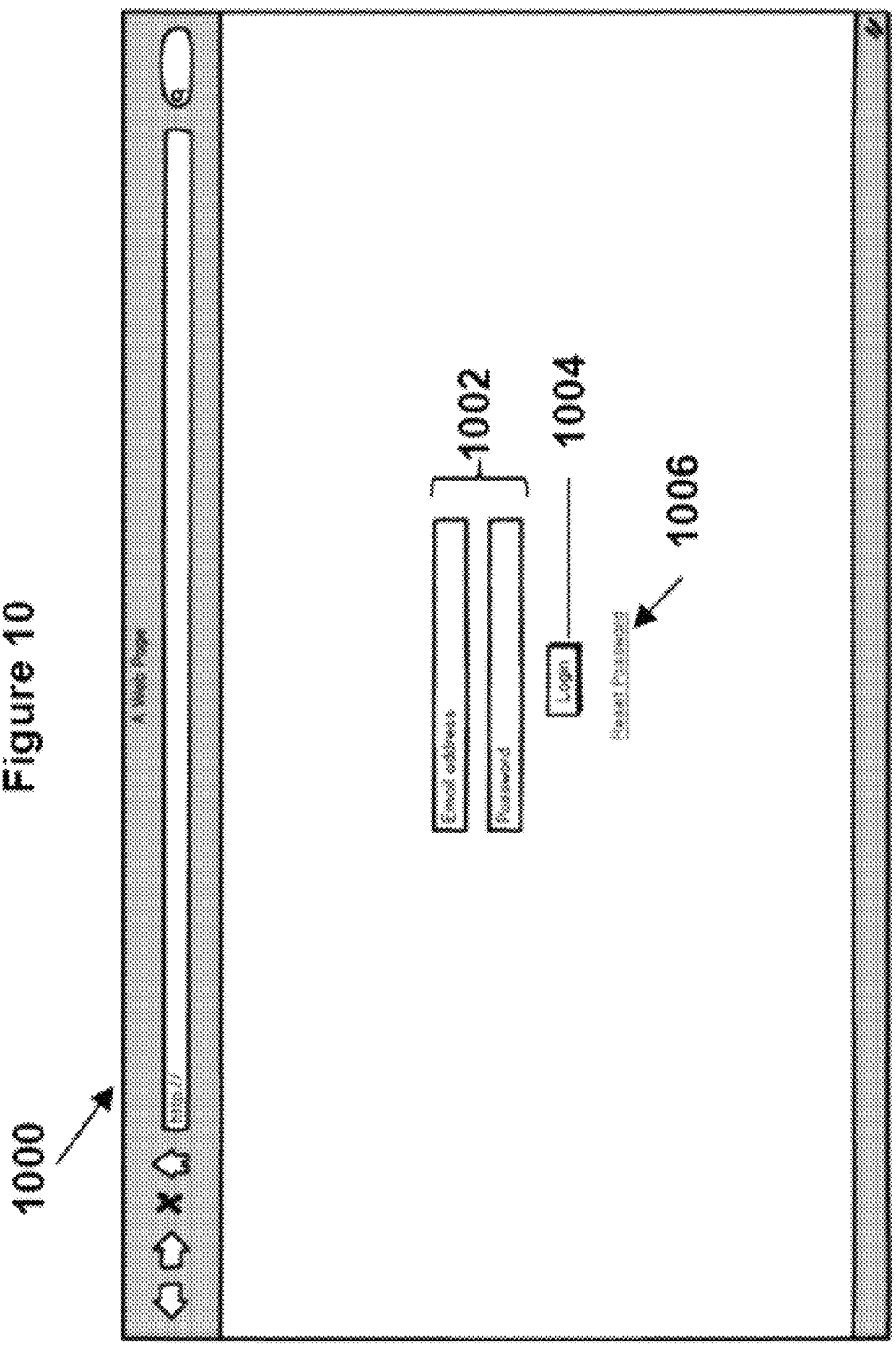
FIG. 10 illustrates an exemplary screen for administration that is a part of a man-machine interface according to embodiments of the present invention.

FIG. 10 is an illustration of an exemplary screen 1000 an administrator would use to sign into the inventive system. In this example, standard input fields 1002, a login button 1004 and a link for changing a password 1006 are provided. The skilled person will readily understand how to configure a login screen according to the present invention.

Figure 11:
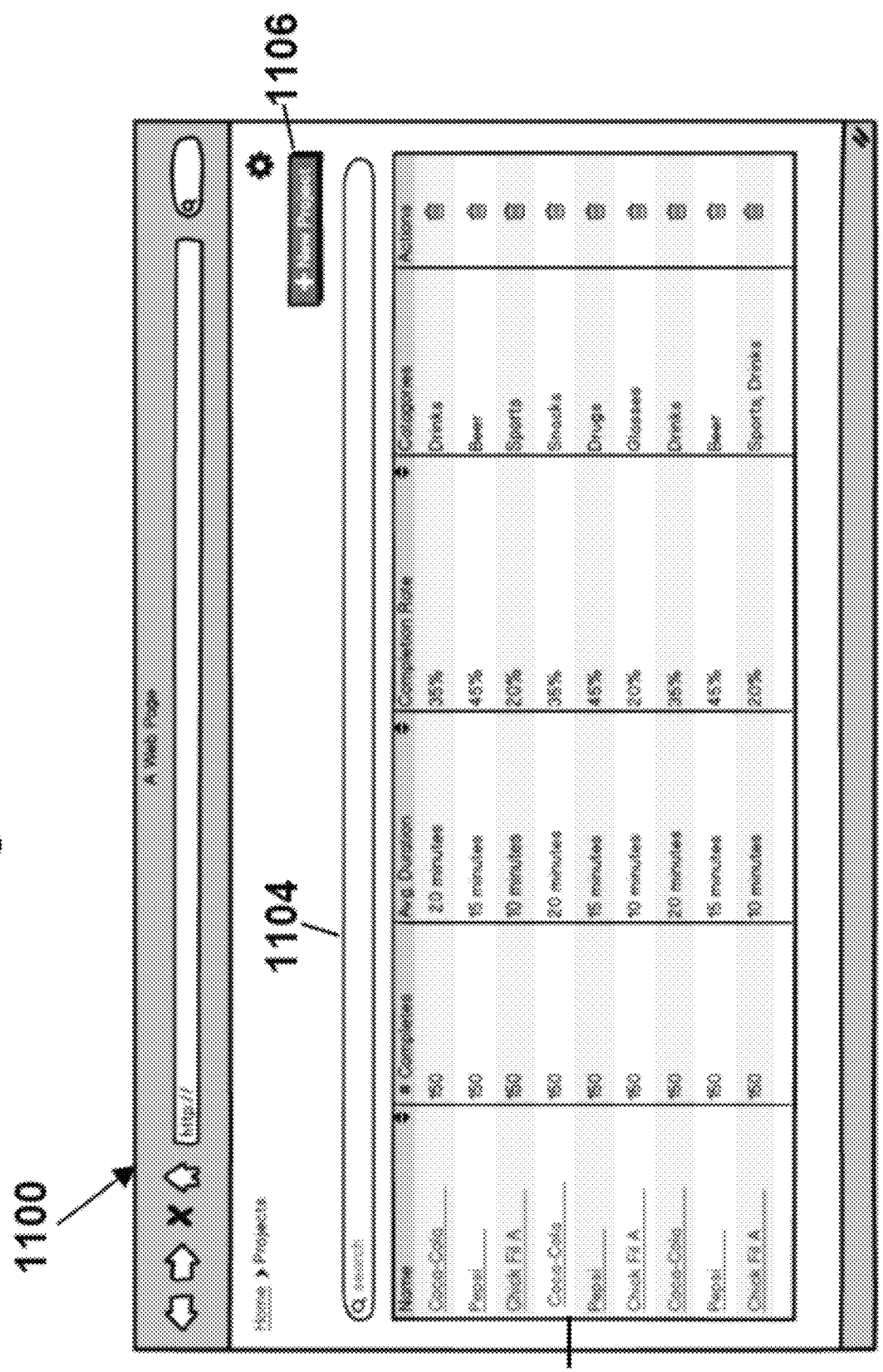
FIG. 11 illustrates an exemplary screen for administration of projective tests that is a part of a man-machine interface according to embodiments of the present invention.

FIG. 11 illustrates an exemplary screen 1100 configured to allow an administrator to create a new project or to view existing, stored projects, according to embodiments of the present invention. Screen 1100 includes an interactive display area 1102 for displaying project information in a selectable manner; and a search input field 1104 and is configured to use input therefore to query an associated database (not shown) where projects are stored and to narrow the display area 1102. A button 1106 or other interactive display component may be provided to initiating a new project. Button 1106 can be configured to navigate to the screen shown in FIG. 12.

Some information is displayed for each project, including, but not limited to, how long (in minutes) the survey takes, how many people have completed the survey, and what category or topic (e.g., for market research this could be product categories such as beer, automotive, clothing, etc.) the project is based on, the type of stimuli, ambiguity of stimuli, and goal of projective task. The survey administrator can either enter an existing project by clicking on it or start a new project by clicking on the "+New Project" button.

In some embodiments, upon login, the system queries the list of projects from the database (e.g., RDBMS, MySQL, etc.). For each project, the system extracts information and calculates the number of subjects that have completed the survey the average time it took each subject to take the survey and the percentage of subjects that completed the survey.

The system then sends this information to the client, via, e.g., JavaScript embedded in HTML, HTML5, JSON objects, etc., to a client running on a user's web browser. This client accepts the information and displays the data in a table format on the page.

Figure 12:
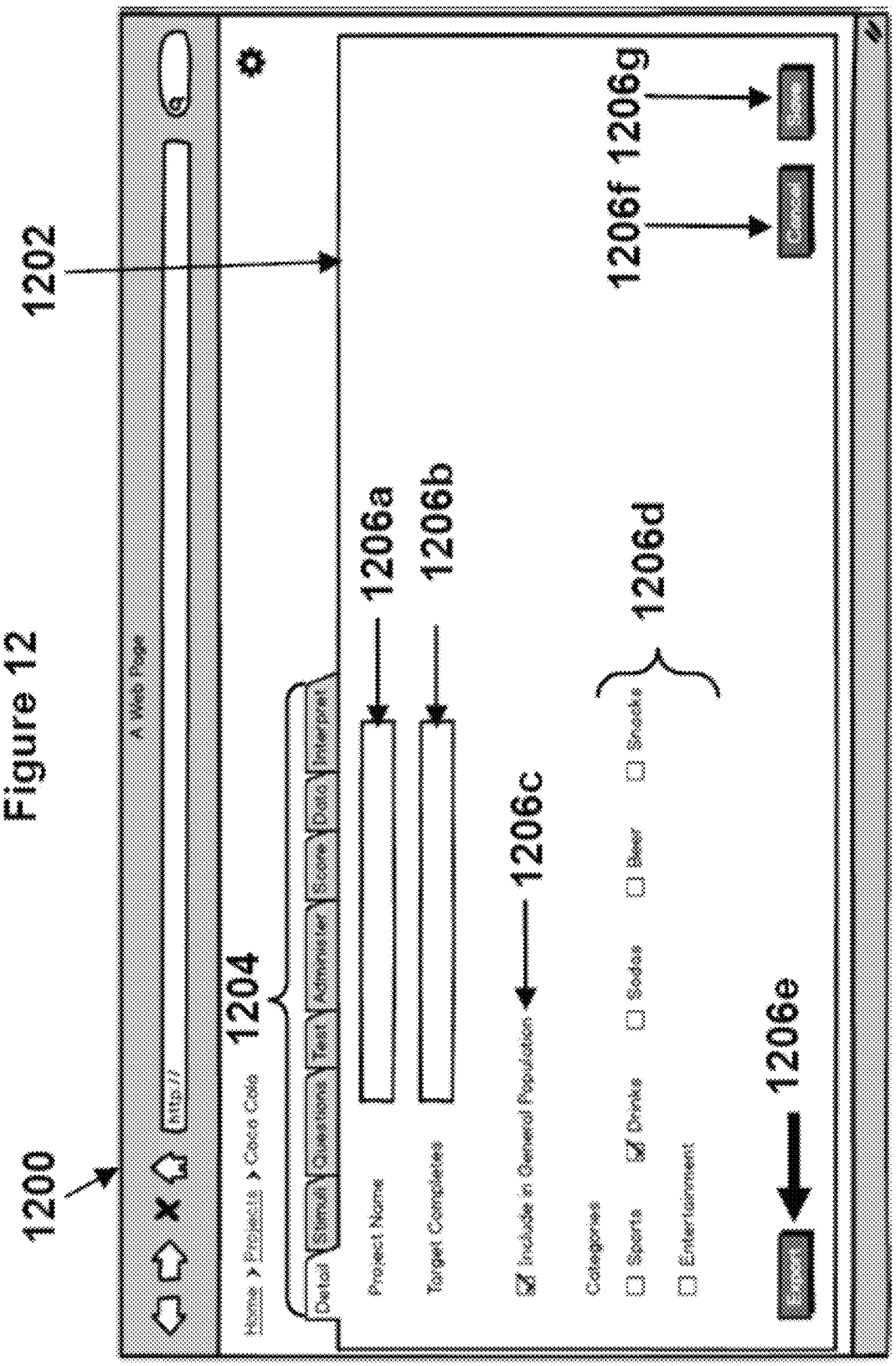
FIG. 12 illustrates an exemplary screen for entering data for a new project that is a part of a man-machine interface according to embodiments of the present invention.

FIG. 12 illustrates an exemplary screen 1200 configured to allow an administrator to enter parameter defining new project according to embodiments of the present invention. Screen 1200 includes a detailed display area 1202 and a number of tabs 1204, which are configured to navigate between screens. Display area 1202 may include a number of interactive components 1206a-d for entering parameter data for setting up a new project. Screen 1200 may include buttons configured to perform additional functions, such an export button 1206e for initiating an export of project data, a cancel button 1206f for cancelling the project, and a save button 1206g for posting and storing data from this screen to the database.

Figure 13:
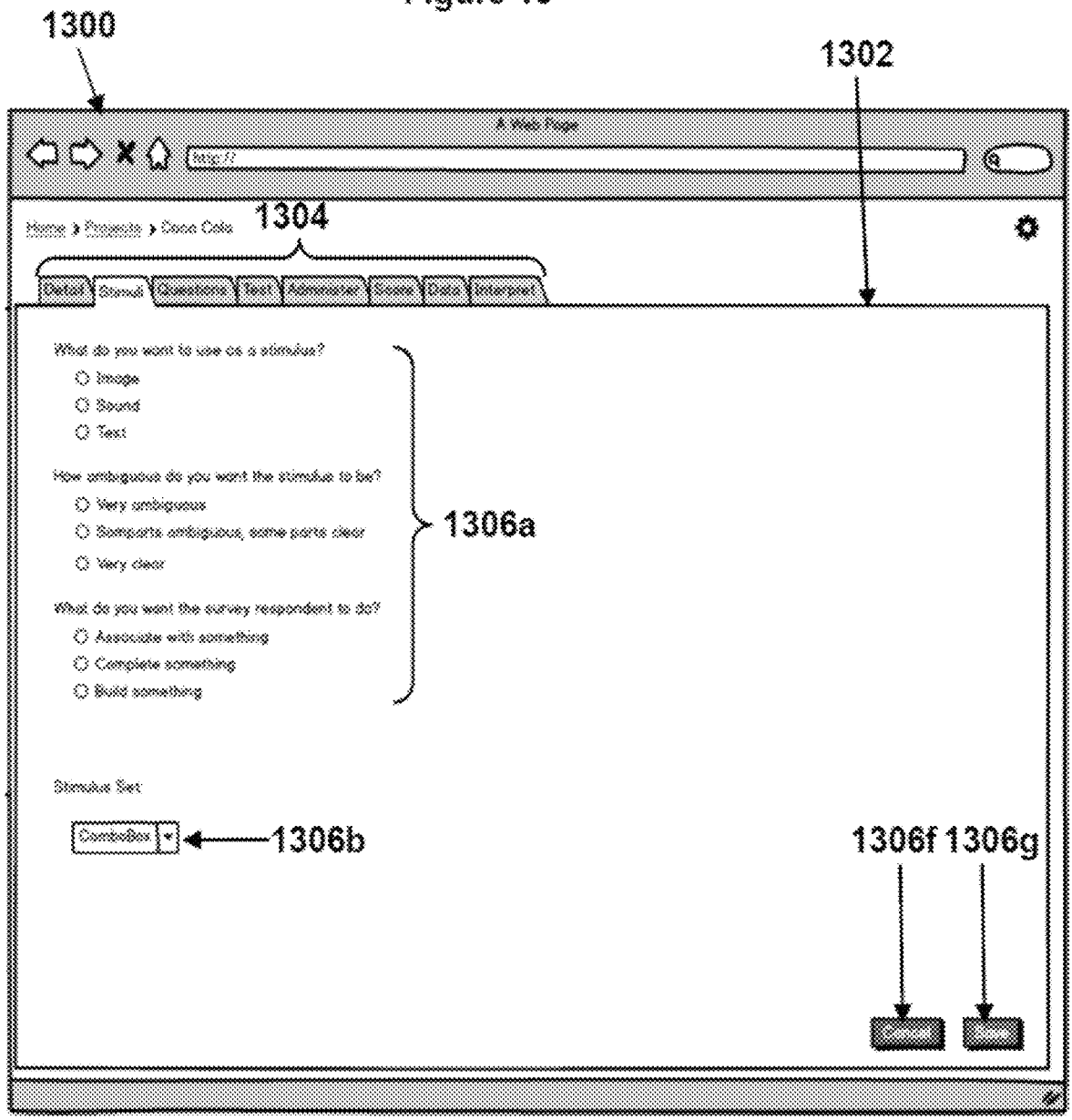
FIG. 13 illustrates an exemplary screen for selecting projective test stimuli set that is a part of a man-machine interface according to embodiments of the present invention.

FIG. 13 illustrates an exemplary screen 1300 configured to allow an administrator to select a projective test stimuli set according to embodiments of the present invention. Screen 1300 includes a detailed display area 1302 and a number of tabs 1304, which are configured to navigate between screens. Display area 1302 may include a number of interactive components 1306a-b for entering data for selecting or building a stimulus set. The system is configured to generate a stimulus set base on the selections from screen 1300 and store the same in the database. Screen 1300 may include buttons configured to perform additional functions, such a cancel button 1306f for cancelling the current entries, and a save button 1306g for posting and storing data from this screen to the database.

The criteria the survey administer can set includes: what type of projective stimuli is used (text, image, video, audio, etc.), how ambiguous the projective stimuli is (very ambiguous, somewhat ambiguous and somewhat clear, very clear, etc.), and what the goal of the projective task is (associate with something, complete something, build something, etc.).

Figure 14:
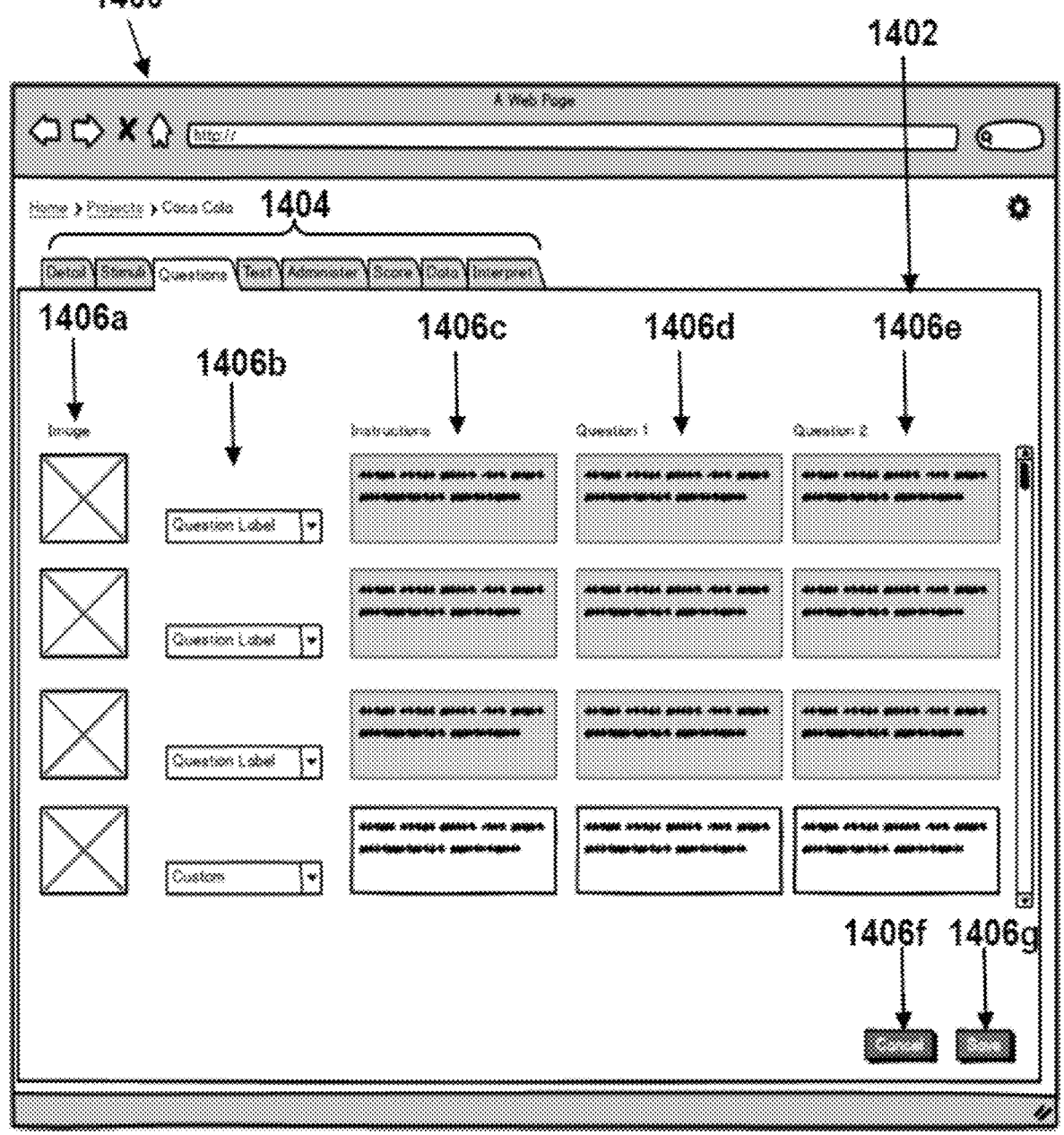
FIG. 14 illustrates an exemplary screen for selecting interactions for the projective test that is a part of a man-machine interface according to embodiments of the present invention.

FIG. 14 illustrates an exemplary screen 1400 configured to allow an administrator to select the prompts used as interactions for the projective test according to embodiments of the present invention. Screen 1400 includes a detailed display area 1402 and a number of tabs 1404, which are configured to navigate between screens. Display area 1402 may include a number of interactive components 1406a-e for selecting and entering data for building a set of interactions for each image. As shown, there is an image column 1406a, a question label column 1406b, and text entry fields 1406c-e. The system is configured to take the selections from screen 1400 and store the same in the database for access and use with the associate projective test. Screen 1400 may include buttons configured to perform additional functions, such a cancel button 1406f for cancelling the current entries, and a save button 1406g for posting and storing data from this screen to the database.

Figure 15:
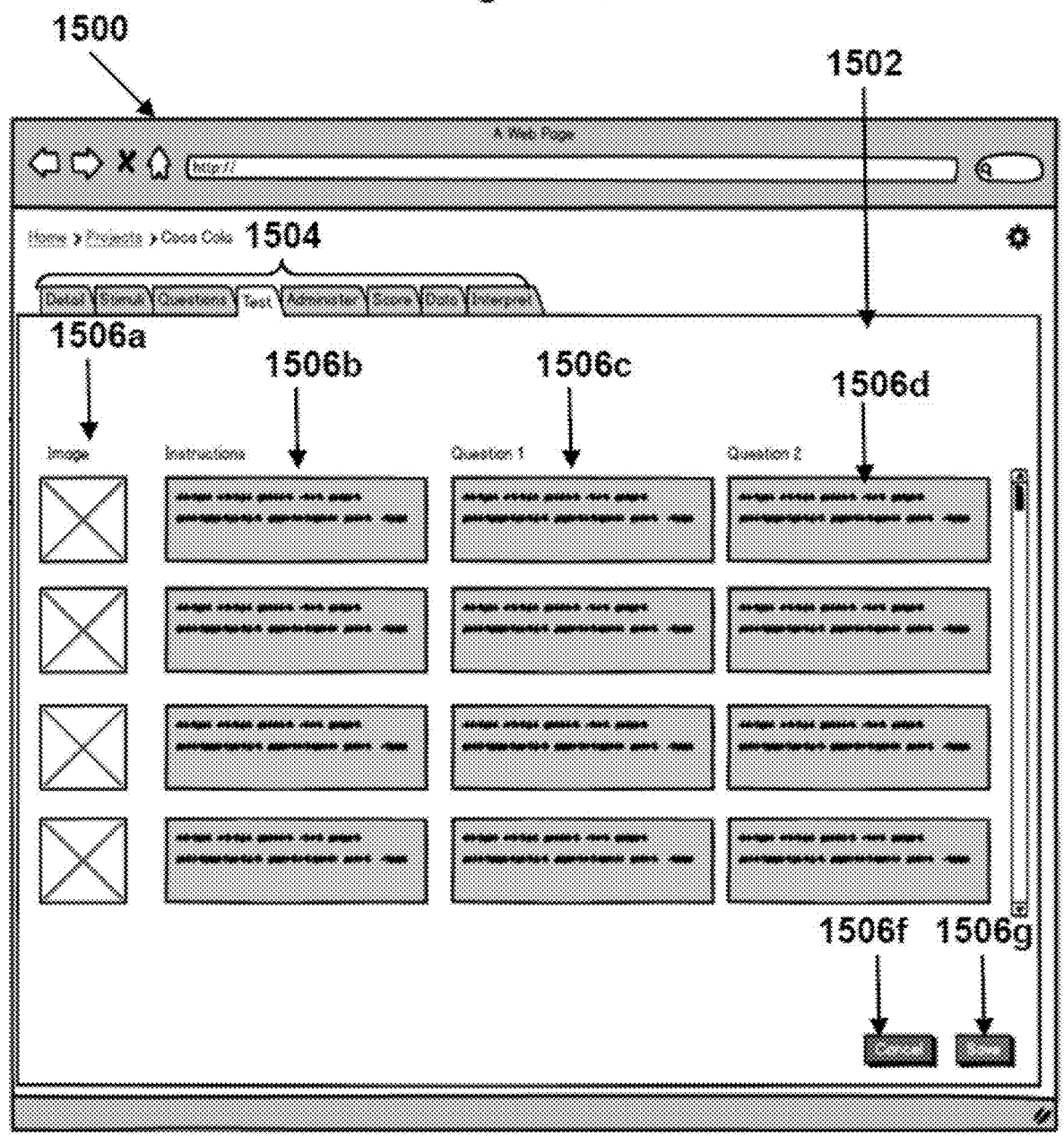
FIG. 15 illustrates an exemplary screen to confirm a projective test selected that is a part of a man-machine interface according to embodiments of the present invention.

FIG. 15 illustrates an exemplary screen 1500 configured to allow an administrator to confirm the projective test selected according to embodiments of the present invention. Screen 1500 includes a detailed display area 1502 and a number of tabs 1504, which are configured to navigate between screens. Display area 1502 may include a number of interactive components 1506a-d for viewing data for building a set of interactions for each image. As shown, there is an image column 1506a and text entry fields 1506b-d corresponding to columns 1406a and 1406c-e. Screen 1500 may include buttons configured to perform additional functions, such a cancel button 1506f for cancelling the current entries, and a save button 1506g for posting and storing data from this screen to the database.

Figure 16:
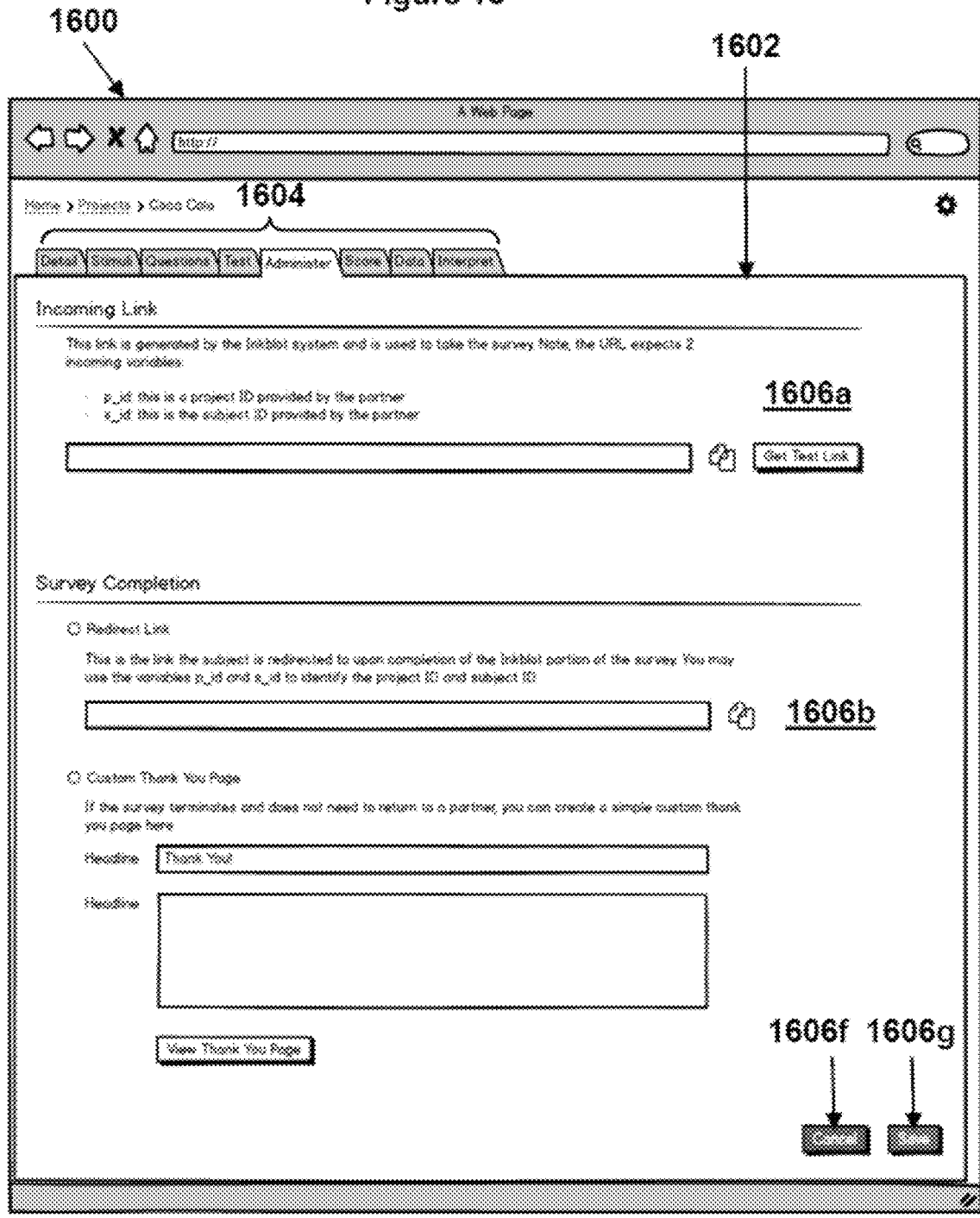
FIG. 16 illustrates an exemplary screen for connecting a projective test to other surveys that is a part of a man-machine interface according to embodiments of the present invention.

FIG. 16 illustrates an exemplary screen 1600 configured to allow an administrator to connect the projective test to other surveys according to embodiments of the present invention. Screen 1600 includes a detailed display area 1602 and a number of tabs 1604, which are configured to navigate between screens. Display area 1602 may include a number of interactive components 1606a-b for entering data for connecting to other surveys. Incoming link section 1606a is configured to allow the administrator to obtain a link for accessing the created projective test. Survey completion area 1606b is configured to allow the administrator to create a redirect link to be used at the completion of respective projective test as well as to generate completion page. Screen 1600 may include buttons configured to perform additional functions, such a cancel button 1606f for cancelling the current entries, and a save button 1606g for posting and storing data from this screen to the database.

Figure 17:
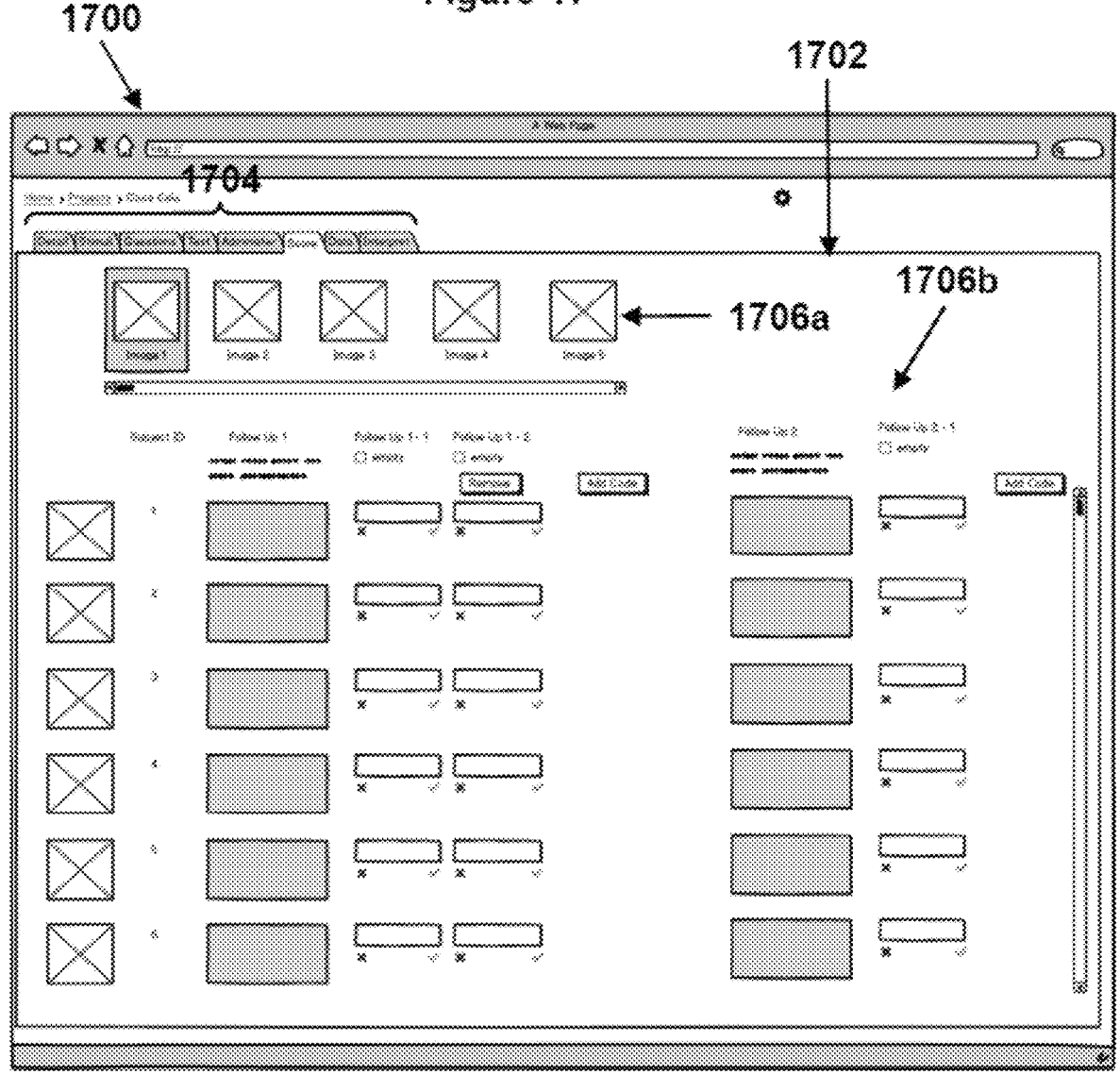
FIG. 17 illustrates for coding, tagging and scoring data that is a part of a man-machine interface according to embodiments of the present invention.

FIG. 17 illustrates an exemplary screen 1700 configured to allow an administrator to code/tag and score the data according to embodiments of the present invention. Screen 1700 includes a detailed display area 1702 and a number of tabs 1704, which are configured to navigate between screens. Display area 1702 may include a number of interactive components 1706a-b for selecting an image and entering tags/codes for the data associated therewith as already described herein.

In some embodiments, a "Score" tab is provided for viewing and analyzing data received by the system (e.g., from interaction with the MMI during a projective test). This tab should include the stimuli displayed in projects to respondents. The administrator may click on one of the stimuli, which will then tell the system to show all responses (i.e., image selections, follow-up question #1, and follow-up question #2) from that project that are associated with that stimuli. Once visible, interface objects are provide to allow a user to "code" or "tag" each follow-up question. Text boxes may be provided for performing this function and may be pre-filled based on the platform's scoring algorithm. This algorithm takes into consideration, for example, at least three inputs: (1) the image shown, (2) area selected, (3) the text used in follow-up questions about that area. Based on that information, and perhaps other information, the system predicts the likelihood of how that response should be tagged. Additionally, a "checkmark" and an "X" can be provided next to each pre-filled textbox. Selecting the "checkmark" saves the predicted code as correct. Selecting the "X" tells the algorithm that this is incorrect. One can then write in the proper tag/code. This allows the "scoring algorithm" to continually improve on its "coding" or "tagging" of projective test responses.

In some embodiments, if the survey respondents have taken other surveys, or if there is pre-existing data on these individual (e.g., such as data in a CRM database), one can upload this data on the "Data" page. The platform is configured to pair the projective test responses with the additional data sets using some unique identifier.

Figure 18:
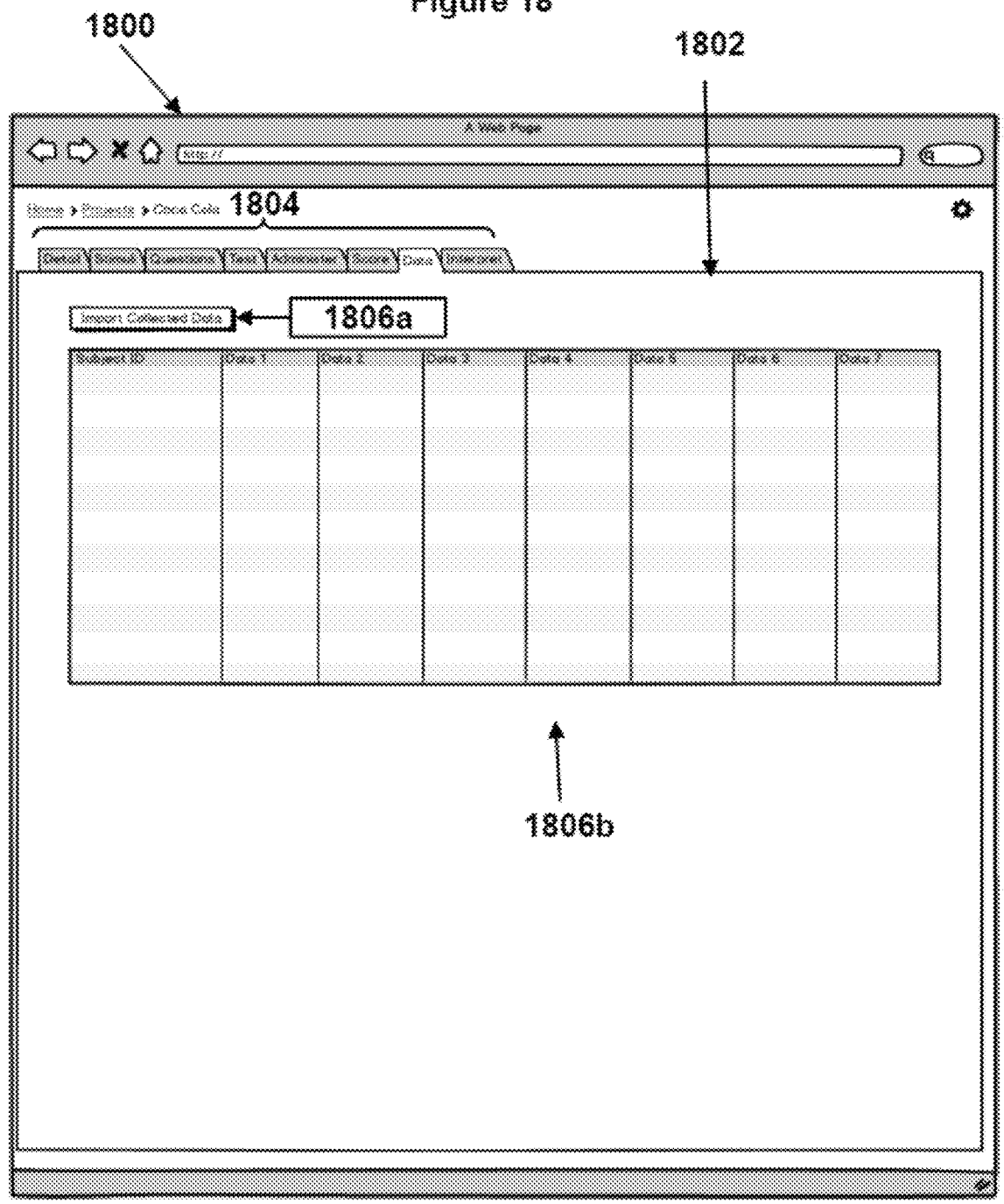
FIG. 18 illustrates an exemplary screen for appending other datasets to the projective test data that is a part of a man-machine interface according to embodiments of the present invention.

FIG. 18 illustrates an exemplary screen 1800 configured to allow an administrator to append other datasets to the projective test data according to embodiments of the present invention. Screen 1800 includes a detailed display area 1802 and a number of tabs 1804, which are configured to navigate between screens. Display area 1802 may include a number of interactive components 1806a-b configured for importing collected data to be appended to projective test date.

If the user clicks on the Import Collected Data 1806a, the client shows a file browser for the user to select the data to import. Upon selection of a file, the client accepts the file and sends it to the system. The system receives this data and stores the data in a MongoDB database, including a reference to the survey id the data is associated with.

Figure 19:
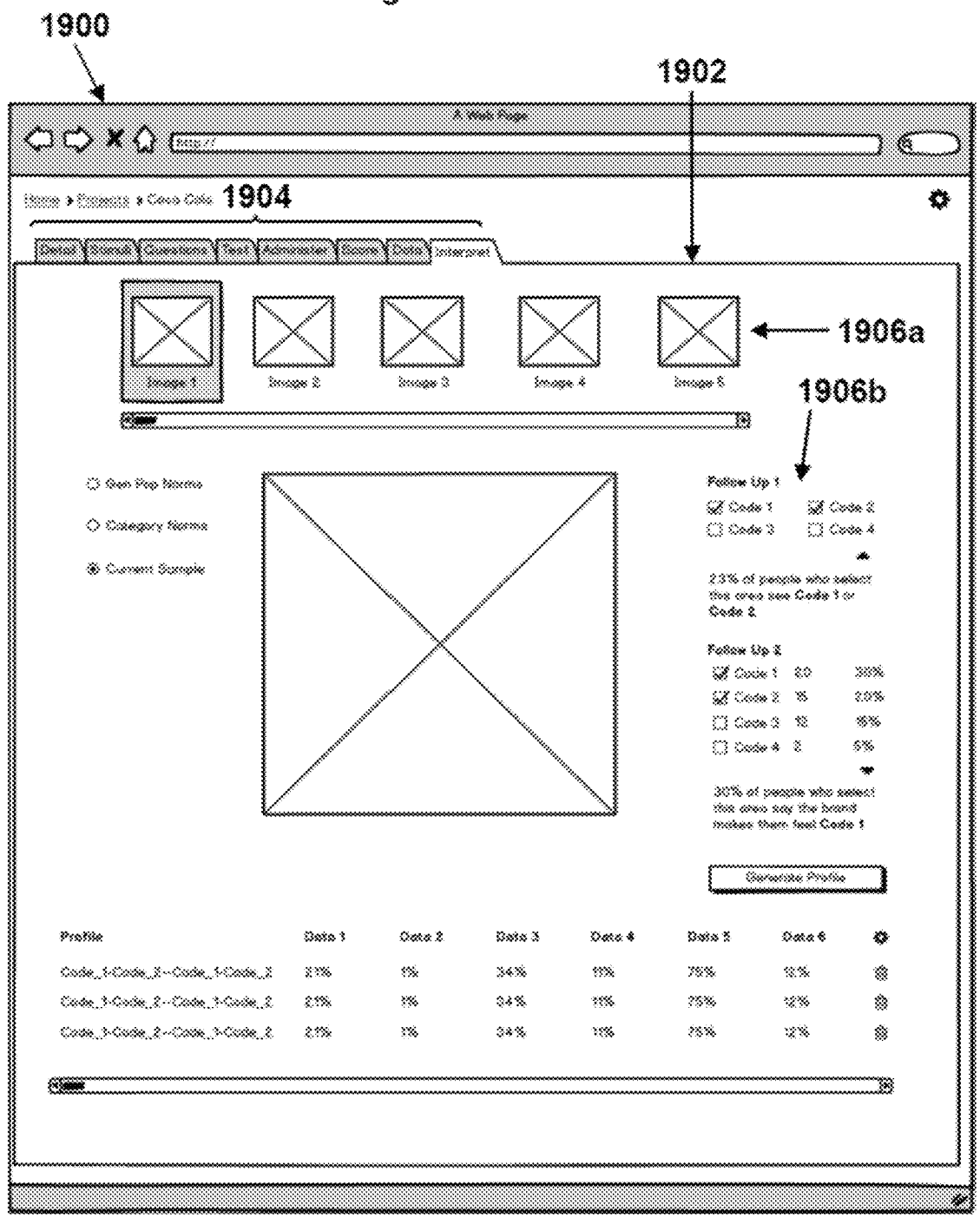
FIG. 19 illustrates an exemplary screen for analyzing and interpreting projective test data that is a part of a man-machine interface according to embodiments of the present invention.

FIG. 19 illustrates an exemplary screen 1900 configured to allow an administrator to analyze and interpret the projective test data according to embodiments of the present invention. Screen 1900 includes a detailed display area 1902 and a number of tabs 1904, which are configured to navigate between screens. Display area 1902 may include a number of interactive components 1906a-b configured for selecting test data by image and to allow analysis and interpretation of the same as described herein.

FIG. 19 also illustrates that should the survey administrator want to create and compare profiles, one can select the tags/codes they want to create the profiles with. Then, an interface element, here the "Generate Profile" element may be selected to initiate machine learning algorithms to analyze and present back to the survey administrator percent likelihood or odds ratios of having certain characteristics.

Figure 20:
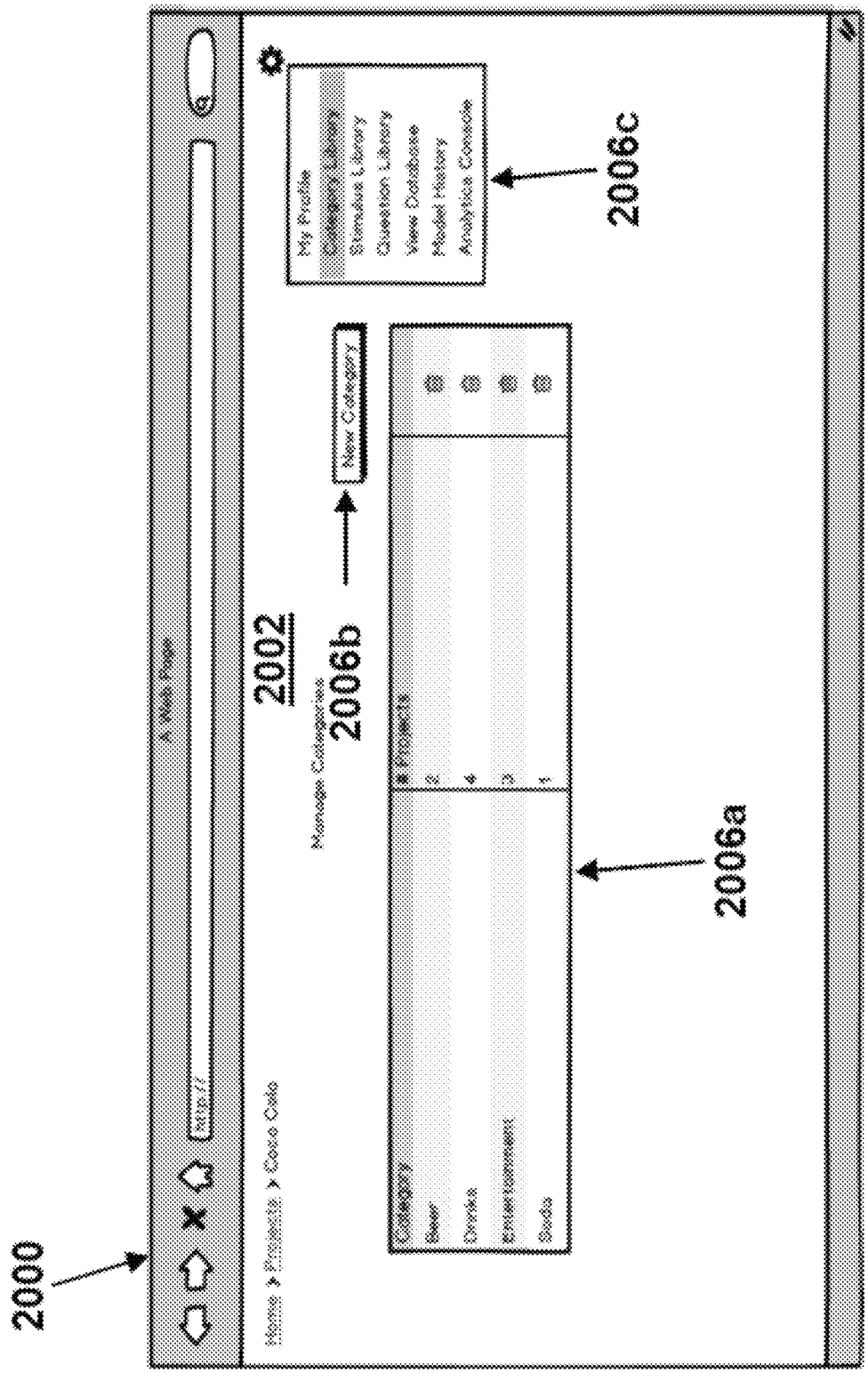
FIG. 20 illustrates an exemplary screen for creating tags/codes to classify different projects that is a part of a man-machine interface according to embodiments of the present invention.

FIG. 20 illustrates an exemplary screen 2000 configured to allow an administrator to classify different projects according to embodiments of the present invention. Screen 2000 includes a detailed display area 2002 having a number of interactive components 2006a-c configured for selecting category data to classify different projects as described herein.

In some embodiments, a "Category Library" is provided that allows the survey administrator to create tags which can be assigned to projects. By having been assigned a tag, the project's data can then be included when the survey administrator chooses to see benchmarks by category.

Figure 21:
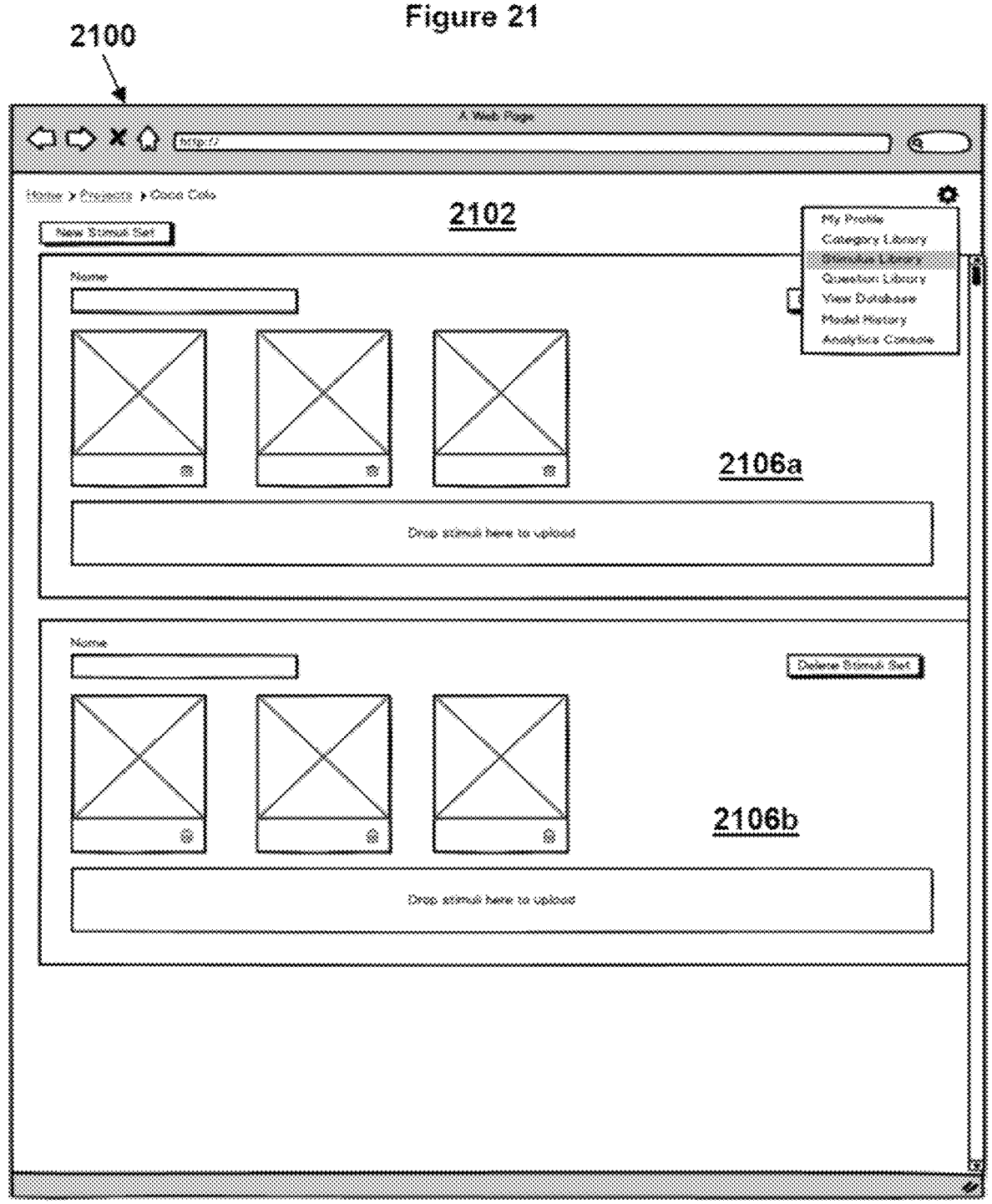
FIG. 21 illustrates an exemplary screen creating and uploading stimuli sets that is a part of a man-machine interface according to embodiments of the present invention.

FIG. 21 illustrates an exemplary screen 2100 configured to create and upload new stimuli sets according to embodiments of the present invention. Screen 2100 includes a detailed display area 2102 having a number of interactive components 2106a-b configured for uploading images for stimulus sets to be made available for projects as described herein.

In some embodiments, when the user selects images, or drags and drops images into the upload box, the JavaScript client sends these images, along with information about Image Library Name to the system. The system accepts this information and stores the image files in its filesystem and stores the information about the path to the images and the image library information in the database. If the user clicks the Delete Library button, the client sends a delete command to the system along with the ID of the image library to remove. The system accepts this information, obtains information about the paths to the images related to this library from the MySQL database. Then the system deletes the files form its file system, and then deletes the library information from the MySQL database.

Figure 22:
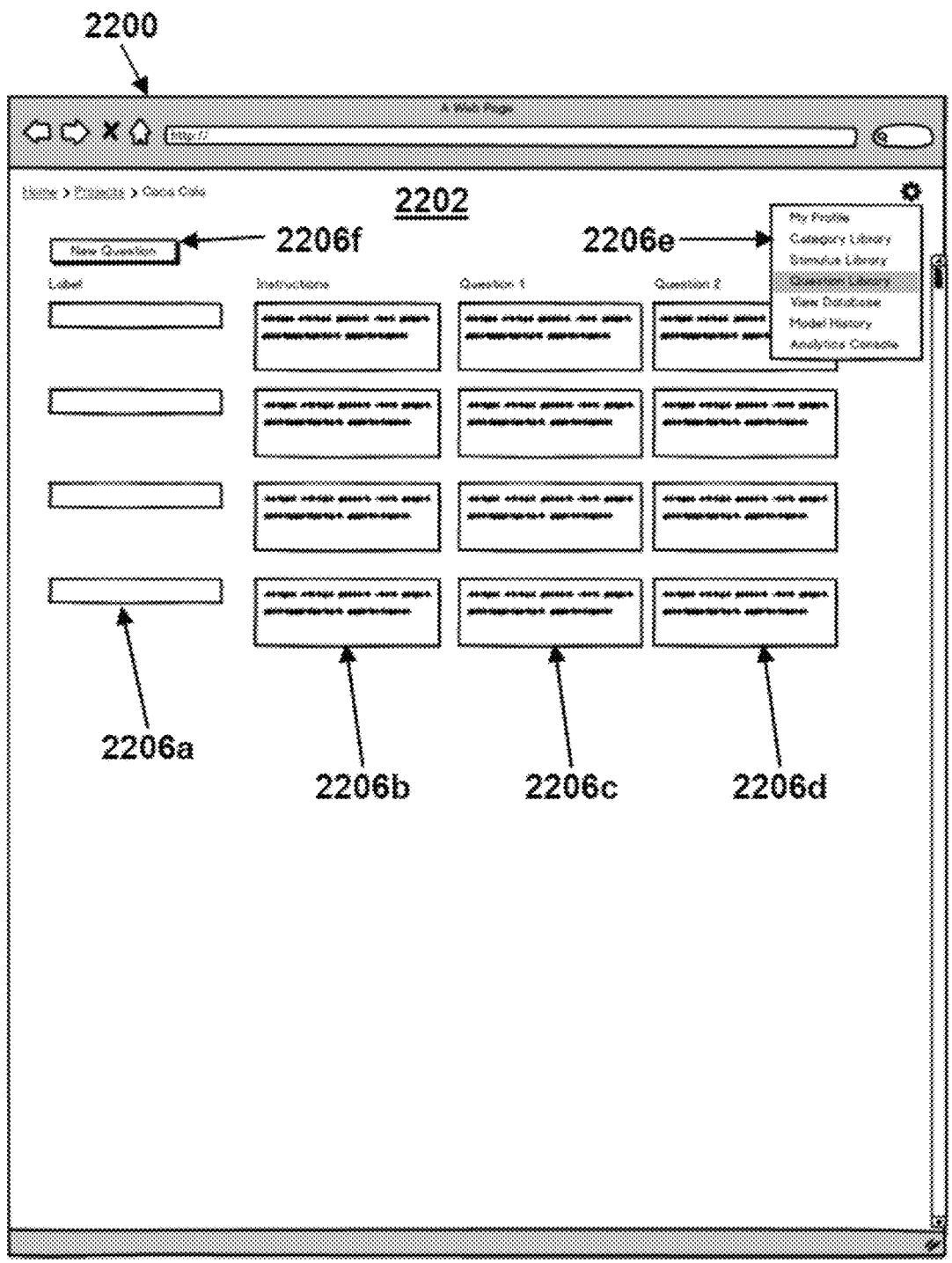
FIG. 22 illustrates an exemplary screen for creating new projective prompts that is a part of a man-machine interface according to embodiments of the present invention.

FIG. 22 illustrates an exemplary screen 2200 configured to create new projective prompts (interactions for stimulus sets) to be used in projective tests according to embodiments of the present invention. Screen 2200 includes a detailed display area 2202 having a number of interactive components 2206a-f configured for creating/managing projective prompts to be made available for projects as described herein.

In some embodiments, a "Question Library" is provided that allows the administrator to save questions and prompts to use in a projective test at a later time.

Figure 23:
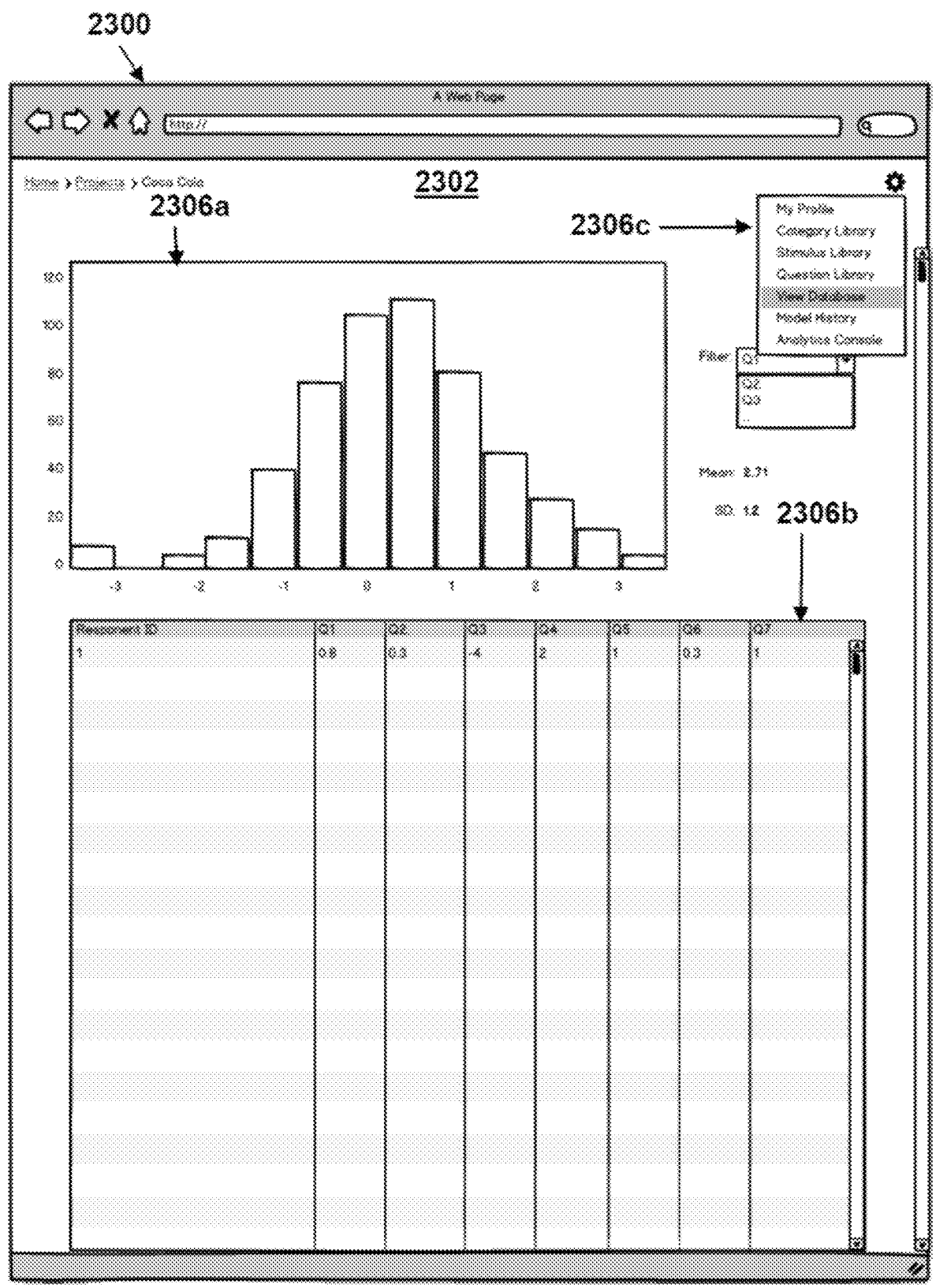
FIG. 23 illustrates an exemplary screen for displaying data and querying descriptive statistics that is a part of a man-machine interface according to embodiments of the present invention.

FIG. 23 illustrates an exemplary screen 2300 configured to allow an administrator to query and view data in the database and obtain descriptive statistics according to embodiments of the present invention. Screen 2300 includes a detailed display area 2302 having a number of interactive components 2306a-c configured for generating descriptive statistics for projects as described herein.

In some embodiments, the system is configured to display the "head" of the database, and allows the administrator to select a column in the database, visualize it (via histogram or bar chart), and provide descriptive statistics.

In some embodiments, if the user selects a data column, the client requests the data from the system. The system calculates the values required for the client to show a histogram graph of the data, and also computes descriptive statistics about the data, and returns these to the client. The client accepts this data, draws the histogram and displays the descriptive statistics.

Figure 24:
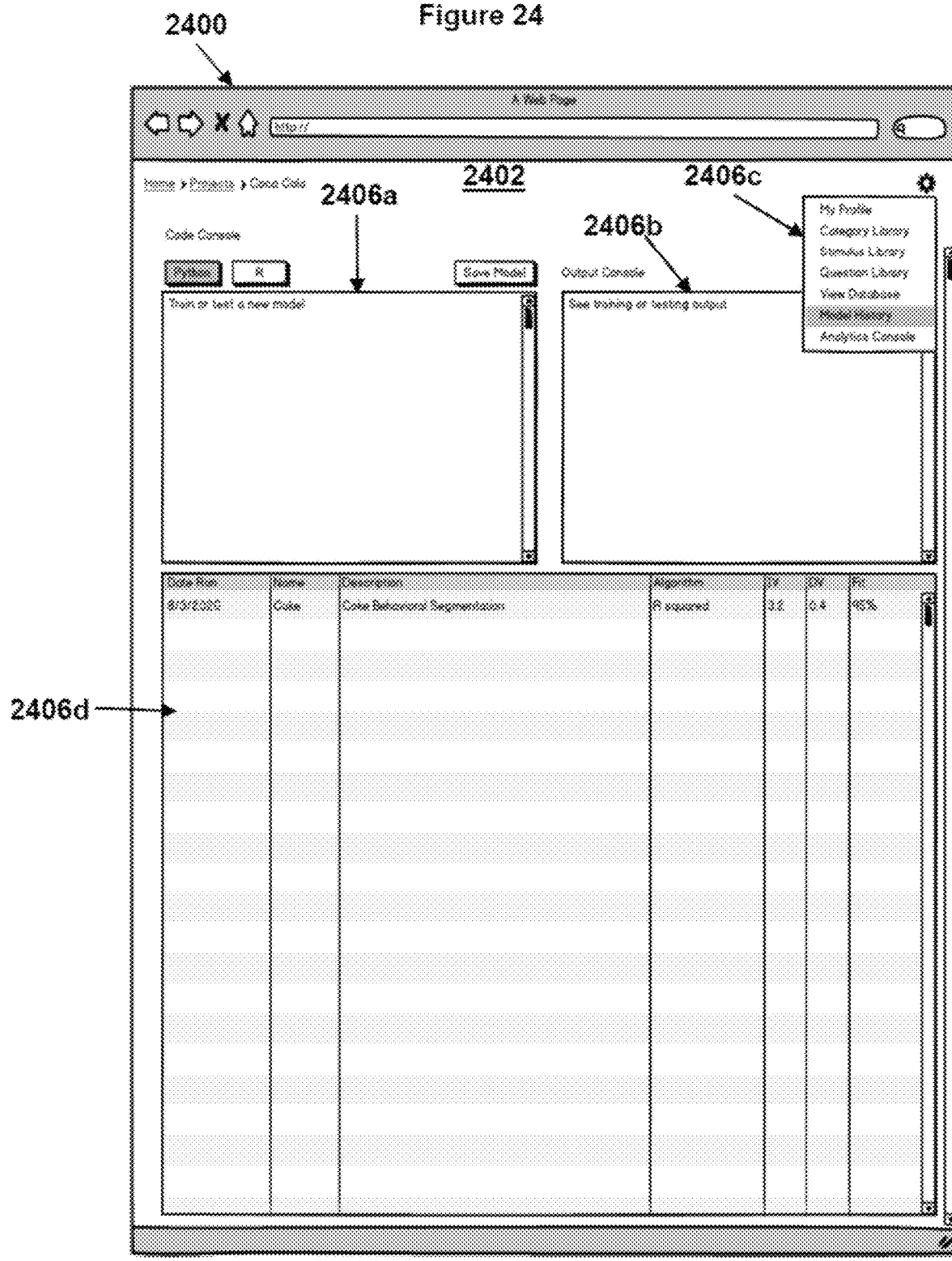
FIG. 24 illustrates an exemplary screen for creating new machine learning models and deploy them into the system that is a part of a man-machine interface according to embodiments of the present invention.

FIG. 24 illustrates an exemplary screen 2400 configured to allow an administrator to create new machine learning models and deploy them into the system according to embodiments of the present invention. Screen 2400 includes a detailed display area 2402 having a number of interactive components 2406a-d configured for display of model information (e.g., Python or R code) and to allow modification of existing models or creation of new models to be used for the various AI algorithms described herein to be executed according to embodiments of the present invention.

In some embodiments, a console can be provided that allows user to train and test a model on the database data using, for example, R or Python, and then deploy it to be used on the platform. This allows the user to continually better predict results for the scoring algorithm and the predictive profiles. The console may include a space on the page that shows the records of "active models" and "inactive models".

Figure 25:
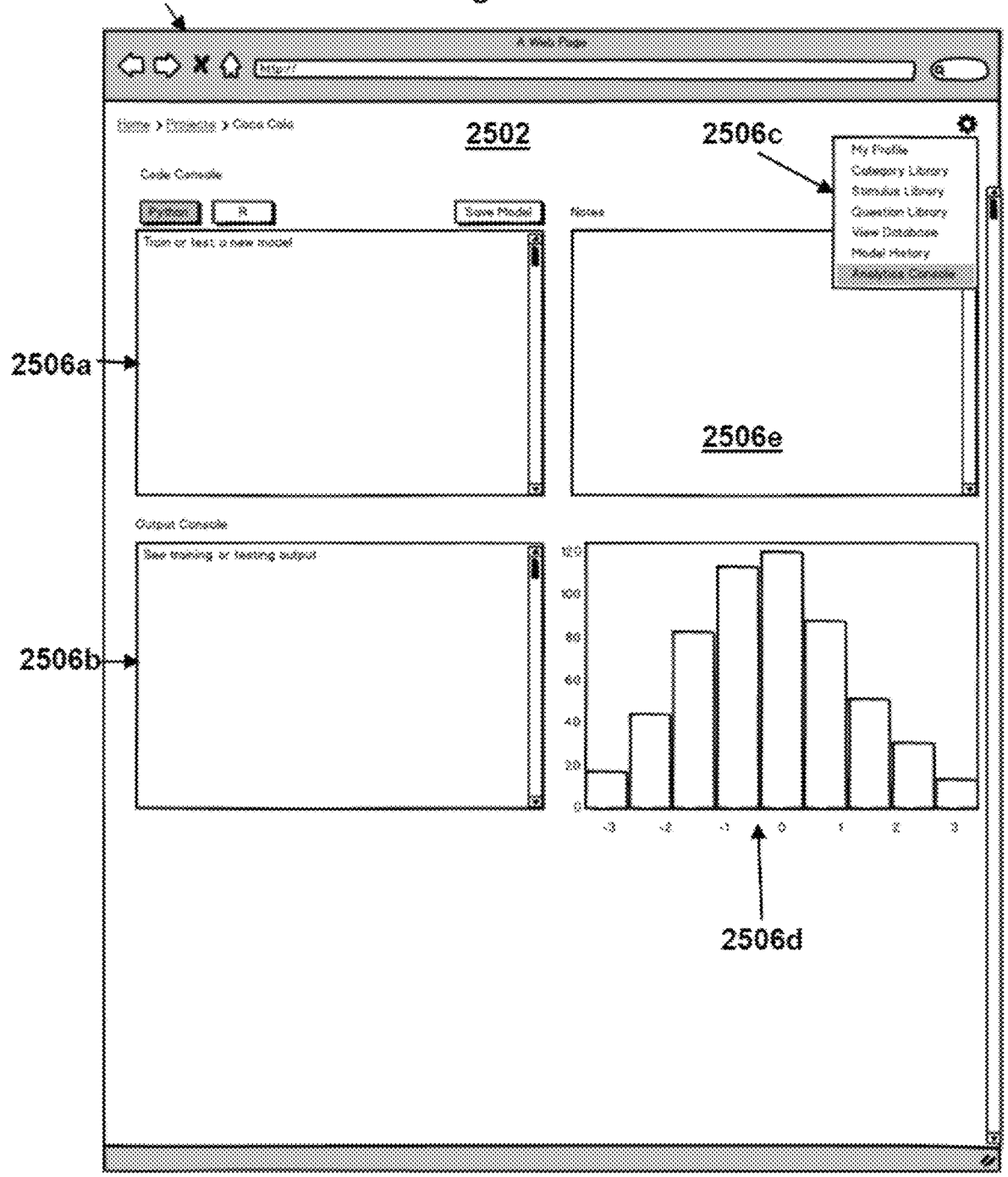
FIG. 25 illustrates an exemplary screen for analyzing projective test data within the platform that is a part of a man-machine interface according to embodiments of the present invention.

FIG. 25 illustrates an exemplary screen 2500 configured to allow an administrator to analyze projective test data within the platform according to embodiments of the present invention. Screen 2500 includes a detailed display area 2502 having a number of interactive components 2506a-e configured to allow entry of custom code for analyzing data within the system, to execute the same, and to display the results of the analysis (2506d), as described herein according to embodiments of the present invention.

In some embodiments, the system is configured to run additional analytics on the database by using R or Python. Interaction can be provided, such as a button or specific command in console, to save the script from a given session.

In some embodiments, the JavaScript client running in the user's web browser draws the view shown. The user selects either Python or R. As the user types into the Code Console, the client streams the text to the system. The system interprets the text through a Python or R processing library and streams the results back to the client. The client accepts this data and displays it in the Output Console. The client can also accept histogram graphing data. If the user types in the Notes window, the client sends this data to the system. The system saves the notes information along with the model. The user may click Save Model and the client will send a command to the system to save the model to the MySQL or MongoDB database as appropriate.

In some embodiments, when a user selects either Python or R. As the user types into the Code Console, the client streams the text to the system. The system interprets the text through a Python or R processing library and streams the results back to the client. The client accepts this data and displays it in the Output Console. The user may click Save Model and the client will send a command to the system to save the model to the MySQL or MongoDB database as appropriate.

FIG. 26 illustrates an exemplary screen 2600 configured to allow a consumer to register for an account in the invented system according to embodiments of the present invention. Screen 2600 includes text and text fields for accepting account information to be stored in the system's database.

Figure 27:
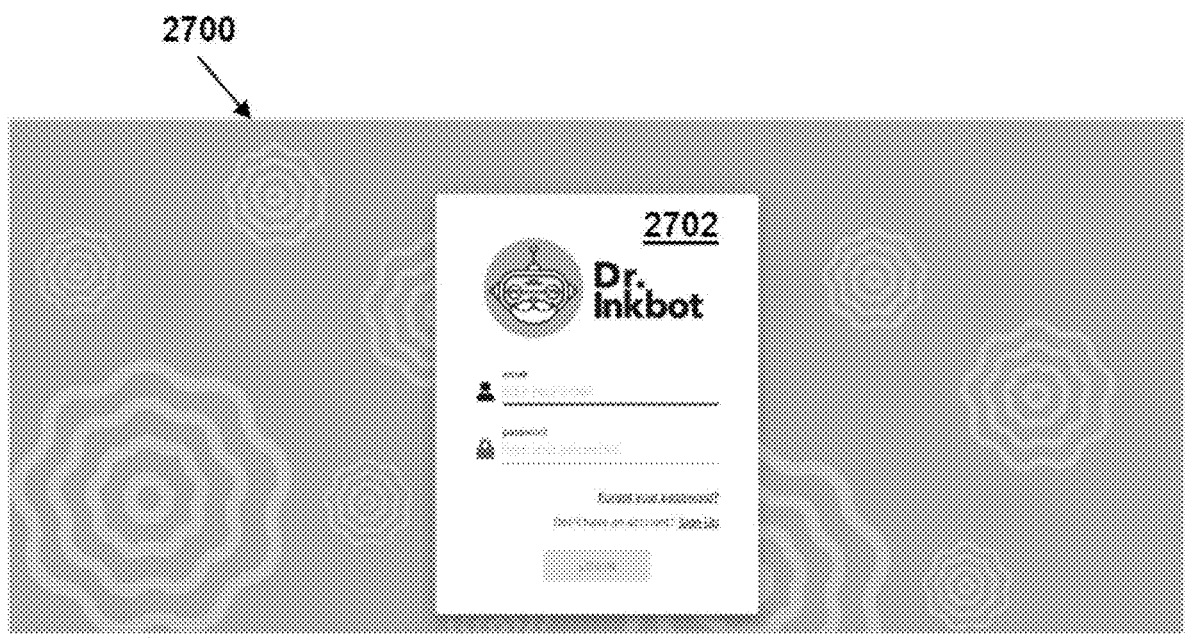
FIG. 27 illustrates an exemplary screen for signing in that is a part of a man-machine interface according to embodiments of the present invention.

FIG. 27 illustrates an exemplary screen 2700 configured to allow a consumer to sign into the invented system using a registered account according to embodiments of the present invention. Screen 2700 shows a standard sign in web page.

Figure 28:
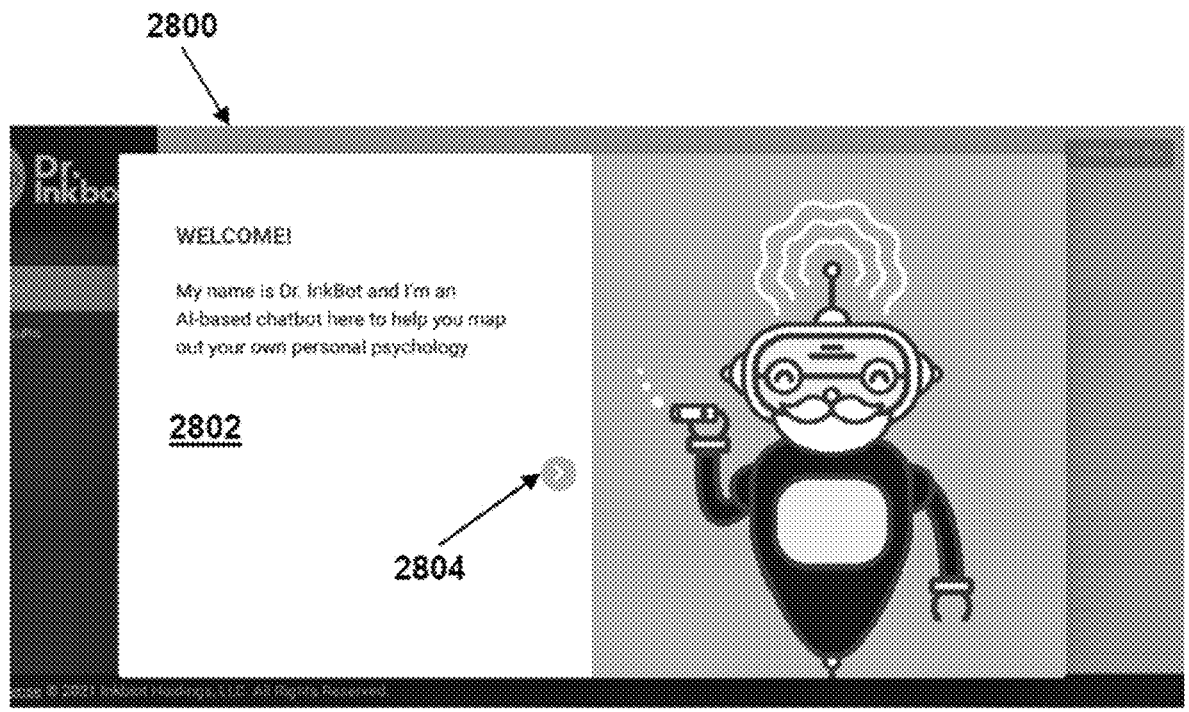
FIG. 28 illustrates an exemplary screen for the consumer user to learn how to use the platform that is a part of a man-machine interface according to embodiments of the present invention.

FIG. 28 illustrates an exemplary screen 2800 configured to allow a consumer to enter data for onboarding according to embodiments of the present invention. Screen 2800 includes an interactive window 2802 with navigation 2804 for walking through data entry screens (not shown) for entry of data relating to the consumer account to be stored in the system's database.

Figure 29:
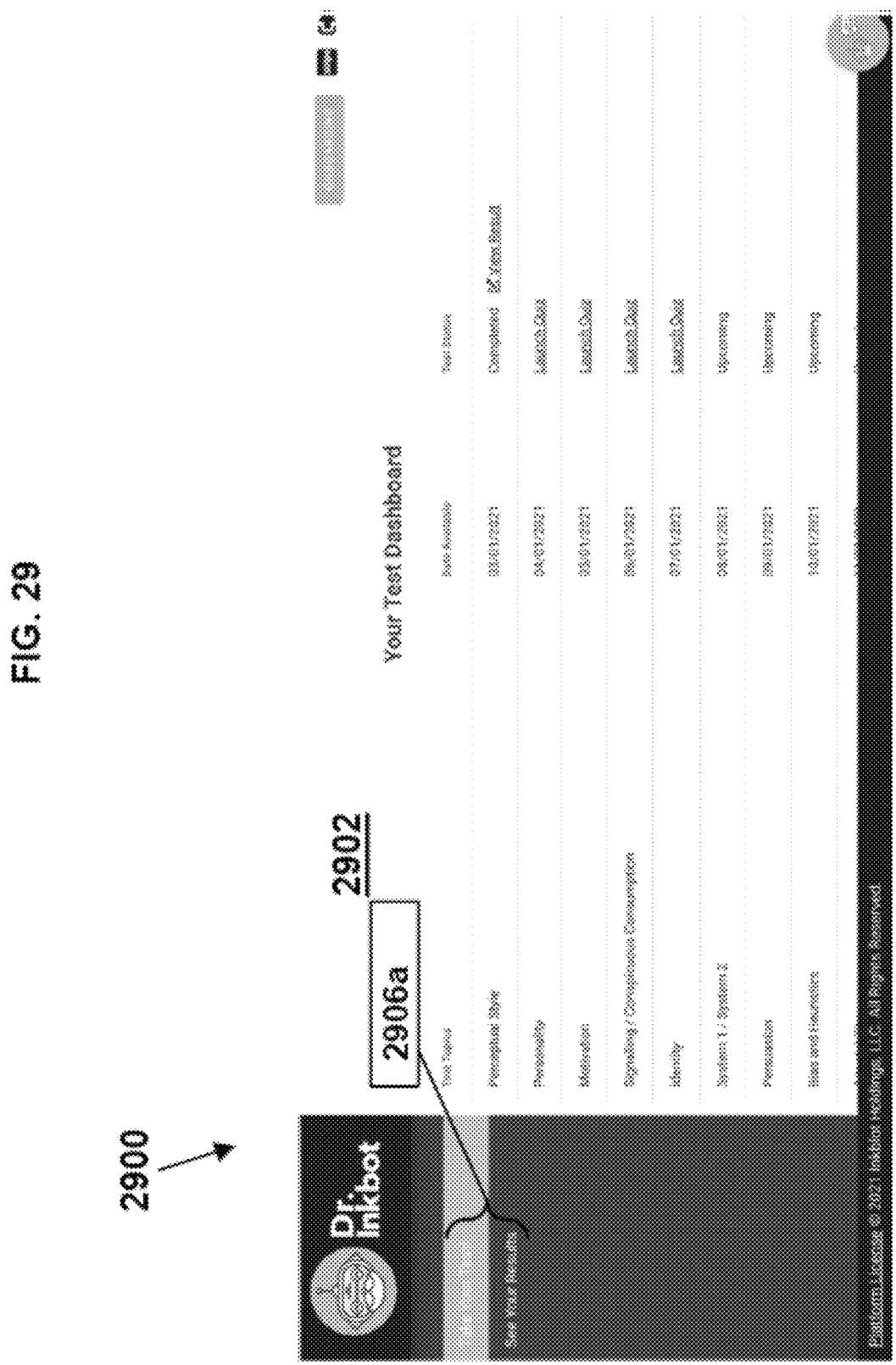
FIG. 29 illustrates an exemplary screen for searching and displaying available projective tests that is a part of a man-machine interface according to embodiments of the present invention.

FIG. 29 illustrates an exemplary screen 2900 configured to allow a consumer to find what projective tests are available to take according to embodiments of the present invention. Screen 2900 includes an interactive window 2902 with selectable components 2906a-b, which are used for searching the system for available tests and displaying them in window 2902.

Figure 30:
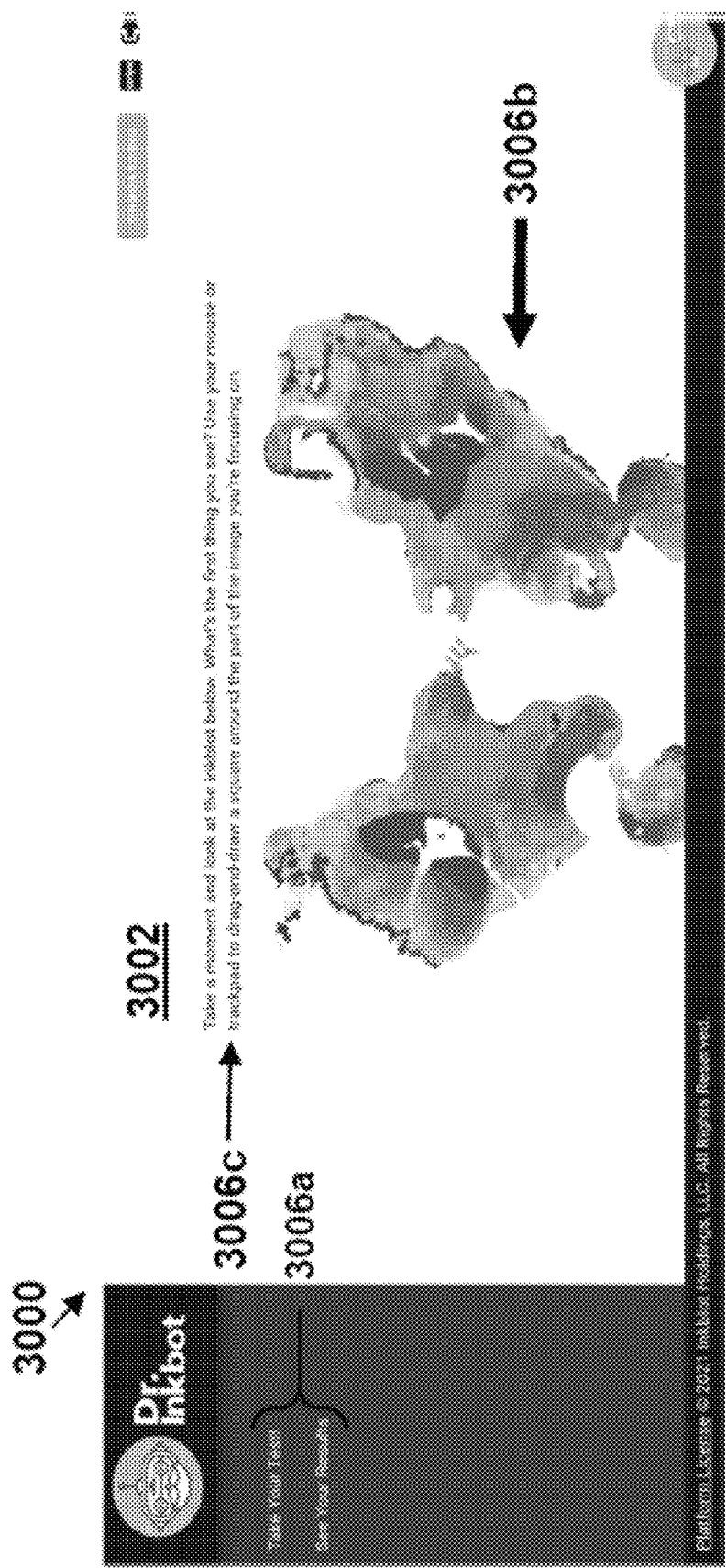
FIG. 30 illustrates an exemplary screen for taking a projective test that is a part of a man-machine interface according to embodiments of the present invention.

FIG. 30 illustrates an exemplary screen 3000 configured to allow a consumer to take a projective tests according to embodiments of the present invention. Screen 3000 includes an interactive window 3002 with selectable components 3006a, which are configured for initiating execution of the test in window 3002. As shown, a stimulus image 3006b and an associated interaction 3006c are displayed. A test may be executed through the browser or device window 3002 as already described herein.

Figure 31:
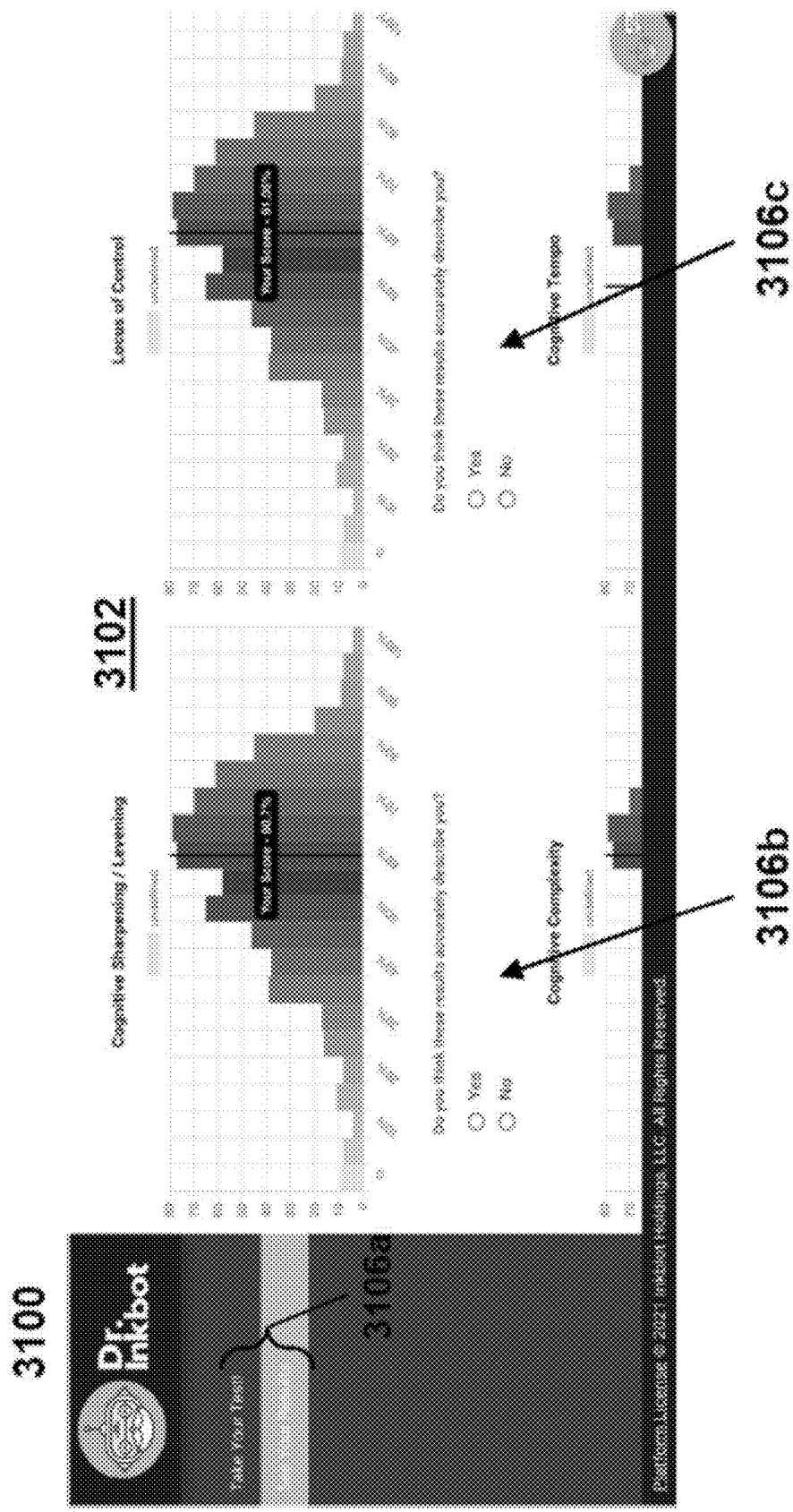
FIG. 31 illustrates an exemplary screen for displaying the results of a projective test that is a part of a man-machine interface according to embodiments of the present invention.

FIG. 31 illustrates an exemplary screen 3100 configured to allow a consumer to view the results of their projective test according to embodiments of the present invention. Screen 3100 includes an interactive window 3102 with selectable components 3106a-c, which are used for displaying scores and allowing the consumer to input additional information related to the scores.

Figure 32:
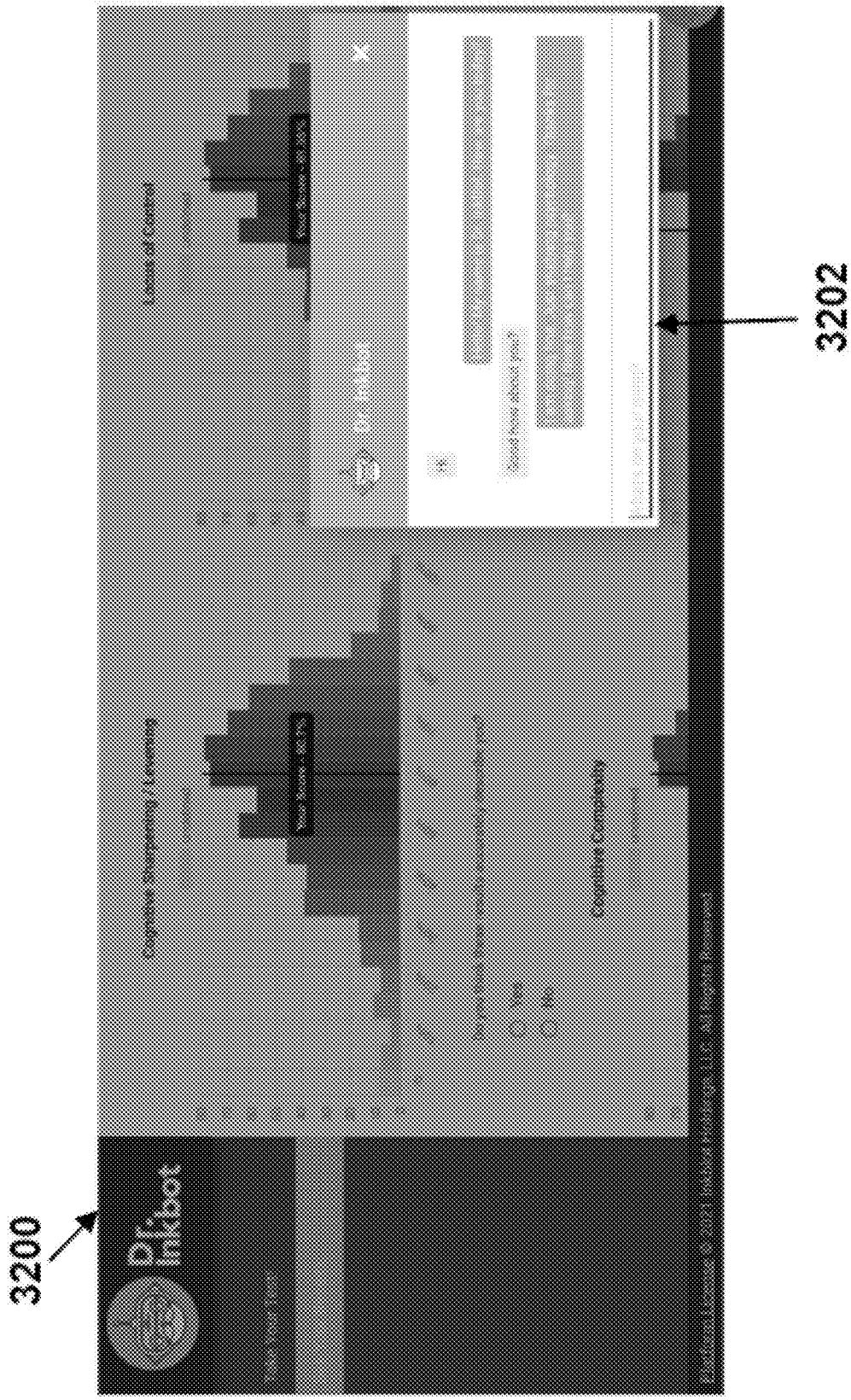
FIG. 32 illustrates an exemplary screen for interpreting projective test scores by using the chatbot that is a part of a man-machine interface according to embodiments of the present invention.

FIG. 32 illustrates an exemplary screen 3200 configured to provide a chatbot window 3202 to interact with a user according to embodiments of the present invention. The features of the chatbot window 3202 may include computer interaction, through I/O with the user keyboard or microphone, with an AI model configured to identify a correct response to free form text input into the chatbot. The chatbot may use an electronic dictionary to define predicted characteristics (e.g., psychological variables), define score ranges (e.g., high, low, average), to identify implications of consumer's scores, such as behaviors associated with certain scores. The chatbot is configured to produce text responses based on the AI model response to input within the window 3202. A chatbot may be deployed using AMAZON LEX or other commercially available tools.

Figure 33:
FIG. 33 illustrates an exemplary screen for registering for an API key that is a part of a man-machine interface according to embodiments of the present invention.

FIG. 33 illustrates an exemplary screen 3300 configured to allow a developer to enter data to register for an API key for an API as already described above, according to embodiments of the present invention. Detail window area 3302 includes standard text fields for data entry.

Figure 34:
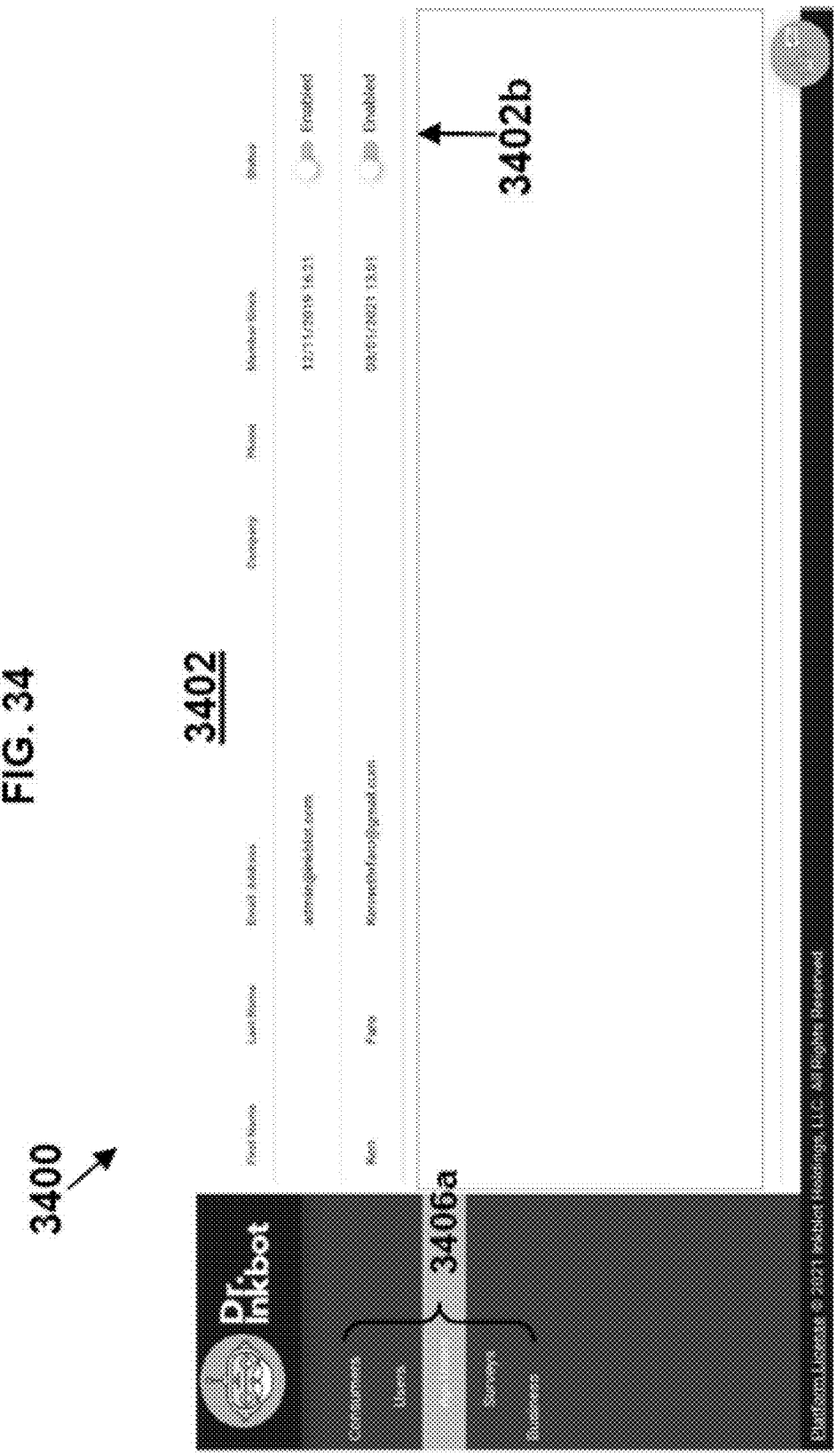
FIG. 34 illustrates an exemplary screen for enabling an API key that is a part of a man-machine interface according to embodiments of the present invention.

FIG. 34 illustrates an exemplary screen 3400 configured to allow the administrator to enable an API key for a developer according to embodiments of the present invention. Detail window 3402 is configured to display data based on the selection from the interactive display component 3406a. Interactive display component 3406b is configured to enable or disable a selected API user. Screen 3400 is configured to update associated data be stored in the system's database.

Figure 35:
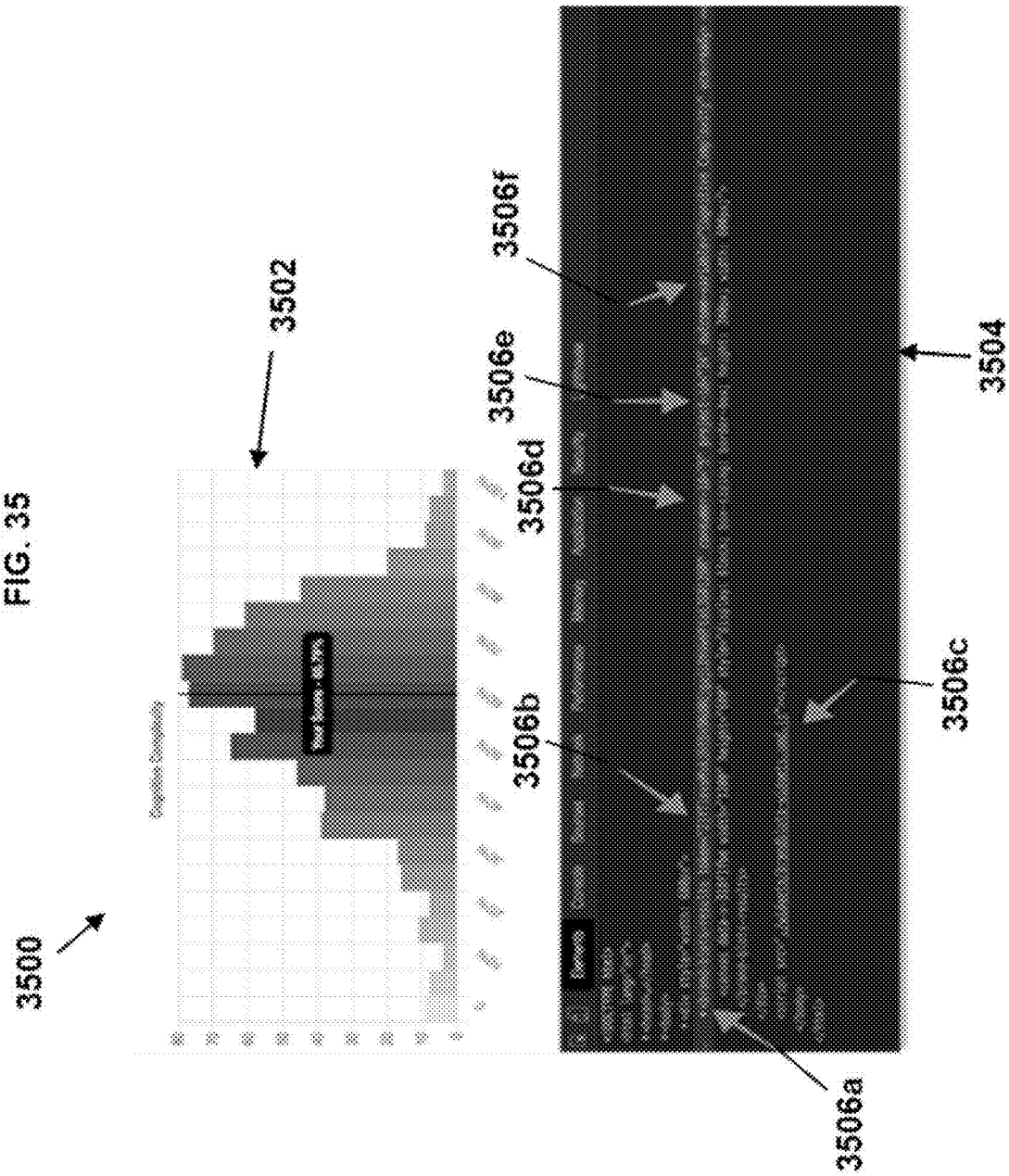
FIG. 35 illustrates an exemplary screen for embedding a projective test or projective test results in another application that is a part of a man-machine interface according to embodiments of the present invention.

FIG. 35 illustrates an exemplary screen 3500 configured to allow the developer to embed a projective test or projective test results into another application according to embodiments of the present invention. Screen 3500 includes a display window 3504 configured to display coding elements. The first arrow 3506a points to the line the HTML element is on. The second arrow 3506b points to the API key or token required. The third arrow 3506c points to the line of code the JavaScript library is on, which creates a custom visualization or custom projective test 3502 (the bar graph on this figure). The fourth arrow 3506d points to the consumer ID, which indicates which consumer to pull data for. The fifth arrow 3506e is the projective test for which the data for a consumer is to be pull for the custom visualization. The sixth arrow 3506f is what predicted variable needs to be visualized.

Figure 36:
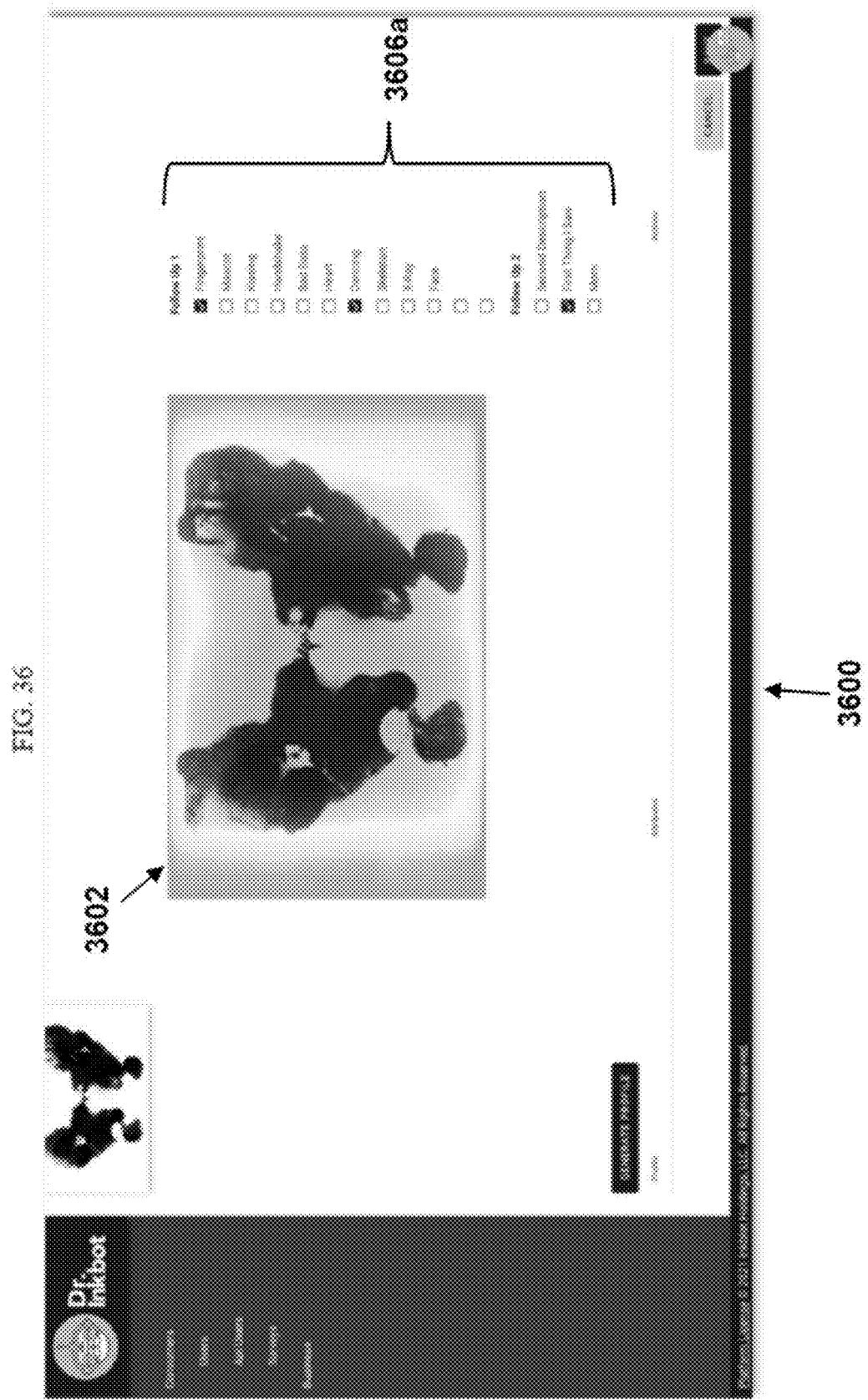
FIG. 36 illustrates an exemplary screen of a visualization of aggregated projective test responses for a projective test that is a part of a man-machine interface according to embodiments of the present invention.

FIG. 36 illustrates an exemplary heat map generated according to aspects of the present invention. As shown, a screen 3600 is provided for displaying a heat map 3602 based on input via interactive display components 3602a. The heat map 3602 may be based on a selected stimulus and a plurality of test results data and illustrates, through a novel display interface, statistic results and analysis through pixelization of the results data over an image of the selected stimulus, as already described here.

Figure 37:
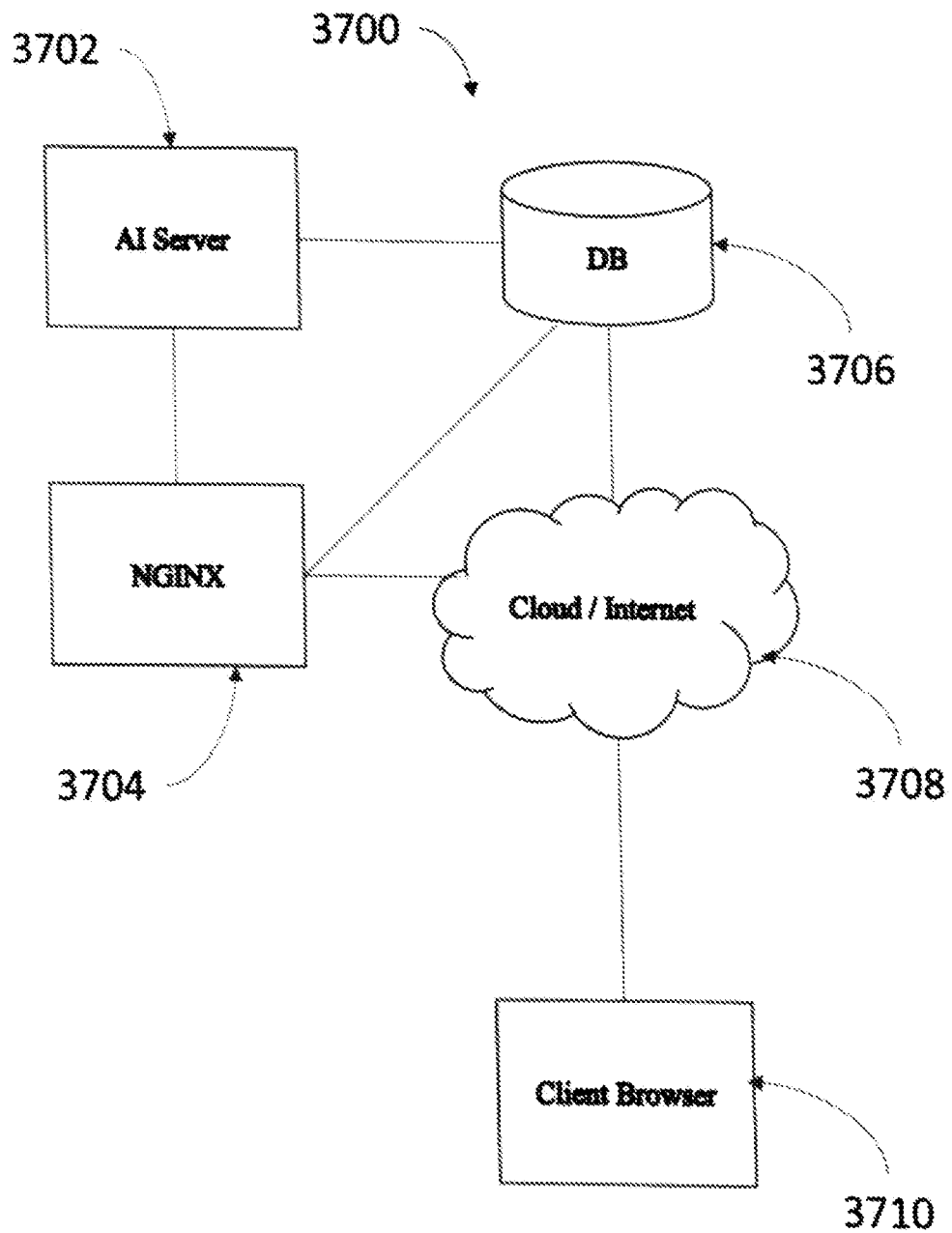
FIG. 37 is an exemplary architecture according to embodiments of the present invention.

FIG. 37 is a block diagram of an exemplary system architecture for an automated system for providing projective tests through a man machine according to embodiments of the present invention. System 3700 includes an AI server 3702, an NGINX server 3704, and a database server 3706. Each maybe be electronically coupled directly and/or via a private and/or public electronic data network 3708 via "the Cloud" or the Internet. Access to the system is preferable made remotely via a client browser 3710, however can be made using any type of computing device programmed to access web pages via the internet. Further custom APPS can be provisioned to access the system of the present invention and for performing one or more steps of the processes of the present invention.

The invented algorithms are preferably written in R and Python and hosted in an API on an AI server 3702. NGINX server 3704 hosts the web pages and is configured to perform, in conjunction with AI server 3702 and database server 3706, the processes described herein. NGINX server 3704 is preferably provisioned with a webapp where the webapp has a laravel backend and a Vue.js front end.

Project and respondent data, test data, results and statistical data, which may also include training data, is maintained on the database server 3706. Database server 3706 may be provisioned with a relational database, such as a MySQL database. Payment details may be handled by a stripe integration.

The skilled person will readily understand how to provision system 3700 in according with the description of the invention herein.

Although the invention has been described based upon these preferred embodiments, it would be apparent to those of skill in the art that certain modifications, variations, and alternative constructions could be made to the described embodiments within the spirit and scope of the invention.

For example, the invention is not limited to image based stimuli. Other stimuli, the survey-taker can be selecting part of a word/sentence, audio clip, or video clip.

In some embodiments, the system allows the user to click-and-drag the mouse over the image to highlight any size rectangle. If the user doesn't like the rectangle they drew (or the part of the image they highlighted) they can click-and-drag again, which will automatically erase the previous rectangle. Once happy with their image highlighting, they will hit "Next". At this point, the system records the pixel coordinates of each corner of the rectangle in the platform database.

In some embodiments, the system generates an image of the projective stimuli seen previously with the survey-taker's highlighted selection imposed on to it for the survey-taker to reference. Prompts may be displayed to the user with the question text for "follow-up question 1" written in by the Survey Administrator and input into the system at an earlier point. A textbox area for the survey-taker to answer the question. The text input into the textbox is saved to the platform database when the user hits "Next" button.

In some embodiments, the system generates an image of the projective stimuli seen previously with their highlighting selection imposed on to it for the survey-taker to reference. The system then prompts the user with the question text for "follow-up question 2" written in by the Survey Administrator and input into the system at an earlier point. The system then has a textbox area for the survey-taker to answer the question. The text input into the textbox is saved to the platform database when the user hits "Next".

In some embodiments, a JavaScript client running in the user's web browser draws the view shown in the figures, or a similar view.

In some embodiments, an administrator can create new projective stimuli library sets, by, e.g., clicking-and-dragging images into the screen.

According to some embodiments, once data is analyzed, for image-based questions (e.g., the inkblot test), when selecting one of the inkblot images, the system will generate and display a visual object, such as a heatmap of all the areas that were selected by survey respondents, and a list of all the codes/categories/themes per question asked (e.g., there would be two lists of codes if there were two follow up questions). What data is displayed can be configured to, for example, just the data from the sample, data from all projects that are assigned to the same topic/category (e.g., product category like beer), or data from all projects in the entire database.

According to embodiments of the present invention, the system can be configured to provide a display for a "Client Sample"; in which case the client only requests responses related to the current survey.

According to embodiments of the present invention, the system can be configured to provide a display for "Category Norms"; in which the client will request all responses to the image for all surveys with the same categories as the current survey.

According to embodiments of the present invention, the system can be configured to provide a display for responses to the image across all surveys that are assigned to be included in the "General Population."

According to embodiments of the present invention, the system is preferably configured to generate and display a heatmap over the selected image showing the frequency of selection of different parts of the image by different subjects. According to embodiments of the present invention, the heatmap can use an overlay with opacity variation from 0-1, where 0 is used on image pixels that no subjects chose, and 1 for pixels that were chosen most frequently. If the user clicks on the heatmap, the client will show the top most frequent Primary codes (e.g., 4) of users who selected that pixel. If the user selects one or more of these codes, the client will show the 4 most frequent secondary codes if users who selected that pixels and whose Primary codes include the user selected primary codes.

Other features of the invention will be readily apparent from the drawing figures.

In a preferred embodiment, through use of the system described and illustrated herein, the output of the invented method of administering and analyzing projective tests is a psychological profile. Based on the responses to the projective tests in the MMI, psychological knowledge about the test taker can be developed without requiring any other questions to be answered.

"Psychological profile" means a predicted set of psychological characteristics relating to attitudes, beliefs, values, and behaviors both generally (in life), and specifically in the domain of consumer behaviors. For example, if Respondent A performs an image-based projective test with inkblots using the system described above, and indicates that a displayed image includes a "bird," the underlying algorithms will use that to predict characteristics of an associated psychological profile. For example, the algorithm my categorize the test-taker as an "explorer type" personality, which includes the following psychological characteristics: (1) High on traits of openness to experience, (2) High on system 1 thinking, (3) High on "sharpener perceptual style," among other traits. Specific to consumer behavior, this profile may be associated with statistics like: 30% more likely to buy brand names over generic products, 20% more likely to spend disposable income on impulsive purchase, 40% more likely to tell friends/family about the brands they love, among other behaviors.

The system may be configured to predict limitless characteristics through learning and training of the underlying models.

Exemplary Technical Improvements:

Increasing the speed of administering, scoring, and interpreting: Projective tests have been around since the 1940s. Throughout their history they have taken a long time to administer, to score, and to interpret. A classic Rorschach Inkblot Test can take between 2 and 3 hours to administer, score, and interpret. This holds true for all projective tests, which have historically been administered via "pen and paper". The present invention cuts down on the time to administer, score, and interpret, automatizing each one of these parts. While the digitization of the administering has reduced time, the reduction of time spent on scoring and analyzing is due to a number of algorithms. The scoring or "coding" of responses is automated via a classification algorithm. This algorithm takes into consideration (1) the image shown, (2) area selected, (3) text one used in your follow-up questions about that area. Based on that information, a model then predicts the likelihood of how that response should be tagged. The reporting or "interpretation" of responses is automated by a set of algorithms that explicates the relationships between projective test answers and other psychological variables (i.e., characteristics).

The research implications of getting more information in less time: The practical use of the present invention is immensely important given at least two recent trends. In today's day and age, consumers are bombarded with surveys and questionnaires from every brand imaginable. At the same time, schedules have gotten increasingly busy, with little time to give for a single survey, let alone surveys for every brand consumers' come in contact with. With an increase in the demand for consumer surveys and the decrease in consumer free time, methods need to be developed that are short in content but powerful in the amount and accuracy of information they can give about the consumer. This system and method accomplishes this.

The Marketing Implications of Psychographic Data: Additionally, to date, demographics have been the primary basis of information about consumer behavior when engaging in marketing tasks. For example, when buying display ads on google, one way to target an audience is by selecting the demographics (e.g., males ages 50-65). This product changes the paradigm allowing for a look at the demographic AND psychographic characteristics. This allows one to get more precise in targeting and opens up new strategic opportunities to brands.

For example, in keeping with the example from above, if a brand's core customer are 20% more likely to spend disposable income on impulsive purchases, maybe it makes better sense to place a brands product in the check-out line (like other candy bars or enticing magazines). This is a fundamentally different marketing strategy than a demographic approach, which would suggest one target areas where an older male audience shops. Knowing customers' psychological make-up opens up a whole new world of strategic implications for the practitioner.

A Novel System That Goes Above and Beyond Human Capabilities: The present invention is not simply automating something that has been done or could be done by humans. Rather, by providing the novel man machine interface and utilizing machine learning and AI techniques, a new system is created that never existed before and which could not be performed by humans. That is, this system creates new projective tests both in format (media type, ambiguity of stimulus, projective test goal) and in content (questions or prompts can be infinitely changed, stimulus libraries can be infinitely changed). This system also allows for a deeper analytical capabilities, by (1) extracting features from images, text, audio, and video clips that could not be performed without the help of computer processing, and (2) it uses these features to make predictions on a large number of other variables.

Creating new projective tests: the invention provides at least three improvements to how projective tests have historically been used:

Mediums/Media Type—the video-based medium as a new media type to create projective tests with.

Ambiguity—the invention allows one to change the level of ambiguity in the projective stimuli.

Goal Orientation—the invention provides a systemized an approach to also allow the survey administrator to select one of three projective test goals.

Having a data-based platform allows for continual improvements on validity and reliability: Prior projective tests often lacked standardization, meaning that multiple practitioners administered, scored, and interpreted the tests according to their own procedures. This led to poor results of predictive validity and test reliability. This invention, by building on an ever-expanding database, will draw significant associations and predictions that the older tests could never reach. This suggests another huge technical advance for the tests.

The invention may be built using state of the art cloud-based or web-based techniques. For example, the application can be built on the Laravel PHP framework with a Vue.js single page application front end. The application can be served from a single server hosted by Digital Ocean. The server can use the NGINX web server to deliver the application to users and include a MySQL database for data persistence. The user interface can be based off the Bootstrap CSS framework, allowing for responsive implementation of the survey subject user interface and providing cross browser compatibility. The UI should support the latest versions of browsers, such as Chrome, Firefox, Safari, IE11 and MSFT Edge.

Access to knowledge about psychology in general, and knowledge about your own personal psychology specifically: Historically, the only way to glean insight into your psychological traits has been via a psychologist or unreliable online quizzes. This platform makes psychology more accessible, making it easier to get than going to a psychologist, and more reliable than trusting some free online test. Information around the validity and reliability of our measures is provided to the general public via the website so that users can see how it is backed by science.

Thus, a number of preferred embodiments have been fully described above with reference to the drawing figures. Further aspects of the invention are disclosed in the below claims and attached appendices. Although the invention has been described based upon these preferred embodiments, it would be apparent to those of skill in the art that certain modifications, variations, and alternative constructions could be made to the described embodiments within the spirit and scope of the invention.

I claim:

1. An automated system for predicting user characteristics, comprising:
   a web server coupled with an electronic data network, said web server configured to provide a man-machine interface via the electronic data network to a remote client device;
   a database server coupled with the web server;

an artificial intelligence (AI) server coupled with the web server and the database server; and an Application Programming Interface (API) server coupled with said AI server and said database server;

wherein said man-machine interface includes interactive web pages for providing administrative tools to control a content of at least one projective test;

wherein said man-machine interface further includes a plurality of web pages for providing interactive displays that allow the remote client device to display and execute the psychological test;

where the psychological test includes an interactive display component that displays said content and receives responses from said remote client device;

wherein said system is configured to execute a plurality of AI algorithms on said AI server to generate predicted user characteristics based on said responses received from the remote client device executing the psychological test;

wherein said system is configured to execute said plurality of AI algorithms on said AI server to generate predicted user characteristics based on data received via an API executed on said API server; and wherein said man-machine interface includes a plurality of web pages for providing interactive displays that allow the remote client device to display and interact with said predicted user characteristics.

2. The system according to claim 1, wherein said content includes at least one or more images, each having different levels of ambiguity and color.

3. The system according to claim 1, wherein said administrative tools control a behavior of said psychological test.

4. The system according to claim 1, wherein said man-machine interface is configured to include an interface providing interactive controls to allow a user on said remote device to select a portion of an image in response to a question and to input text associated with said selected portion of said image within the man-machine interface.

5. The system according to claim 1, wherein said AI algorithms are trained to associate a tag/code with a psychological test response based on input into the man-machine interface including at least image-based features of the psychological test, a selected portion of said image-based features, associated input text, and text-based features of the input text.

6. The system according to claim 1, wherein said one or more AI algorithms are trained to associate a characteristic to a user based on input into the man-machine interface including execution of said psychological test, at least image-based features of the psychological test, a selected portion of said image-based features, associated input text, and text-based features of the input text.

7. The system according to claim 1, wherein the man-machine interface provides the administrator with a console to train, test, and deploy AI algorithms to said AI server.

8. The system according to claim 1, wherein said system is further configured to generate a visualization of a user's psychological test inputs and provide an interactive display of predicted tags/codes to accept or revise with said man-machine interface.

9. The system according to claim 8, wherein said system is further configured to predict a user's score based on other user characteristics via said plurality of AI algorithms.

10. The system according to claim 8, further configured to generate a visualization of a user's predicted characteristics and provide an interactive display of said visualization with said man-machine interface.

11. The system according to claim 1, wherein the man-machine interface further comprises an interactive chatbot component executing an AI algorithm for interpretation of predicted characteristics.

12. The system according to claim 1, where said API allows access and integration for accessing and embedding said man-machine interface into a separate application.

13. The system according to claim 12, further comprising an API key that allows applications to embed projective tests in a separate application or to post data collected by a separate application with the API and to return a data visualization of predicted characteristics for a selected psychological trait or predicted scores on a selected psychological trait for the separate application to visualize.

14. The system according to claim 1, wherein said content includes text, audio, pictures, and/or video.

* * * * *